(12) United States Patent
Yamamoto et al.

(10) Patent No.: US 9,455,600 B2
(45) Date of Patent: Sep. 27, 2016

(54) ROTOR OF ELECTRIC MOTOR, MOLD MOTOR, AIR CONDITIONER, AND METHOD OF MANUFACTURING THE MOLD MOTOR

(75) Inventors: Mineo Yamamoto, Tokyo (JP); Kazunori Sakanobe, Tokyo (JP); Hiroyuki Ishii, Tokyo (JP); Hiroki Aso, Tokyo (JP); Atsushi Matsuoka, Tokyo (JP); Noriaki Matsunaga, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 712 days.

(21) Appl. No.: 13/979,197

(22) PCT Filed: Jan. 6, 2012

(86) PCT No.: PCT/JP2012/050209
§ 371 (c)(1),
(2), (4) Date: Jul. 11, 2013

(87) PCT Pub. No.: WO2012/098943
PCT Pub. Date: Jul. 26, 2012

(65) Prior Publication Data
US 2013/0285482 A1 Oct. 31, 2013

(30) Foreign Application Priority Data
Jan. 18, 2011 (JP) .................. 2011-008203

(51) Int. Cl.
*H02K 1/04* (2006.01)
*H02K 1/27* (2006.01)
(Continued)

(52) U.S. Cl.
CPC .............. *H02K 1/04* (2013.01); *H02K 1/272* (2013.01); *H02K 1/278* (2013.01); *H02K 1/30* (2013.01); *H02K 5/10* (2013.01); *H02K 5/1732* (2013.01); *H02K 11/215* (2016.01); *H02K 15/12* (2013.01)

(58) Field of Classification Search
CPC .. H02K 1/04; H02K 1/272; Y10T 29/49012; Y10T 29/49009
USPC ...................................... 310/43; 29/596, 598
See application file for complete search history.

(56) References Cited

U.S. PATENT DOCUMENTS 4,779,223 A 10/1988 Asai et al.
4,845,656 A 7/1989 Nishibe et al.
(Continued)

FOREIGN PATENT DOCUMENTS

CN 101667759 A 3/2010
GB 2223918 A 4/1990
(Continued)

OTHER PUBLICATIONS

Office Action mailed Apr. 23, 2013 in the corresponding JP application No. 2011-008203 (English translation).
(Continued)

*Primary Examiner* — Thanh Lam
(74) *Attorney, Agent, or Firm* — Posz Law Group, PLC

(57) ABSTRACT

A rotor resin assembly of a rotor of an electric motor includes a rotor magnet including a substantially cylindrical yoke molded from thermoplastic resin containing a soft magnetic material or ferrite and a resin magnet integrally formed in the outer circumference of the yoke, a position detection magnet arranged at one end in the axial direction of the rotor magnet, and a substantially doughnut-like rotor core arranged in the inner circumference of the rotor magnet and formed by laminating a predetermined number of electromagnetic steel plates. The rotor magnet, the position detection magnet, and the rotor core are integrally formed by resin. A shaft is inserted into an inner diameter section of the rotor core, and the rotor resin assembly is caulked by a jig to form a recess in the vicinity of the inner diameter sections of both end faces of the rotor core and assembled to the shaft.

10 Claims, 62 Drawing Sheets

A-A SECTIONAL VIEW

(51) Int. Cl.
  *H02K 5/10* (2006.01)
  *H02K 5/173* (2006.01)
  *H02K 1/30* (2006.01)
  *H02K 15/12* (2006.01)

(56) References Cited

U.S. PATENT DOCUMENTS

| | | | |
|---|---|---|---|
| 5,353,403 A | 10/1994 | Kohiyama et al. | |
| 7,074,019 B2 * | 7/2006 | Knoll | H02K 1/272 123/41.44 |
| 7,768,168 B2 * | 8/2010 | Aschoff | H02K 1/2733 310/156.08 |
| 2003/0062786 A1 * | 4/2003 | Reiter, Jr. | B22D 19/0054 310/156.08 |
| 2005/0258694 A1 * | 11/2005 | Leininger | B25F 5/021 310/156.32 |
| 2008/0174200 A1 * | 7/2008 | Okamoto | H02K 15/02 310/216.018 |
| 2011/0210635 A1 * | 9/2011 | Musselman | H02K 1/2733 310/156.21 |

FOREIGN PATENT DOCUMENTS

| | | | |
|---|---|---|---|
| JP | 07-107695 | A | 4/1995 |
| JP | 10-257723 | A | 9/1998 |
| JP | 2000-156952 | A | 6/2000 |
| JP | 2000-188838 | A | 7/2000 |
| JP | 2002-010545 | A | 1/2002 |
| JP | 2003-111324 | A | 4/2003 |
| JP | 2004-023937 | A | 1/2004 |
| JP | 2007-221866 | A | 8/2007 |
| JP | 4246136 | B2 | 1/2009 |
| JP | 2010-220473 | A | 9/2010 |
| JP | 2010-233432 | A | 10/2010 |

OTHER PUBLICATIONS

International Search Report of the International Searching Authority mailed Jan. 31, 2012 for the corresponding international application No. PCT/JP2012/050209 (with English translation).

European Extended Search Report (EESR) mailed Apr. 23, 2014 in the corresponding EU application No. 11837767.0 (English translation).

Office Action dated Jan. 22, 2015 issued in corresponding CN patent application No. 201280005653.8 (and partial English translation).

* cited by examiner

A-A SECTIONAL VIEW

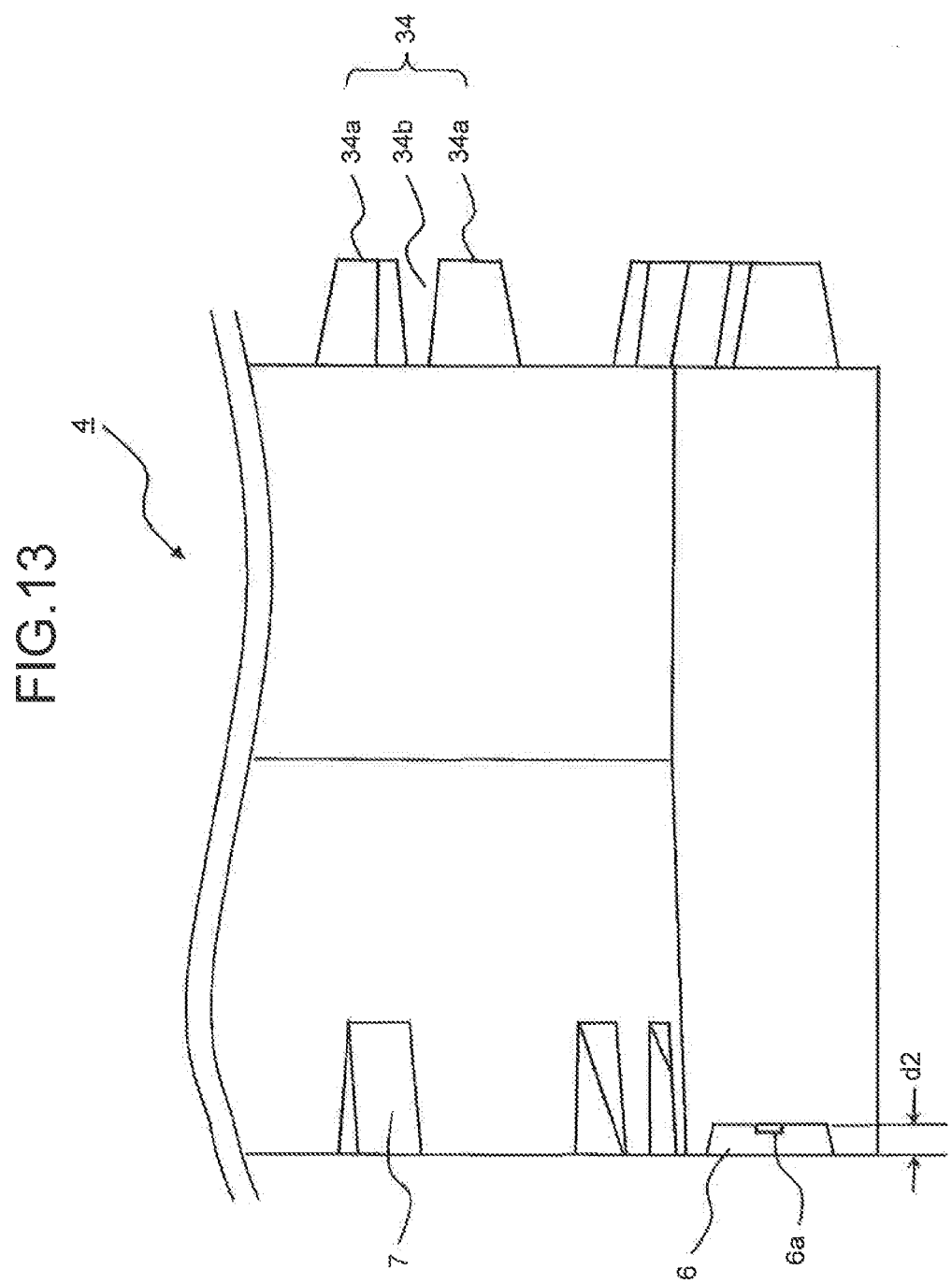

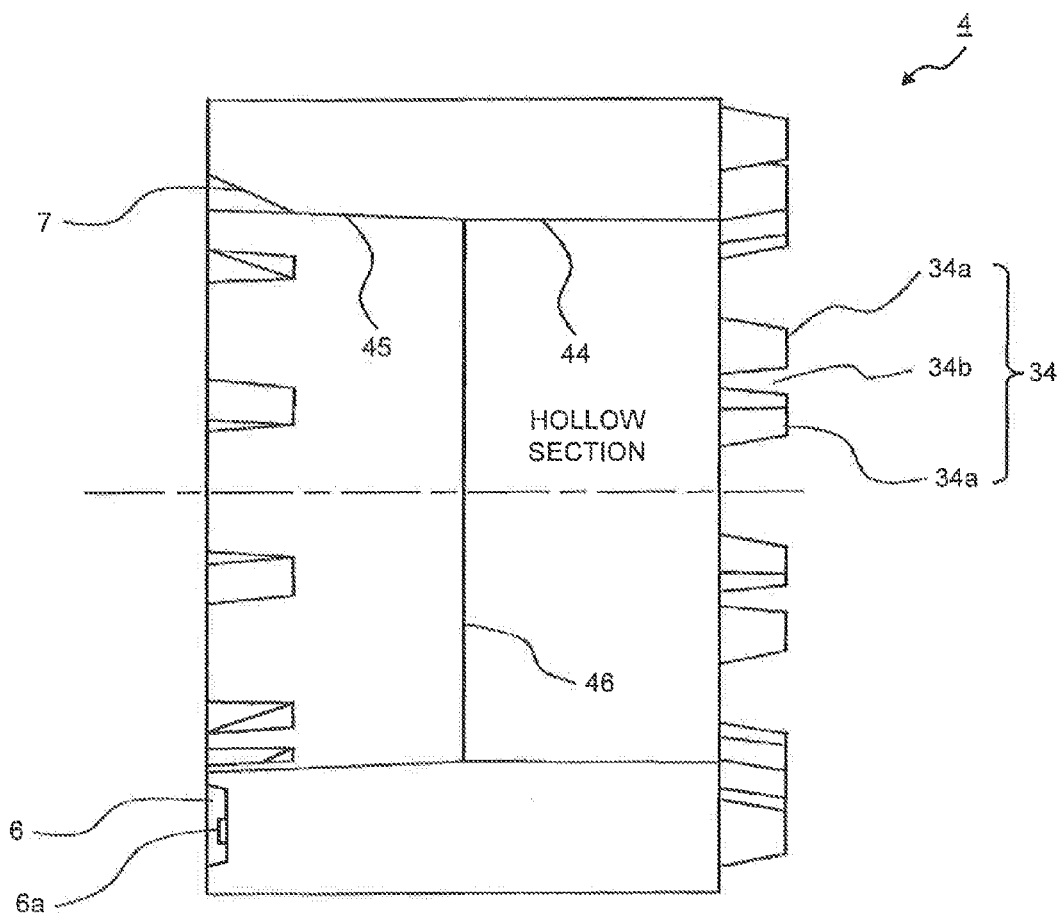

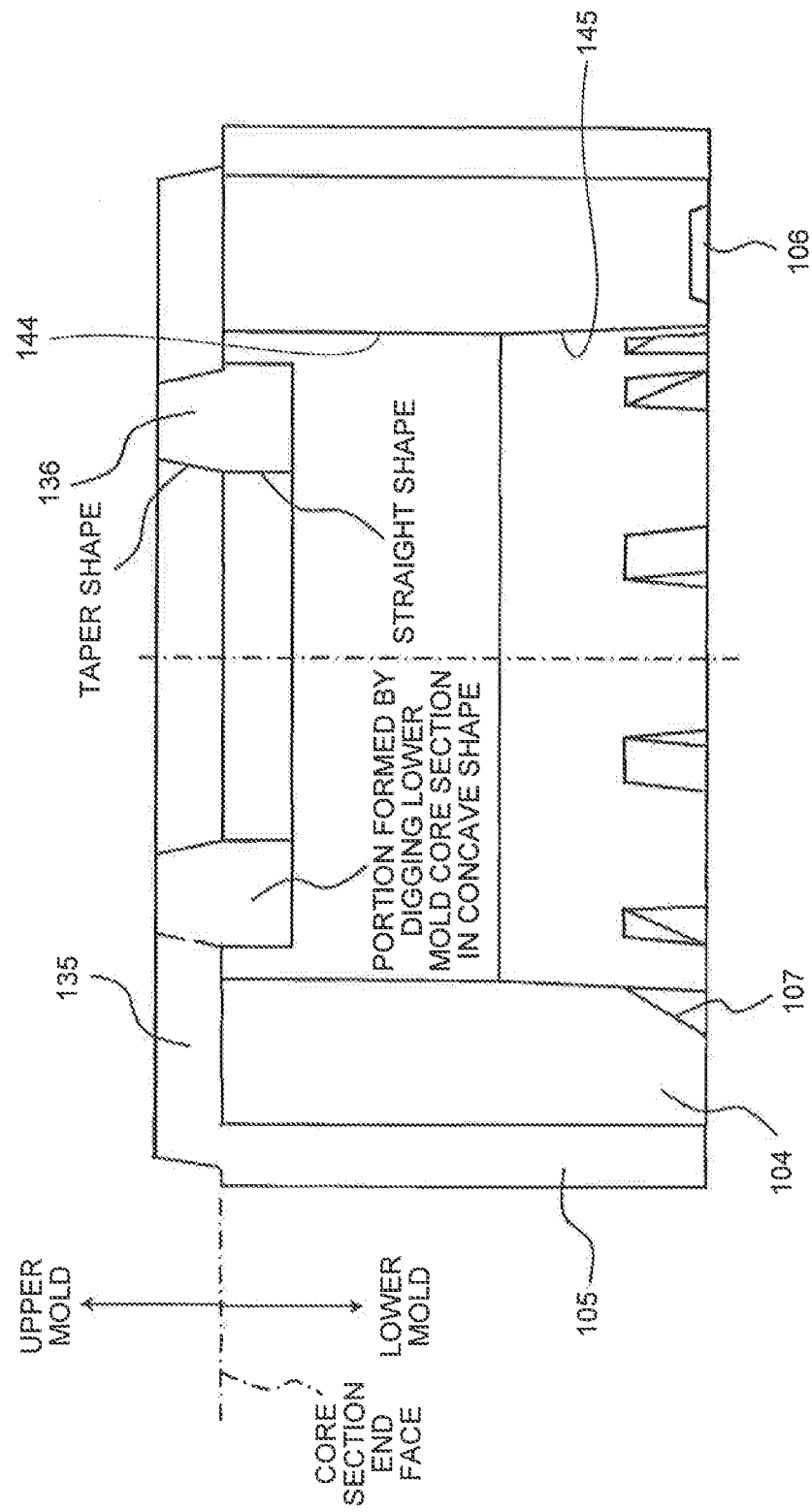

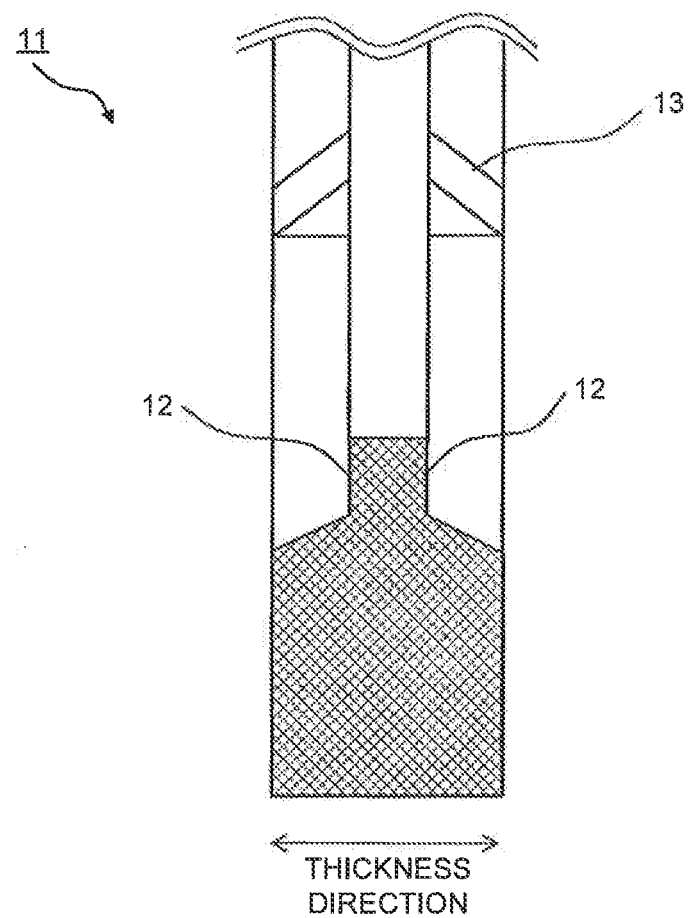

ROTOR OF ELECTRIC MOTOR, MOLD MOTOR, AIR CONDITIONER, AND METHOD OF MANUFACTURING THE MOLD MOTOR

CROSS REFERENCE TO RELATED APPLICATION

This application is a U.S. national stage application of International Patent Application No. PCT/JP2012/050209 filed on Jan. 6, 2012, and claims priority to, and incorporates by reference, Japanese Patent Application No. 2011-008203 filed on Jan. 18, 2011.

TECHNICAL FIELD

The present invention relates to a rotor of an electric motor assembled to a long or large-diameter shaft. The present invention relates to a mold motor in which the rotor of the electric motor is used. The present invention relates to an air conditioner in which the mold motor is mounted on a blower. Further, the present invention relates to a method of manufacturing the mold motor in which the rotor of the electric motor is used.

BACKGROUND

It is proposed to set a cylindrical boss in a permanent magnet and fix a shaft to the boss to configure a rotor of an electric motor. The permanent magnet and the boss can be simultaneously assembled during injection molding of the permanent magnet by injection-molding a ferrite resin magnet or the like to form the permanent magnet. Therefore, a reduction in assembly man-hours can be attained. When shapes, lengths, and the like of shafts are different, it is possible to handle the shafts using the permanent magnet molded together with the boss by using one kind of mold. Therefore, there is an effect that improves productivity (see, for example, Patent Literature 1).

To make it possible to prevent an electric current from flowing to the roller bearing provided between the rotating shaft and the motor case and thereby to prevent electrolytic corrosion from occurring in the roller bearing and to obtain a rotating-electric machine that is simple in configuration and easy to assemble, it is proposed to arrange an insulation sleeve in the outer circumference of the roller bearing (see, for example, Patent Literature 2).

CITATION LIST

Patent Literature

Patent Literature 1: Japanese Patent Application Laid-open No. 2000-188838
Patent Literature 2: Japanese Patent Application Laid-open No. 2000-156952

TECHNICAL PROBLEM

However, in the rotor of the dynamo-electric machine described in Patent Literature 1, because the shaft is press-fit into the boss and fixed, the outer circumference of the shaft is scratched by the press-fitting process. This affects, for example, accuracy in assembling the roller bearing to the shaft. Therefore, for example, when the shaft is long, there is a problem in that the rotor cannot be easily attached to the shaft and cannot be adapted to any specification changes.

In the dynamo-electric machine described in Patent Literature 2, an electric current is prevented from flowing to the roller bearing by arranging the insulation sleeve in the outer circumference of the roller bearing. However, there is a problem in that the electric current still flows to the bearing because of stray capacitance between the bracket and the outer ring of the roller bearing.

SUMMARY

The present invention has been devised in view of the above and provides a rotor of an electric motor, a mold motor, an air conditioner, and a method of manufacturing the mold motor that, with regard to attaching the rotor to a shaft, enable the rotor to be easily attached to the shaft even if the shaft is long, enable the rotor to be attached to an arbitrary position of the shaft, and can be easily adapted to changes in specifications.

Further, the present invention provides a rotor of an electric motor, a mold motor, an air conditioner, and a method of manufacturing the mold motor having resistance to high-frequency electrolytic corrosion.

In order to solve the aforementioned problems, a rotor of an electric motor is configured in such a manner as to include: a rotor resin assembly; a shaft; and a bearing, wherein the rotor resin assembly includes: a rotor magnet including a substantially cylindrical yoke molded from thermoplastic resin containing a soft magnetic material or ferrite and a resin magnet integrally formed in the outer circumference of the yoke; a position detection magnet arranged at one end in an axial direction of the rotor magnet; and a substantially doughnut-like rotor core arranged in an inner circumference of the rotor magnet and formed by laminating a predetermined number of electromagnetic steel plates, wherein the rotor magnet, the position detection magnet, and the rotor core are integrally formed by resin, and the shaft is inserted into the inner diameter section of the rotor core, and the rotor resin assembly is caulked by a jig to form a recess in the vicinity of inner diameter sections of both end faces of the rotor core and assembled to the shaft.

In the rotor of the electric motor according to the present invention, with the configuration explained above, it is possible to arbitrarily select the length of the shaft and the position of the rotor resin assembly. Therefore, it is possible to obtain a rotor of an electric motor that can be easily adapted to changes in specifications.

BRIEF DESCRIPTION OF DRAWINGS

FIG. 13 is a partially enlarged view of the yoke shown in FIG. 6B.

FIG. 14 is an enlarged view of the yoke shown in FIG. 6B.

FIG. 28 is an enlarged view of the rotor magnet shown in FIG. 27C.

FIG. 35 is a partially enlarged view of the position detection magnet.

DETAILED DESCRIPTION

Embodiment
<Overview>

A rotor of an electric motor according to this embodiment is characterized in that the length (or the diameter) of a shaft and the position of the rotor in the shaft can be arbitrarily selected. For example, in a rotor of an electric motor in which a load (a fan, etc.) is attached to only one end of a shaft, the shaft is short and the position of the rotor in the shaft is predetermined. Therefore, it is possible to integrally mold a rotor magnet, a position detection magnet, the shaft, and the like using resin.

However, if the shaft is long, when integrally molding the rotor magnet, the position detection magnet, the shaft, and the like using resin, the length of the shaft is limited by the mold opening amount in resin molding and cannot be set to an arbitrary length.

Therefore, when the position of the rotor in the shaft changes, molds for respective positions are necessary.

Therefore, in this embodiment, besides the rotor magnet and the position detection magnet, a short rotor core for attachment to the shaft is prepared. The rotor magnet, the position detection magnet, and the rotor core (arranged in the inner circumference of the rotor magnet) are integrally molded using thermoplastic resin. Thereafter, the rotor core is caulked and assembled to the shaft.

Consequently, the rotor is released from the limitations that, for example, the length of the shaft is limited by the mold opening amount at the time of resin molding and that, when the position of the rotor in the shaft changes, molds for respective positions are made necessary.

First, a rotor resin assembly 100 (obtained by integrally molding the rotor magnet, the position detection magnet, and the rotor core using thermoplastic resin and not yet attached to the shaft) is explained.

Figure 1:
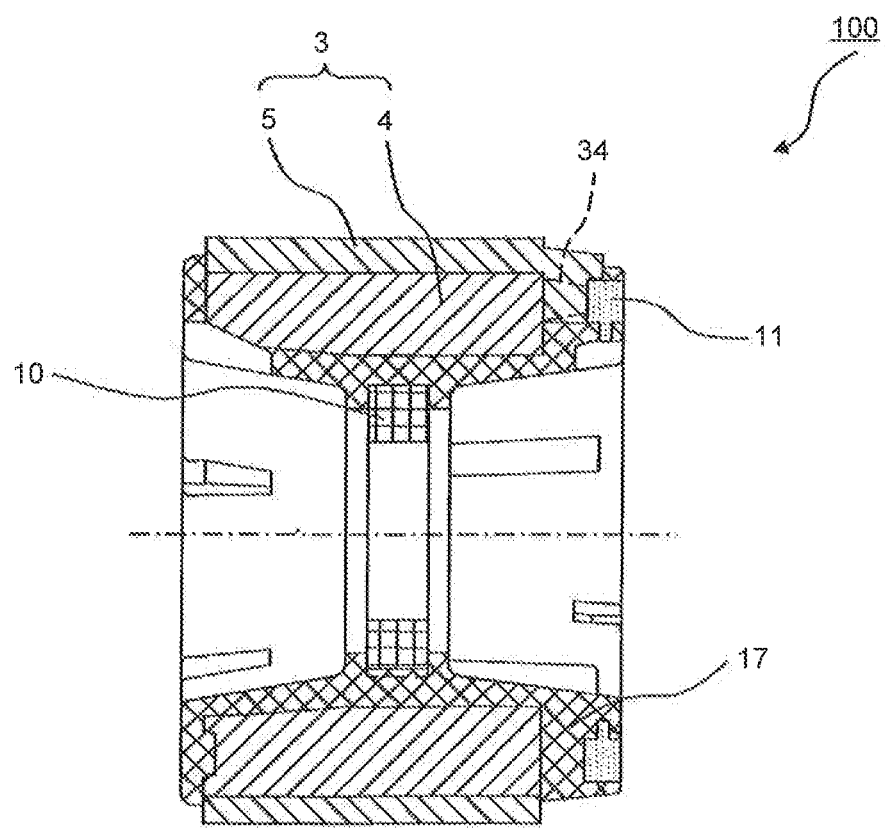
FIG. 1 is a sectional view of a rotor resin assembly according to an embodiment of the present invention.
Figure 2:
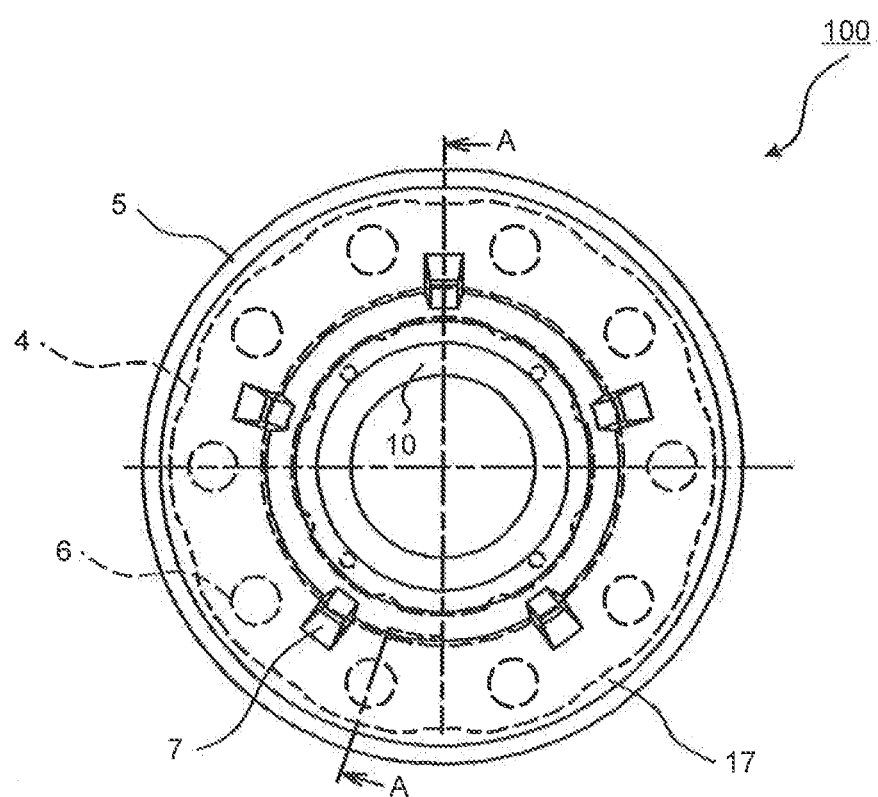
FIG. 2 is a left side view of the rotor resin assembly.
Figure 3:
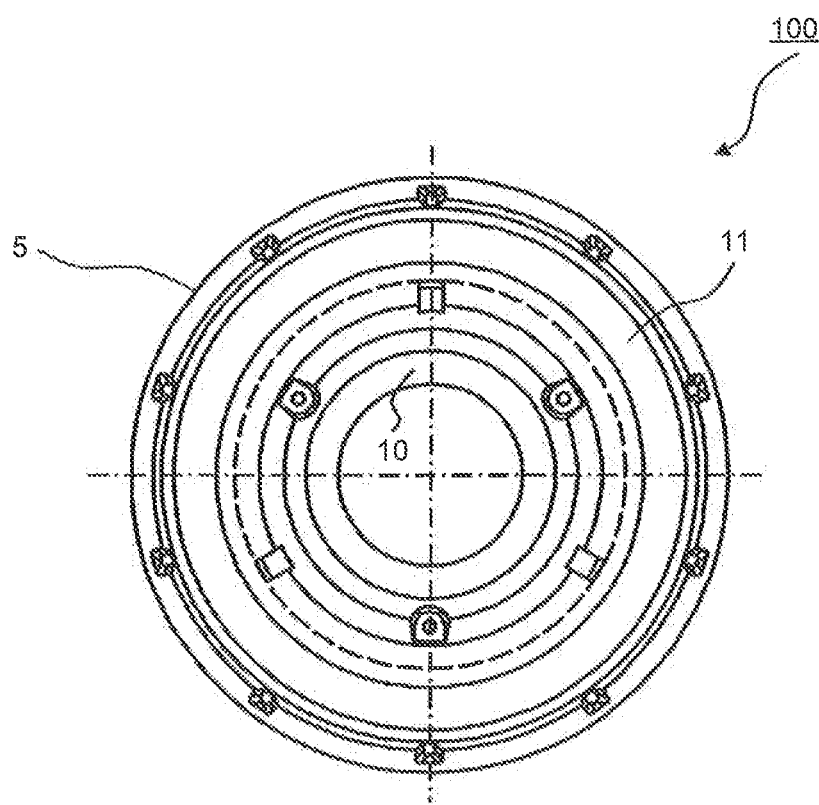
FIG. 3 is a right side view of the rotor resin assembly.
Figure 4:
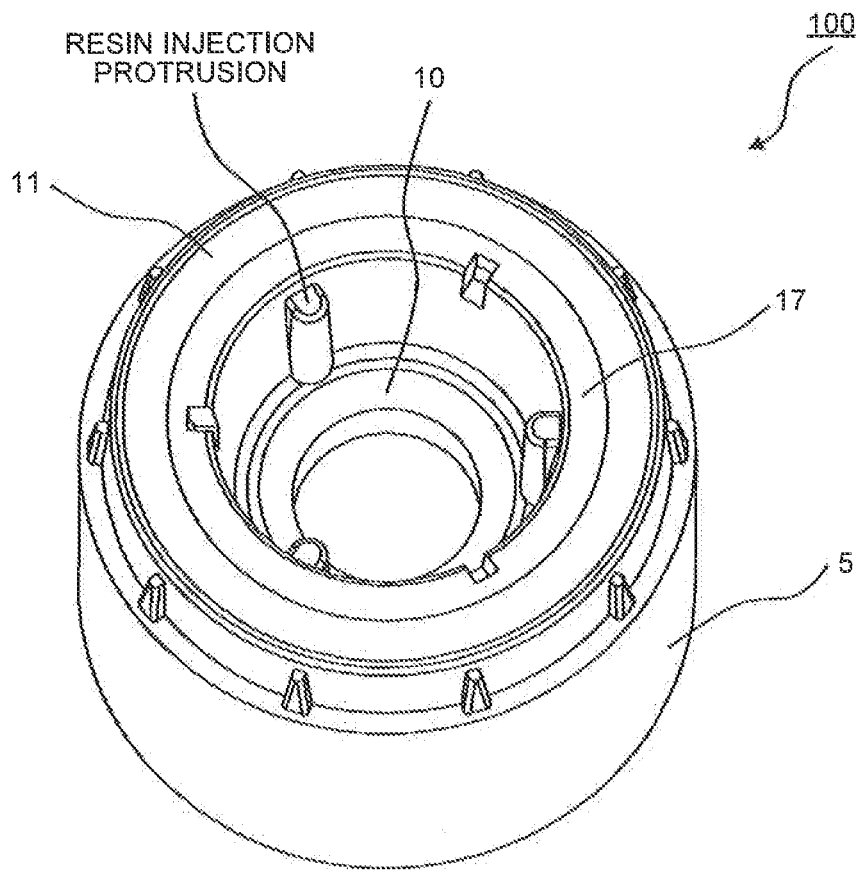
FIG. 4 is a perspective view of the rotor resin assembly viewed from a position detection magnet side.
Figure 5:
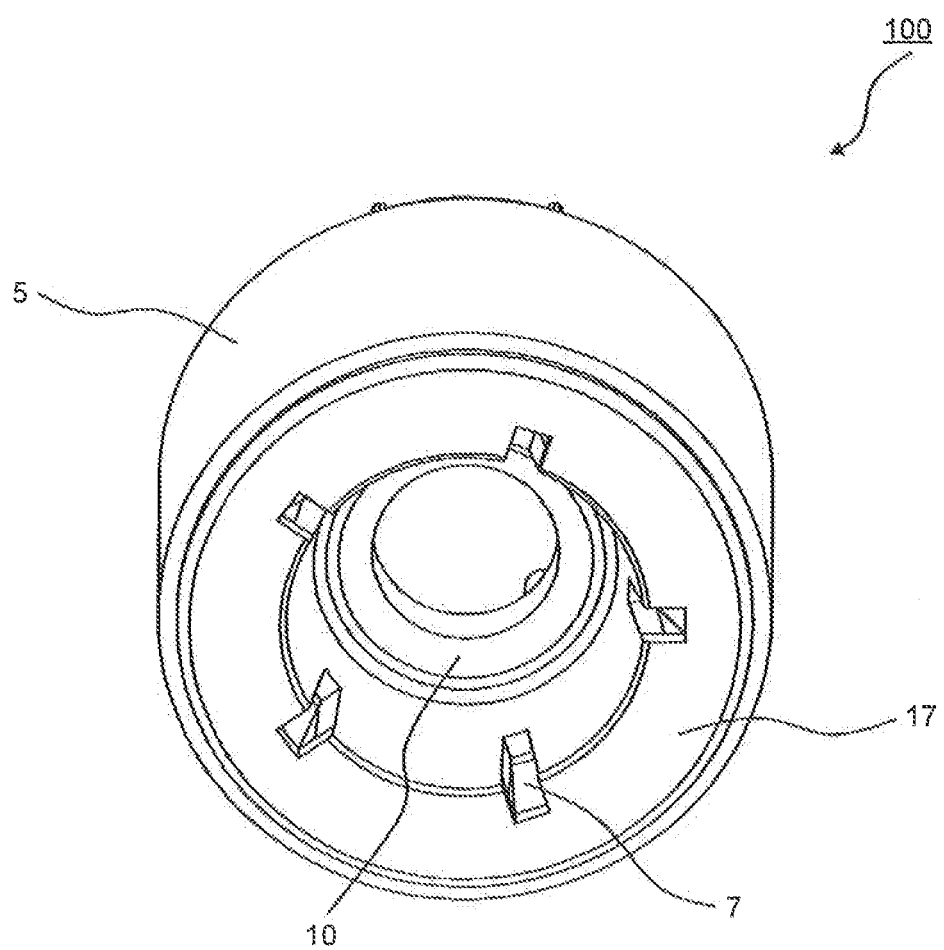
FIG. 5 is a perspective view of the rotor resin assembly viewed from the opposite side of the position detection magnet.

FIG. 1 is a sectional view of the rotor resin assembly 100 according to the embodiment of the present invention. FIG. 2 is a left side view of the rotor resin assembly 100. FIG. 3 is a right side view of the rotor resin assembly 100. FIG. 4 is a perspective view of the rotor resin assembly 100 viewed from a position detection magnet 11 side. FIG. 5 is a perspective view of the rotor resin assembly 100 viewed from the opposite side of the position detection magnet 11.

The rotor resin assembly 100 shown in FIGS. 1 to 5 is obtained by integrally molding a rotor magnet 3 (obtained by injection-molding a resin magnet 5 on a yoke 4), the position detection magnet 11, and a rotor core 10 using thermoplastic resin (a resin section 17).

In a cored bar section of a lower mold set in a not-shown vertical molding machine, the rotor core 10 and the rotor magnet 3 are inserted and assembled from an end face on a side including a gate (explained below) of the yoke 4. In the rotor resin assembly 100, coaxiality of protrusions (protrusions provided in the cored bar section of the lower mold) fit in cutouts 7 (see FIG. 5) provided on a gate side end face of the yoke 4 of the rotor magnet 3 and a cylindrical section provided in the cored bar section of the lower mold and fit in the inner diameter section of the rotor core 10 is secured. Consequently, when the mold is tightened, the protrusions of the cored bar section are pressed against the cutouts 7 having a taper shape and coaxiality of the outer circumference of the resin magnet 5 and a shaft (explained below) is secured.

The rotor core 10 is set in substantially the center of the rotor magnet 3 by the mold cored bar section. Consequently, the rotor core 10 is set in the position of the center of gravity of the rotor magnet 3 and thus a reduction in noise and a reduction in vibration of the electric motor can be attained.

Further, after the position detection magnet 11 is set on pedestals 34 (see FIG. 1; details are explained below) of the rotor magnet 3 in the mold, the upper mold is closed and thermoplastic resin such as PBT (polybutylene terephthalate) is injection-molded. When the upper mold is closed, protrusions (not shown in the figure) provided in the upper mold and having coaxiality thereof secured are fit in the inner circumference of the position detection magnet 11. Consequently, coaxiality of the position detection magnet 11 is also secured. Therefore, it is possible to attain improvement of the quality in manufacturing.

Figure 6A:
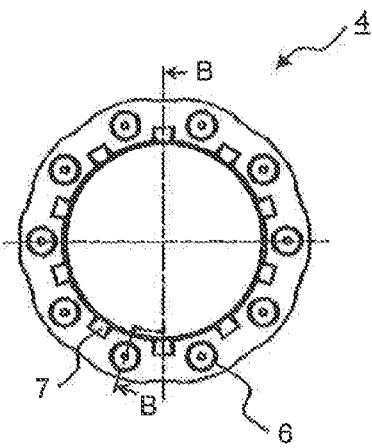
FIG. 6A is a side view of a yoke viewed from a recess side.
Figure 6B:
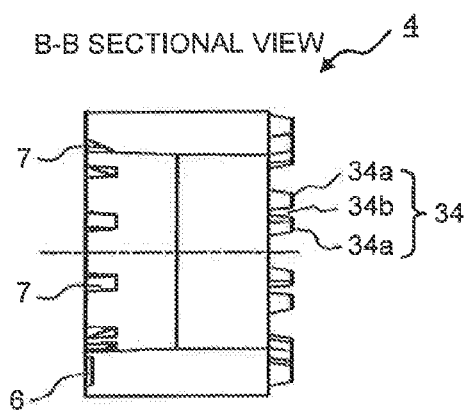
FIG. 6B is a B-B sectional view of FIG. 6A.
Figure 6C:
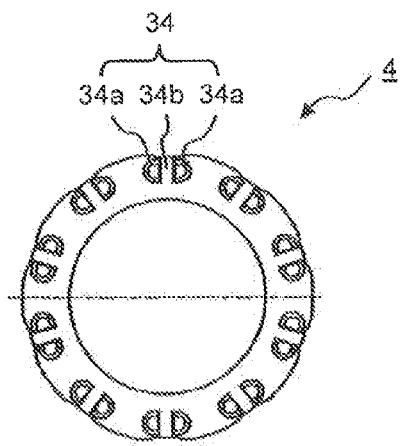
FIG. 6C is a side view of the yoke viewed from the position detection magnet side.
Figure 7:
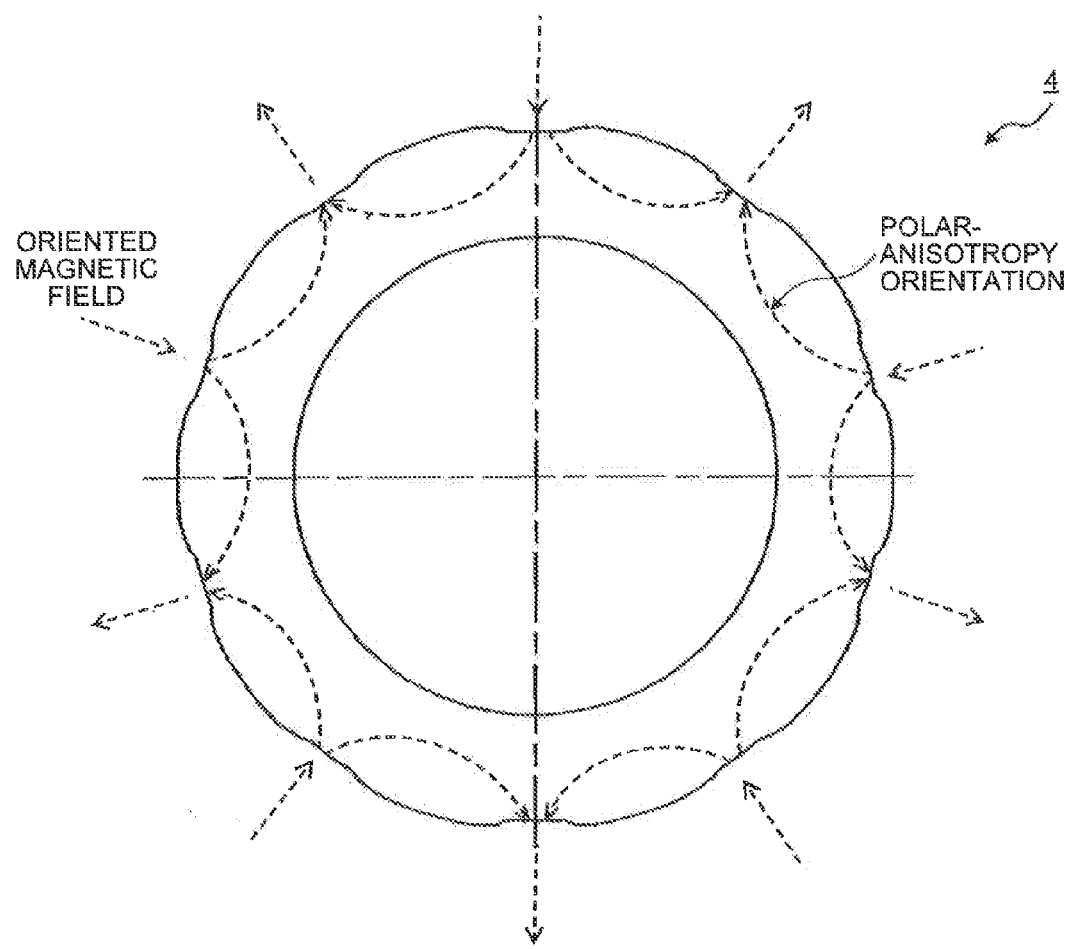
FIG. 7 is a diagram of a state in which the yoke is polar-anisotropically oriented by an oriented magnetic field on the outer side.
Figure 8:
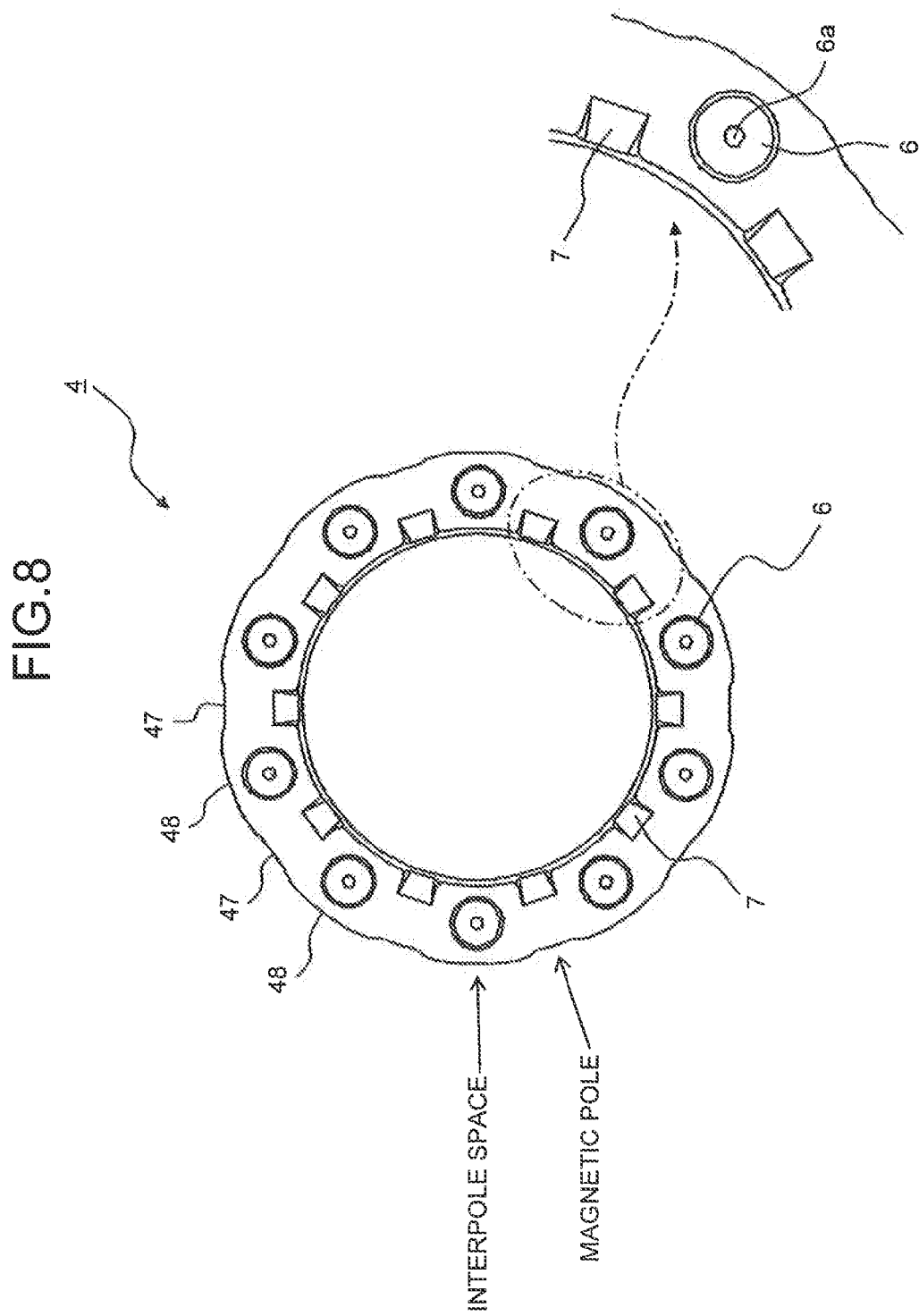
FIG. 8 is an enlarged view of the yoke shown in FIG. 6A.
Figure 9:
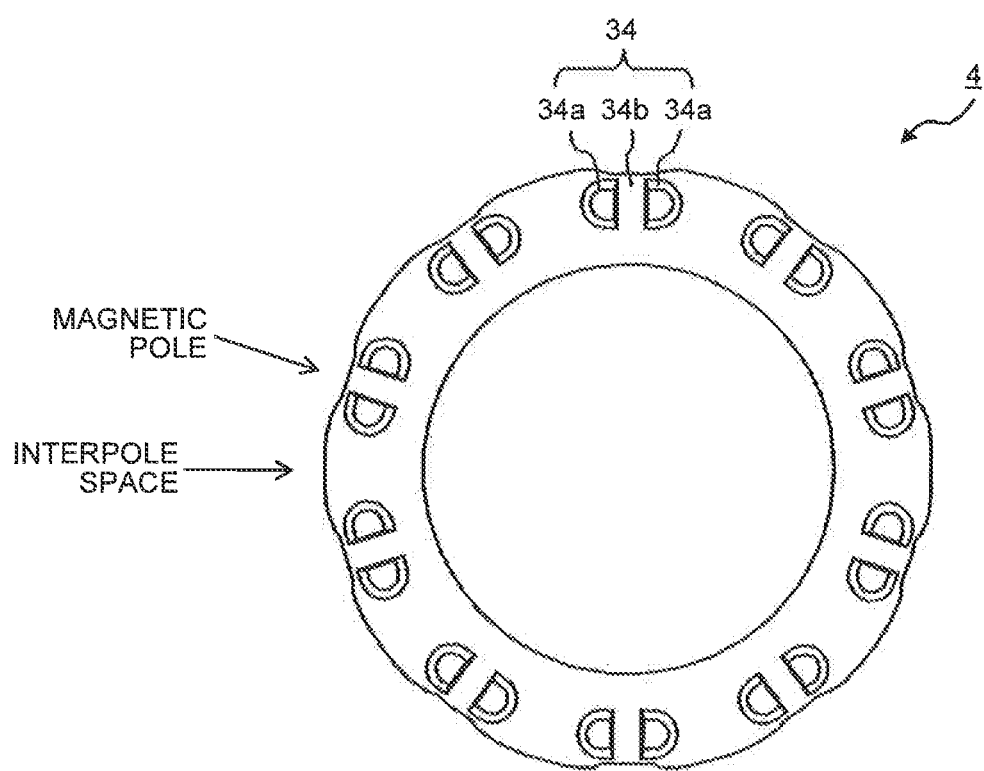
FIG. 9 is an enlarged view of the yoke shown in FIG. 6C.
Figure 10:
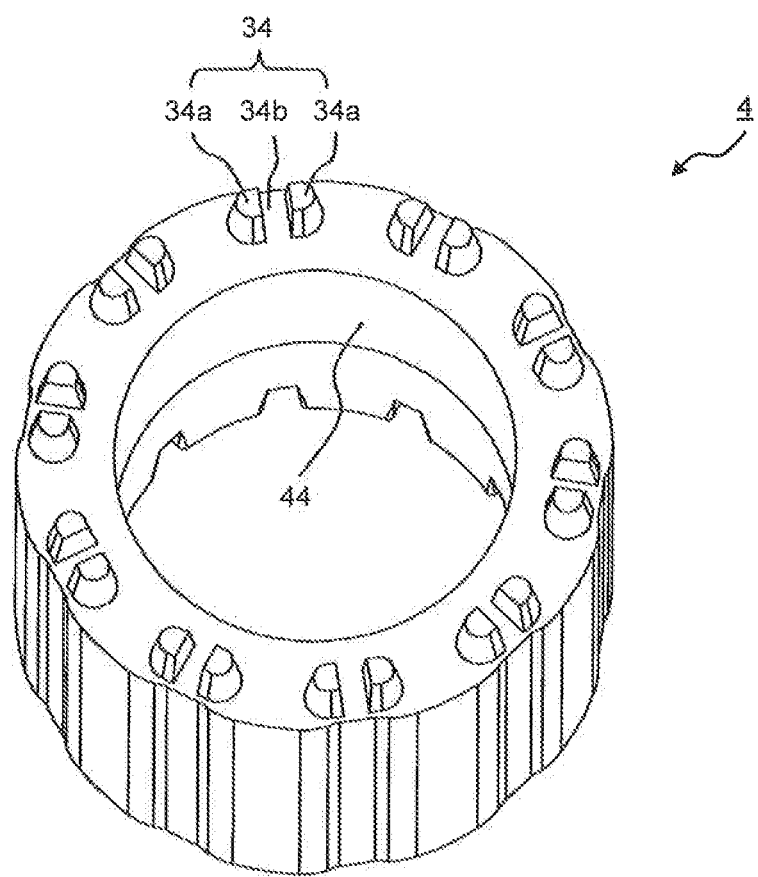
FIG. 10 is a perspective view of the yoke viewed from pedestals.
Figure 11:
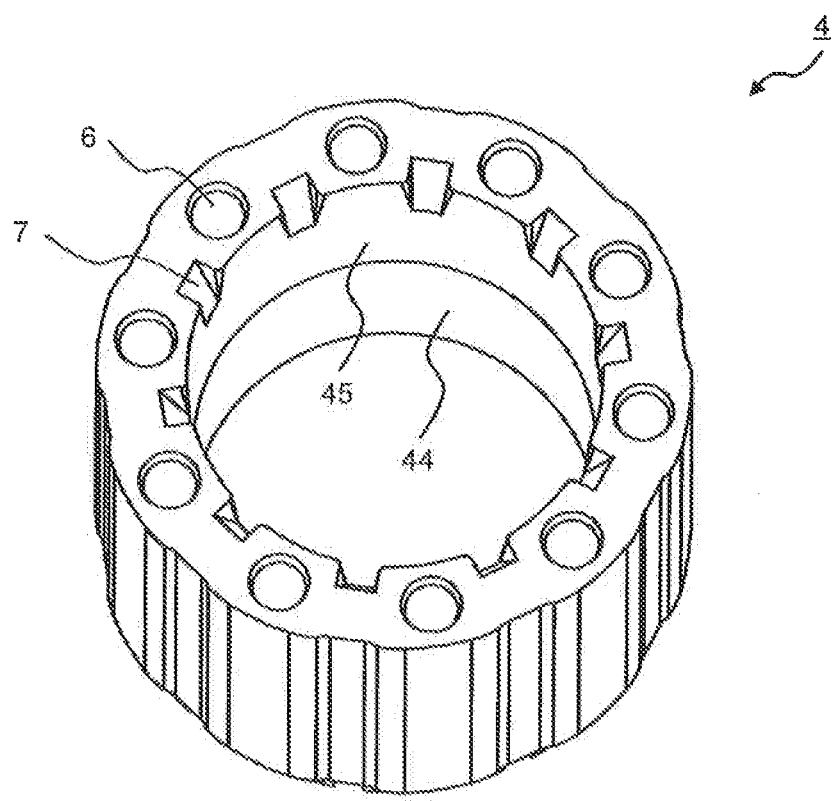
FIG. 11 is a perspective view of the yoke viewed from the recesses.
Figure 12:
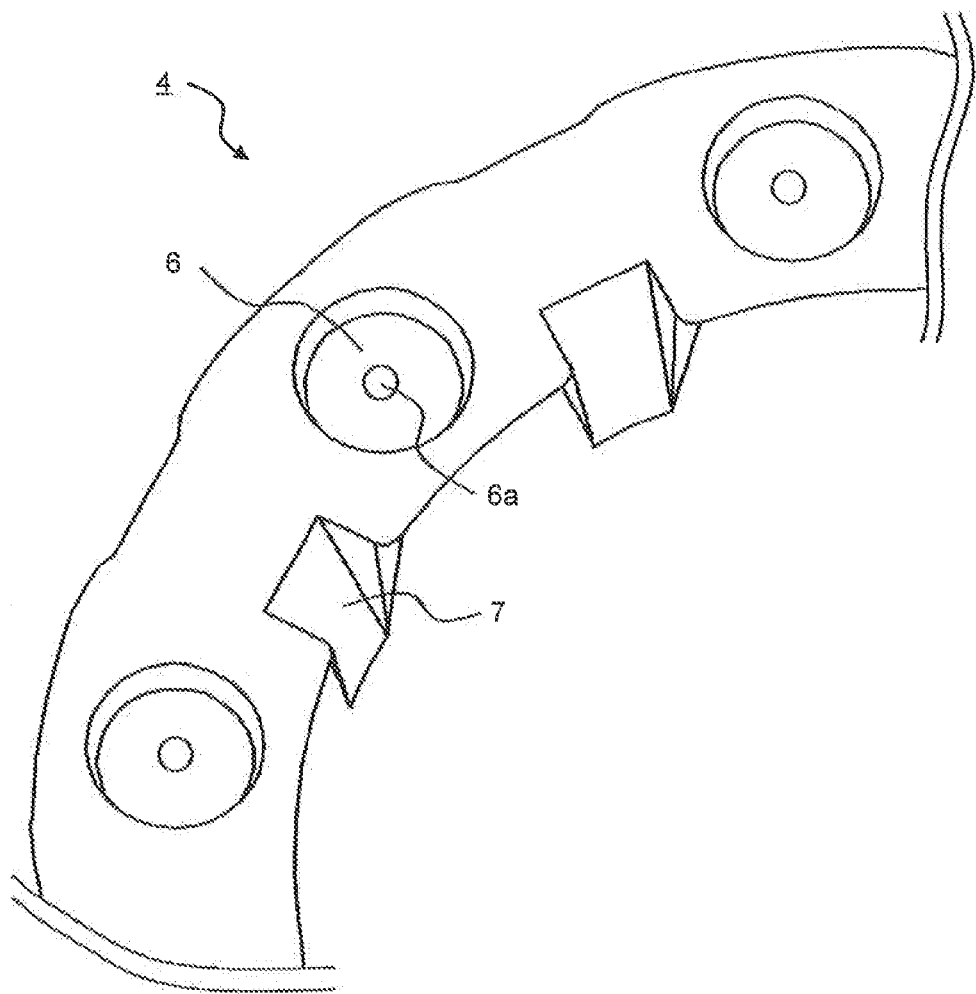
FIG. 12 is a partially enlarged view of the yoke shown in FIG. 11.

FIG. 6A is a side view of the yoke 4 viewed from recesses 6 side. FIG. 6B is a B-B sectional view of FIG. 6A. FIG. 6C is a side view of the yoke 4 viewed from the position detection magnet 11 side. FIG. 7 is a diagram of a state in which the yoke 4 is polar-anisotropically oriented by an oriented magnetic field on the outer side. FIG. 8 is an enlarged view of the yoke 4 shown in FIG. 6A. FIG. 9 is an enlarged view of the yoke 4 shown in FIG. 6C. FIG. 10 is a perspective view of the yoke 4 viewed from the pedestals 34. FIG. 11 is a perspective view of the yoke 4 viewed from the recesses 6. FIG. 12 is a partially enlarged view of the yoke 4 shown in FIG. 11. FIG. 13 is a partially enlarged view of the yoke 4 shown in FIG. 6B. FIG. 14 is an enlarged view of the yoke 4 shown in FIG. 6B.

The yoke 4 configuring the rotor magnet 3 is explained in detail with reference to FIGS. 6 to 14.

The yoke 4 provided on the inner side of the rotor magnet 3 is obtained by injection molding thermoplastic resin containing a soft magnetic material or ferrite.

When the yoke 4 is molded, a strong magnet is arranged to provide an oriented magnetic field on the outer side of the section of the mold forming the outer circumference of the yoke 4. Consequently, the soft magnetic material or the ferrite contained in the yoke 4 is anisotropically oriented with respect to a polar direction.

As shown in FIG. 7, the yoke 4 is anisotropically oriented with respect to the polar direction by the oriented magnetic field on the outer side of the section of the mold forming the outer circumference of the yoke 4.

In FIG. 7, the pedestals 34 (or the recesses 6 and the cutouts 7) are omitted to make it easy to view the figure.

As shown in FIG. 6, the yoke 4 is formed in a substantially cylindrical shape. In the outer circumference of the yoke 4, as shown in FIG. 8, concave sections 47 and convex sections 48 are alternately arranged. The number of each of the concave sections 47 and the convex sections 48 is ten.

The concave sections 47 in the outer circumference of the yoke 4 correspond (are opposed) to magnetic poles of the resin magnet 5.

The convex sections 48 in the outer circumference of the yoke 4 correspond (are opposed) to interpole spaces of the resin magnet 5.

A plurality (the number of magnetic poles) of the recesses 6 (e.g., circular) having axial direction depth d2 (see FIG. 13) are formed at substantially equal intervals in the circumferential direction on one axial direction end face of the yoke 4. The recesses 6 correspond (are opposed) to the convex sections 48 in the outer circumference of the yoke 4 (the interpole space of the resin magnet 5).

Because the rotor of the electric motor includes ten poles, ten recesses 6 are formed.

The thermoplastic resin containing the soft magnetic material or the ferrite is injected into the yoke 4 from the respective recesses 6. Therefore, a gate treatment trace 6a (see FIG. 13) of a gate port for injecting the thermoplastic resin is left in the yoke 4 after the molding.

One reason for providing the recesses 6 is to prevent a projection of the gate treatment trace 6a (see FIG. 13) from projecting from an axial direction end face of the yoke 4. Therefore, the axial direction depth d2 (see FIG. 13) of the recesses 6 is set to a dimension for preventing the projection of the gate treatment trace 6a from projecting from the axial direction end face of the yoke 4.

Gate ports (left as gate treatment traces 6a) for injecting the thermoplastic resin are provided as many as the magnetic poles (ten). Consequently, injection states during injection of the thermoplastic resin containing the soft magnetic material or the ferrite are uniformalized with respect to the magnetic poles. States of orientation can also be uniformalized. Therefore, it is possible to attain improvement of the quality of the yoke 4.

Further, as shown in FIG. 8, the gate ports (left as the gate treatment traces 6a) are provided in thick sections of the interpole space. Consequently, the gate ports are present in positions optimum for the flow of the thermoplastic resin containing the soft magnetic material or the ferrite. Therefore, it is possible to attain an improvement of the quality.

The gate ports (left as the gate treatment traces 6a) are provided in the centers of the recesses 6 cut out in a round shape (a circular shape) from one axial direction end face of the yoke 4 and at predetermined length (the axial direction depth d2 (see FIG. 13)) to the inner side in the axial direction. Consequently, it is possible to prevent burrs remaining in the gate treatment traces 6a from being exposed from the end face. Therefore, the gate ports are prevented from hindering positioning during the manufacturing process or wastes is reduced. Therefore, it is possible to attain an improvement of the quality in manufacturing.

In FIG. 14, a hollow section of the yoke 4 is a taper section 45 from an axial direction end face on a side where the recesses 6 are provided to a substantially center position in the axial direction (a mold matching surface trace 46 during molding of the yoke 4). The taper section 45 is a taper shape gradually narrowing to the inner side from the axial direction end face of the side where the recesses 6 are provided.

A straight section 44 (see FIG. 14) having a fixed diameter is formed from the mold matching surface trace 46 of the taper section 45 to an axial direction end face on the pedestal 34 side.

The taper section 45 (see FIG. 14) of the hollow section of the yoke 4 is formed by a mold on a fixed side. The straight section 44 of the hollow section of the yoke 4 is formed by a mold on a movable side.

Because the taper section 45 (see FIG. 14) of the hollow section of the yoke 4 is formed by the mold on the fixed side, resistance of a product (the yoke 4) sticking to the fixed side mold during mold opening is reduced.

Because the straight section 44 (see FIG. 14) of the hollow section of the yoke 4 is formed by the mold on the movable side, resistance to the product (the yoke 4) sticking to the movable side mold during mold opening is generated, and thus the fixed side mold is smoothly separated from the product (the yoke 4). Therefore, it is possible to attain an improvement of the quality in manufacturing.

As shown in FIGS. 6A and 8, on an axial direction end face of the yoke 4 on the side where the recesses 6 are provided, the taper-like cutouts 7 reaching the taper section 45 of the hollow section are formed at predetermined width in magnetic pole positions among the recesses 6. The number of the taper-like cutouts 7 is ten.

The respective taper-like cutouts 7 are formed such that coaxiality of the straight section 44 of the hollow section (see FIG. 14) and the outer circumference of the yoke 4 is secured.

The taper-like cutouts 7 are held by the mold such that coaxiality of the straight section 44 and the outer circumference of the yoke 4 is secured when the resin magnet 5 is integrally molded with the yoke 4 by the resin magnet and when the rotor magnet 3 is integrally molded with a shaft 1 (explained below) by the resin section 17. Therefore, it is possible to secure the coaxiality and a phase and attain an improvement of the quality in manufacturing.

On an axial direction end face on the opposite side of the axial direction end face including the recesses 6 of the yoke 4, the pedestals 34 that separate the position detection magnet 11 from the end face of the yoke 4 by a predetermined distance are provided (see FIGS. 6B, 6C, and 9).

As shown in FIGS. 9 and 10, the positions in the circumferential direction of the pedestals 34 correspond (are opposed) to the magnetic poles. That is, ten pedestals 34 are formed at substantially equal intervals in the circumferential direction.

Each of the pedestals 34 is configured by two projecting sections 34a projecting in the axial direction to the outer side and an opening section 34b formed between the two projecting sections 34a.

The opening section 34b formed between the two projecting sections 34a included in the pedestal 34 is formed as a route for supplying a resin magnet when the resin magnet 5 is formed integrally with the yoke 4. The width of the opening section 34b is substantially the same as the width of runners (rib-like runners 35 explained below) that supply the resin magnet.

Figure 15A:
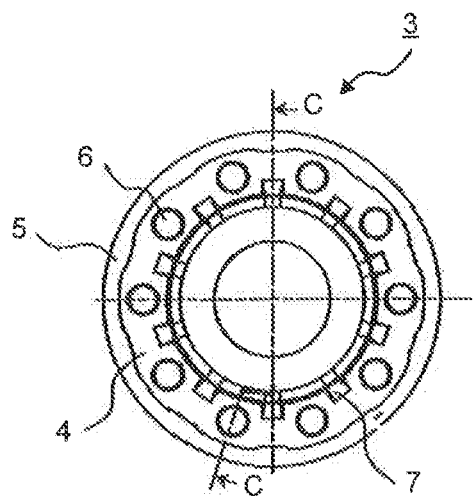
FIG. 15A is a side view of a rotor magnet, from which runners are not cut off yet, viewed from the recess side.
Figure 15B:
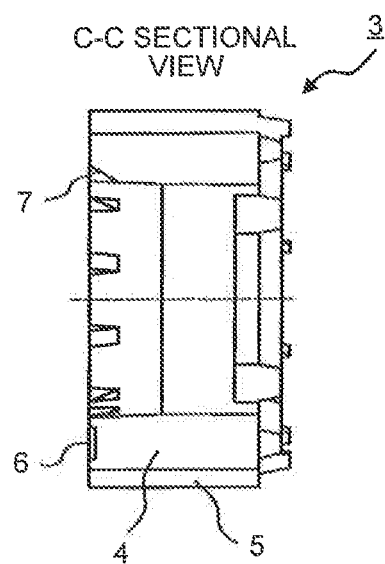
FIG. 15B is a C-C sectional view of FIG. 15A.
Figure 15C:
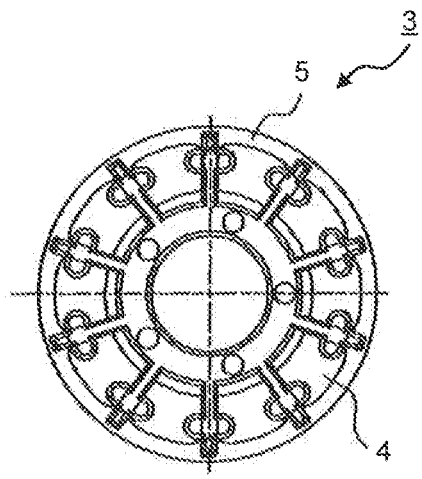
FIG. 15C is a side view of the rotor magnet, from which the runners are not cut off yet, viewed from the position detection magnet side.
Figure 16:
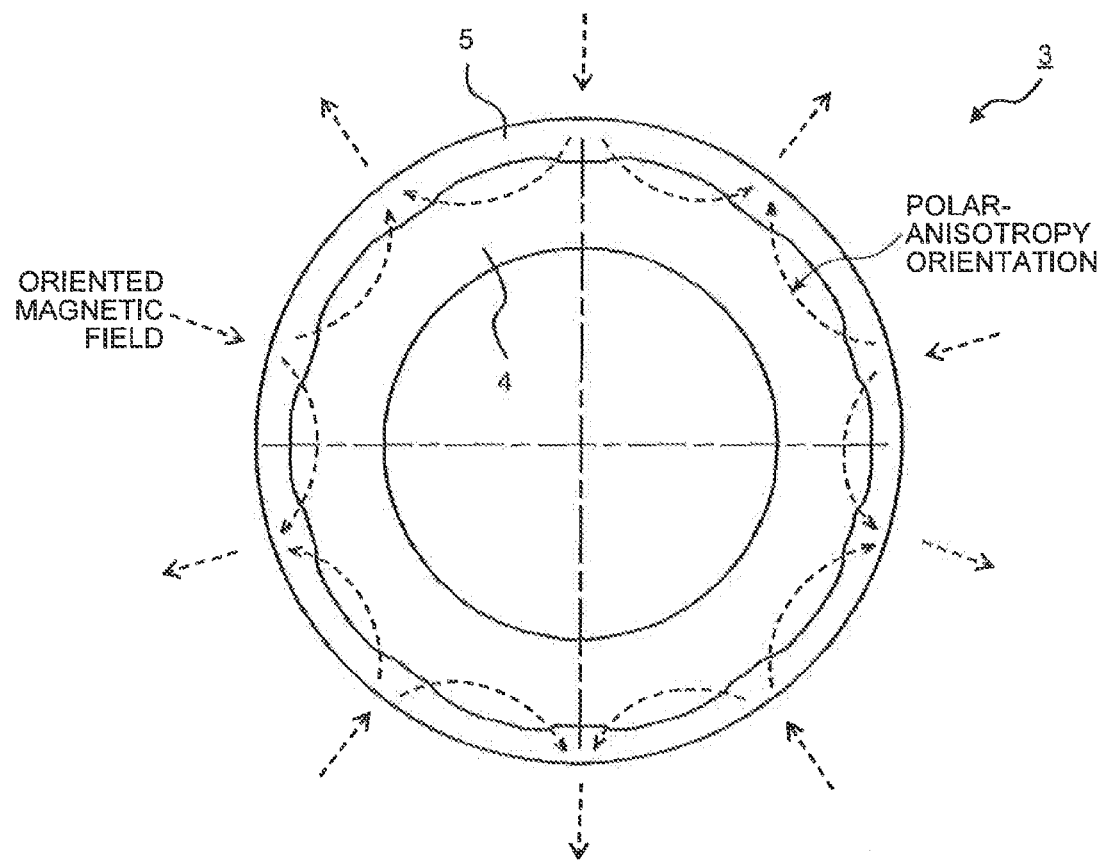
FIG. 16 is a diagram of a state in which the rotor magnet is polar-anisotropically oriented by an oriented magnetic field on the outer side.
Figure 17:
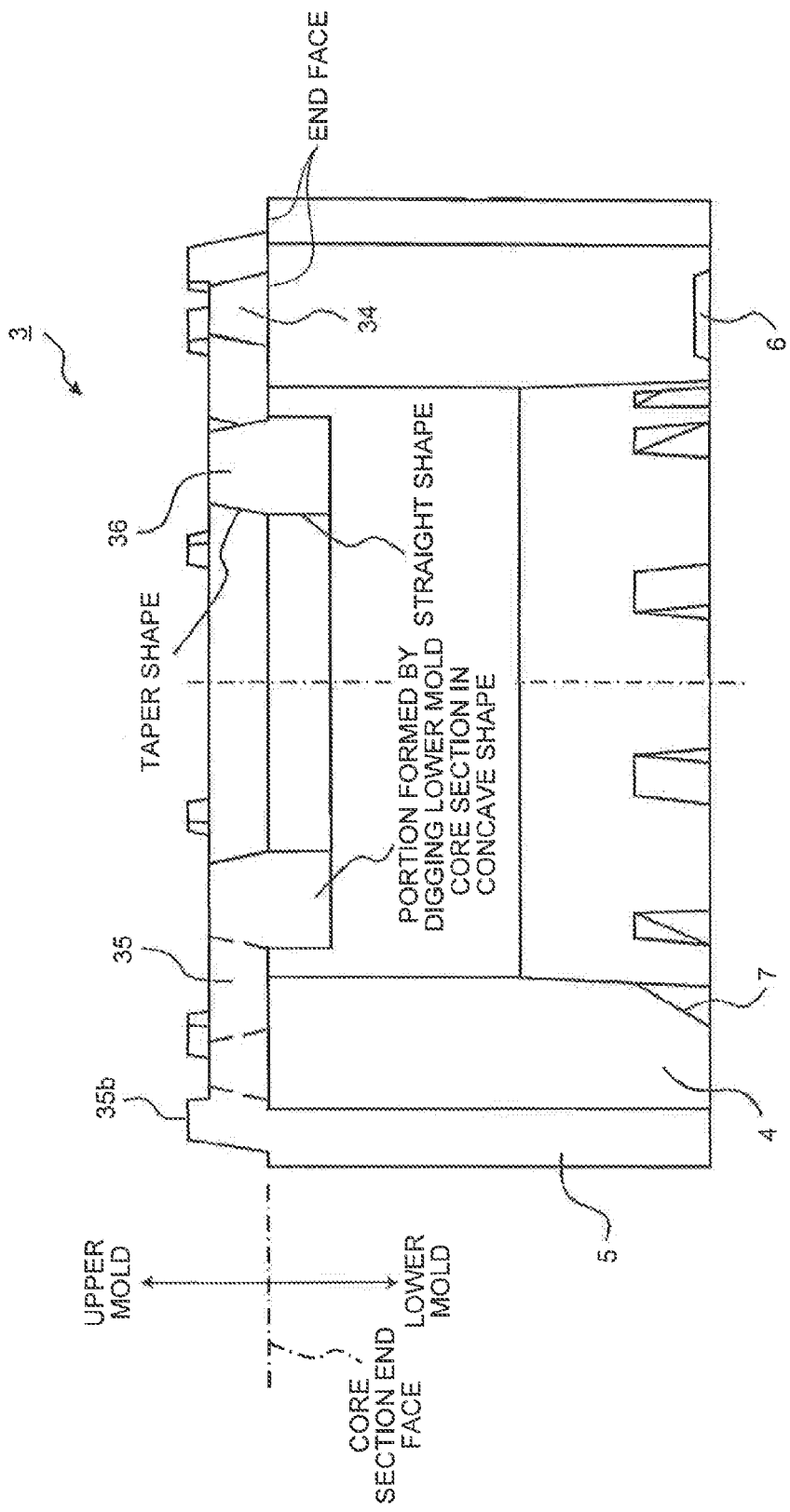
FIG. 17 is an enlarged view of the rotor magnet shown in FIG. 15B.
Figure 18:
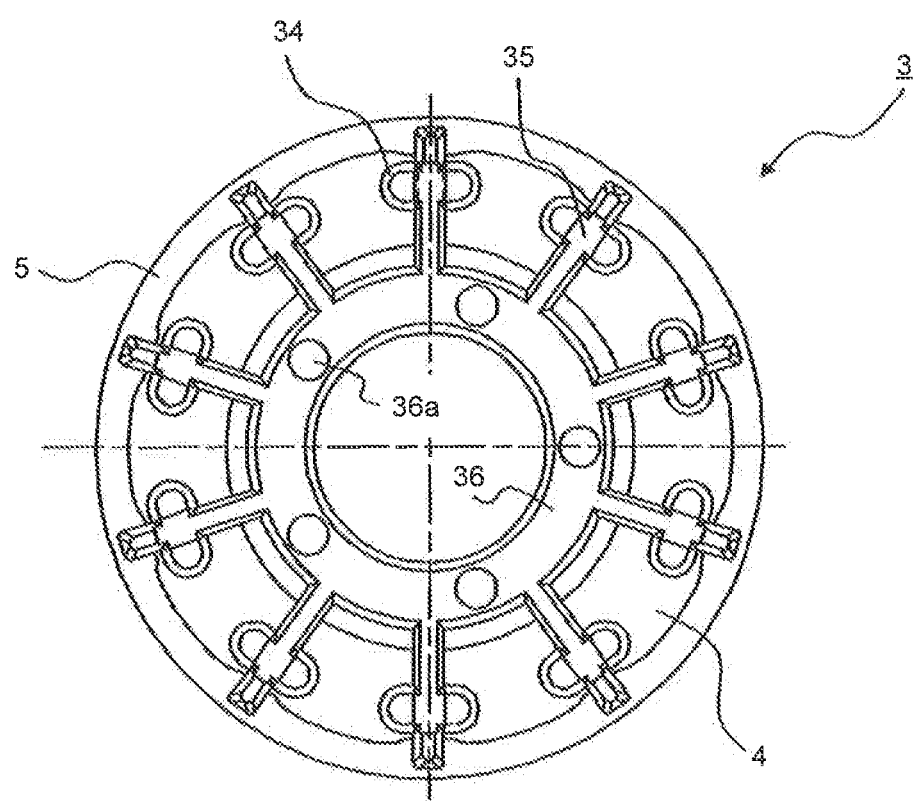
FIG. 18 is an enlarged view of the rotor magnet shown in FIG. 15C.
Figure 19:
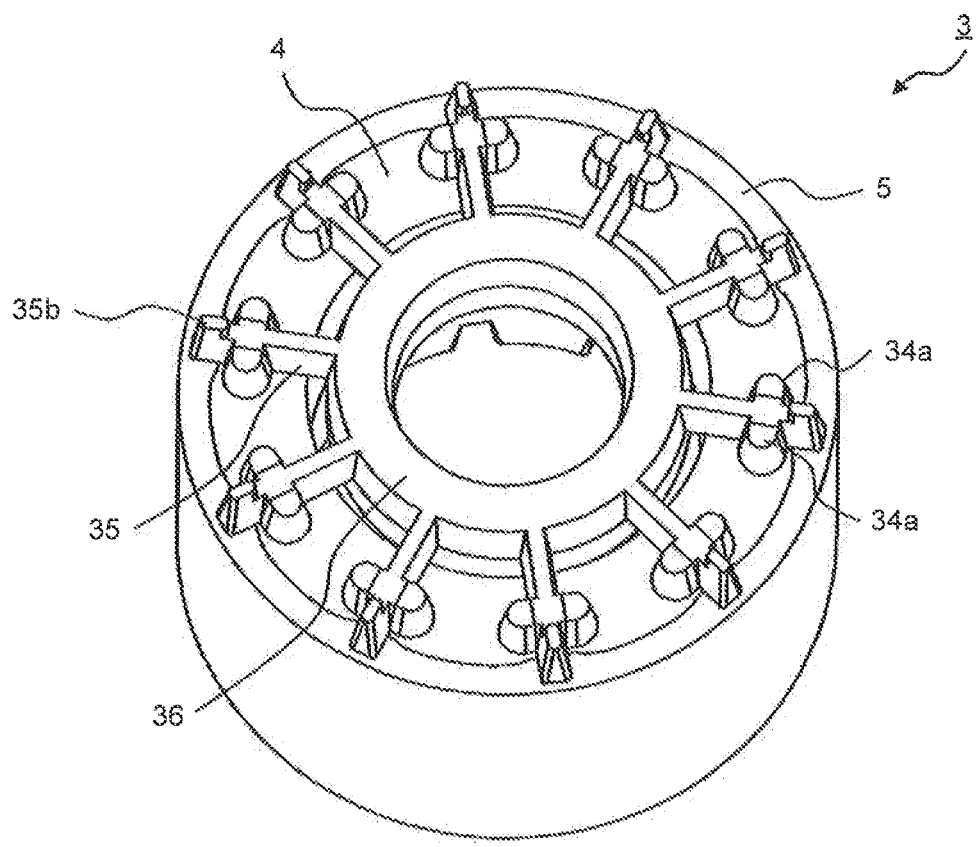
FIG. 19 is a perspective view of the rotor magnet, from which the runners are not cut yet, viewed from the runner side.
Figure 20:
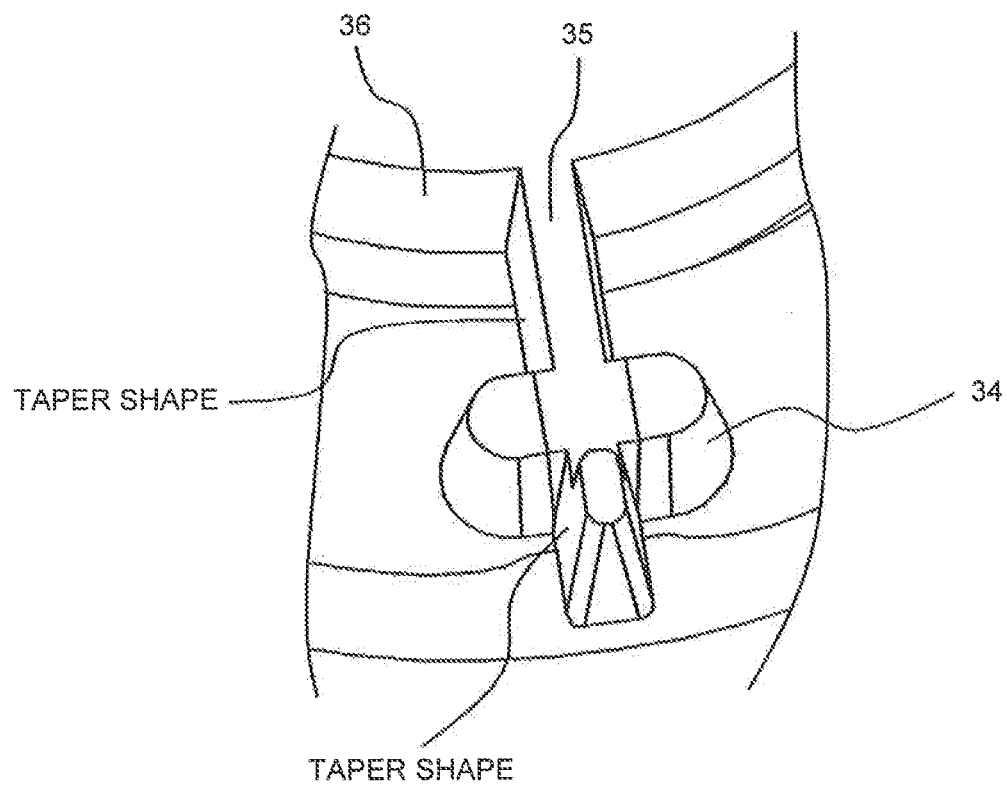
FIG. 20 is an enlarged perspective view of the vicinity of the rib-like runners shown in FIG. 19.
Figure 21:
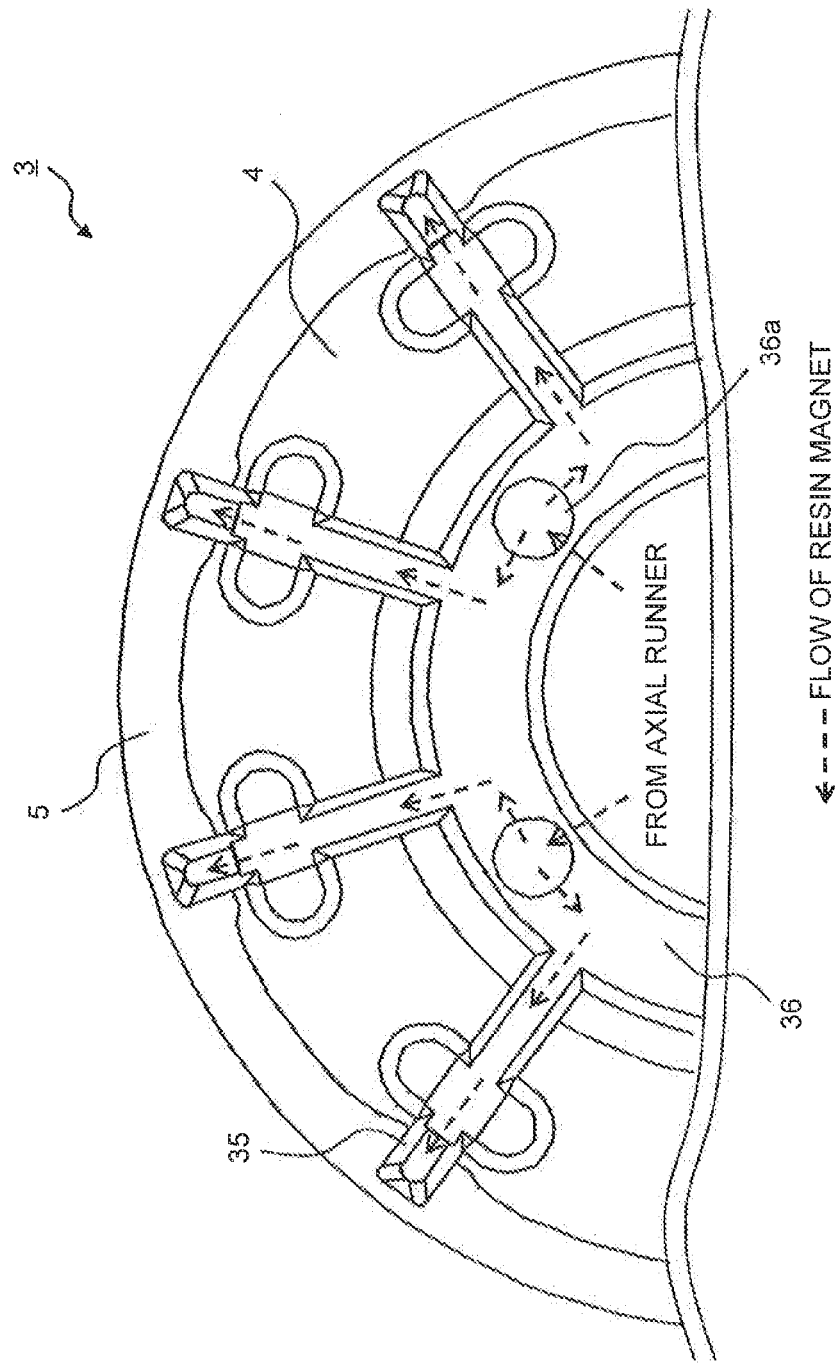
FIG. 21 is a partial plan view of the flow of the resin magnet during molding of the rotor magnet.
Figure 22:
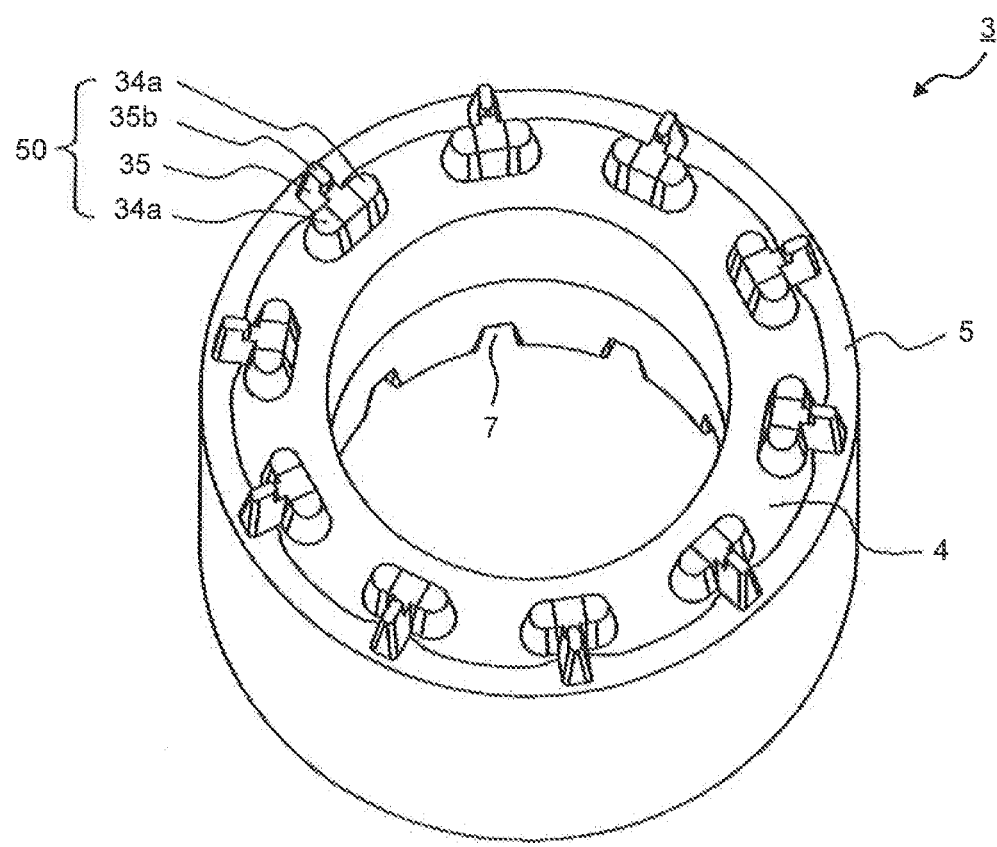
FIG. 22 is a perspective view of the rotor magnet, from which the runners are cut off, viewed from the pedestal section side.
Figure 23:
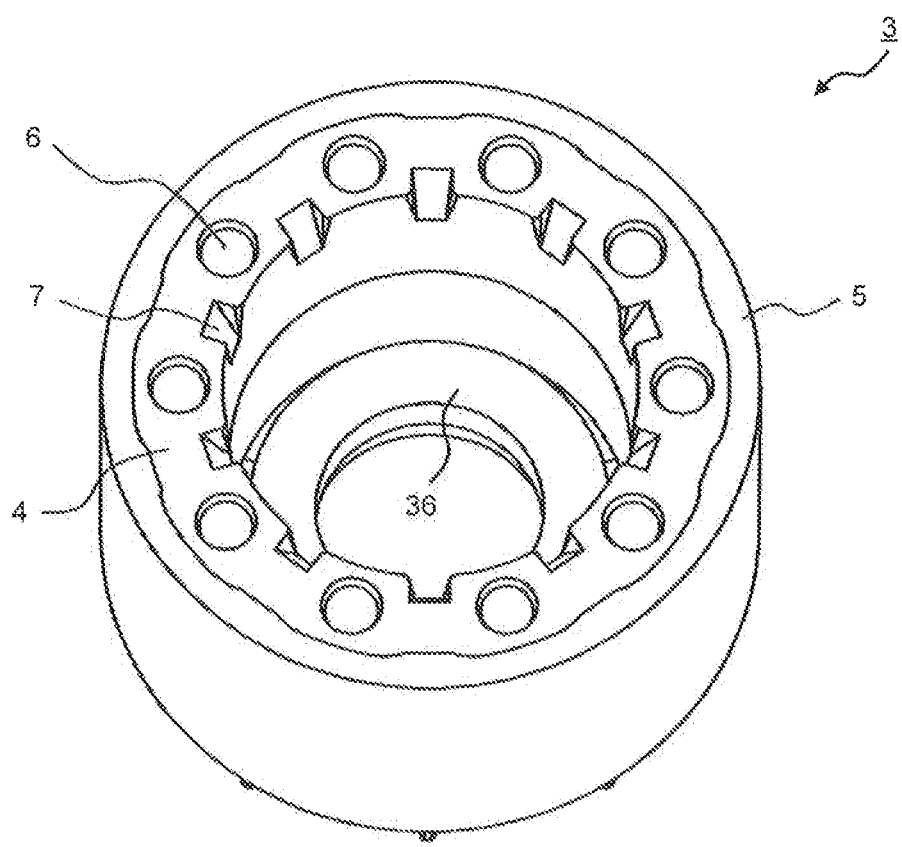
FIG. 23 is a perspective view of the rotor magnet viewed from the recess side.

FIG. 15A is a side view of the rotor magnet 3, from which the runners are not cut off yet, viewed from the recesses 6 side. FIG. 15B is a C-C sectional view of FIG. 15A. FIG. 15C is a side view of the rotor magnet 3, from which the runners are not cut off yet, viewed from the position detection magnet 11 side. FIG. 16 is a diagram of a state in which the rotor magnet 3 is polar-anisotropically oriented by an oriented magnetic field on the outer side. FIG. 17 is an enlarged view of the rotor magnet 3 shown in FIG. 15B. FIG. 18 is an enlarged view of the rotor magnet 3 shown in FIG. 15C. FIG. 19 is a perspective view of the rotor magnet 3, from which the runners are not cut off yet, viewed from the runner side. FIG. 20 is an enlarged perspective view of the vicinity of the rib-like runners 35 shown in FIG. 19. FIG. 21 is a partial plan view of the flow of the resin magnet during molding of the rotor magnet 3. FIG. 22 is a perspective view of the rotor magnet 3, from which the runners are cut off, viewed from a pedestal sections 50 side. FIG. 23 is a perspective view of the rotor magnet 3 viewed from the recesses 6 side.

The rotor magnet 3 is explained with reference to FIGS. 15 to 23.

The rotor magnet 3 in this embodiment is obtained by housing the yoke 4 in the lower mold (not shown) of the mold set in the vertical molding machine, injection-molding a resin magnet of thermoplastic resin containing, for example, samarium iron, which is rare earth metal, in the outer circumference of the yoke 4, and integrating the resin magnet 5.

When the resin magnet 5 is molded, a strong magnet is arranged to provide an oriented magnetic field on the outer side of the section of the mold where the outer circumference of the resin magnet 5 is formed. Consequently, magnetic particles contained in the resin magnet 5 are oriented anisotropically with respect to the polar direction (see FIG. 16).

A core section of the mold for molding the resin magnet 5 into which the hollow section of the yoke 4 is inserted is formed in the lower mold (not shown in the figure). The yoke 4 is inserted into the core section from the axial direction end face including the recesses 6 and assembled in the mold.

In a state in which the yoke 4 is assembled in the mold, an end face of the core section of the lower mold for molding the resin magnet 5 is an end face position including the pedestals 34 of the yoke 4 (see FIG. 17).

Protrusions (not shown in the figure) fit in the cutouts 7 provided in the axial direction end face on the recesses 6 side of the yoke 4 are provided in the core section (the lower mold) of the mold for molding the resin magnet 5. Consequently, positioning in the circumferential direction with respect to the position of a magnet for creating an oriented magnetic field is performed.

The protrusions fit in the cutouts 7 of the core section are pressed against the taper-like cutouts 7 when the mold is tightened while securing coaxiality with the outer circumference of the resin magnet section. Consequently, coaxiality of the outer circumference of the resin magnet 5 and the yoke 4 is secured.

Resin injecting sections in molding the resin magnet 5 are provided in a doughnut-like runner 36 (see FIGS. 17 to 19), which is formed on the end face of the core section (the lower mold) of the mold for molding the resin magnet 5, in the circumferential direction at substantially equal pitches by a half of the number of magnetic poles (a half of ten, i.e., five).

The resin injecting sections used in molding the resin magnet 5 are left as resin injecting section traces 36a in the doughnut-like runner 36 (see FIG. 18).

The resin injecting section trace 36a is formed substantially in the middle of any two of the ten formed rib-line runners 35.

As shown in FIG. 17, the doughnut-like runner 36 projects to the pedestal side from the end face of the resin magnet 5 or the yoke 4 generally at the height (in the axial direction) of the pedestals 34 of the yoke 4.

The rib-like runners 35 are radially extended from the outer circumference of the doughnut-like runner 36 toward the resin magnet 5 by the same number as the number of magnetic poles (ten).

As explained above, the resin injecting section (the resin injecting section trace 36a) in molding the resin magnet 5 is provided in the substantially middle position of two rib-like runners 35.

The doughnut-like runner 36 and the rib-like runners 35 are formed by the upper mold. Therefore, the doughnut-like runner 36 and the rib-like runners 35 are formed in a taper shape decreasing in size from the end face of the core section (the lower mold) to the axial direction outer side. Consequently, sticking of the doughnut-like runner 36 and the rib-like runners 35 to the upper mold during the mold opening is reduced.

Concerning the taper shape of the doughnut-like runner 36 decreasing in size from the end face of the core section (the upper mold) to the axial direction outer side, FIG. 17 is referred to.

Concerning the taper shape of the rib-like runners 35 decreasing in size from the end face of the core section (the lower mold) to the axial direction outer side, FIG. 20 is referred to.

Further, as shown in FIG. 17, concerning the doughnut-like runner 36, the end face of the core section (the lower mold) is dug straight in a concave shape to predetermined depth (the axial direction). Consequently, resistance to sticking of the doughnut-like runner 36 to the upper mold in mold releasing is generated. Therefore, the lower mold is smoothly separated from the doughnut-like runner 36.

The rib-like runners 35 radially extending from the doughnut-like runner 36 reach the opening section 34b (see FIG. 9) on the inner circumferential side of the pedestals 34 extending across the axial direction end face of the core section (the lower mold) of the mold for molding the resin magnet 5 and the axial direction end face on the pedestal 34 side of the yoke 4. Further, the rib-like runners 35 extend to a predetermined position from the outer circumference of the yoke 4 on an axial direction end face of the resin magnet 5 further on the outer side than the opening section 34b on the outer circumferential side of the pedestals 34.

As shown in FIG. 21, the resin magnet flows in the axial direction in a not-shown runner (an axial runner) and changes the direction of its flow by 90° in the resin injecting section (the resin injecting section trace 36a). That is, the resin magnet branches into two in the directions of the arrows (axial orthogonal directions) shown in the resin injecting section trace 36a. Thereafter, the respective resin magnets that have branched into two enter the rib-like runner 35 closest to the resin injecting section (the resin injecting section trace 36a), further change the directions of the flow by 90°, and flow into the resin magnet 5.

At this point, a section where the flowing direction of the resin magnet is changed (the resin injecting section (the resin injecting section trace 36a), a section where the resin magnet flows through the axial runner in the axial direction and branches into two in the axial orthogonal directions) can be set within the mold. This is because the doughnut-like runner 36 including the resin injecting sections (the resin injecting section traces 36a) are present further on the inner side than the inner circumference of the yoke 4.

For example, when the resin magnet changes the flowing direction on the axial direction end face of the yoke 4, it is likely that the yoke 4 is damaged, for example, the end face of the yoke 4 is pierced by the ejection pressure of the resin magnet flowing through the axial runner in the axial direction.

The section where the flowing direction of the resin magnet is changed (the resin injecting section (the resin injecting section trace 36a), the section where the resin magnet flows in the axial direction and branches into two in the axial orthogonal directions) is present in the mold. Therefore, because the resin magnet flowing through the axial runner in the axial direction branches into two in the axial orthogonal directions in the resin injecting section trace 36a, it is less likely that the yoke 4 and the like are damaged. Consequently, it is possible to attain improvement of the quality in manufacturing.

The hollow section of the yoke 4 from the end face on the pedestal 34 side to the mold matching surface trace 46 is formed as the straight section 44 (see FIG. 14) having a substantially fixed diameter of a circle in cross section. Further, in the hollow section of the yoke 4, a gap of the core section (the lower mold) of the mold for molding the resin magnet 5 fit in the straight section 44 from the end face on the pedestal 34 side is set as small as possible. Consequently, it is possible to suppress a leak of the resin magnet to the gap between the straight section 44 from the end face on the pedestal 34 side to the mold matching surface trace 46 in the hollow section of the yoke 4 and the core section (the lower mold) of the mold for molding the resin magnet 5. Therefore, it is possible to improve the quality during manufacturing.

When the resin magnet 5 of the rare earth is formed in the outer circumference of the yoke 4, because the material (the resin magnet of the rare earth) is expensive, the thickness of the resin magnet 5 is set as small as possible. In that case, the resin injecting sections for directly injecting the resin magnet into the resin magnet 5 need to be reduced in size to match the thickness of the resin magnet 5. However, when the resin injecting sections are reduced in size, molding pressure increases.

On the other hand, as in this embodiment, if the runners are formed by the doughnut-like runner 36 and the rib-like runners 35 radially extending from the outer circumference of the doughnut-like runner 36 in the direction of the resin magnet 5 by a number the same as the number of magnetic poles and the resin injecting sections (the resin injecting section traces 36a) are provided in the doughnut-like runner 36, it is possible to arbitrarily set a gate diameter of the resin injecting sections. Therefore, it is possible to attain an improvement of the quality in manufacturing.

If the number of the resin injecting sections (the resin injecting section traces 36a) of the resin magnet is reduced to a half (five) of the number of the magnetic poles (ten), it is possible to reduce the ratio of the runner amount to the product (the resin magnet 5) compared with the ratio obtained when the provided number of the resin injecting sections for the resin magnet is the same as the number of the magnetic poles.

The total amount of runner is the total amount of the doughnut-like runner 36, the rib-like runners 35, and not-shown other runners.

The "runner" is defined as a section not to be formed as the product (the resin magnet 5) between the resin magnet 5 and resin-magnet injecting sections of the mold. Specifically, the "runner" indicates the doughnut-like runner 36, the rib-like runners 35, and the not-shown other runners.

However, in the case of the rotor magnet 3 shown in FIG. 15, as shown in FIG. 22, a part of the rib-like runners 35 (sections from the inner circumferential surfaces to the distal ends (in the radial direction) of the pedestals 34 of the yoke 4) are formed as the product.

That is, the not-shown other runners (axial runners), the doughnut-like runner 36, and the rib-like runners 35 (excluding the sections from the inner circumferential surfaces to the distal ends (in the radial direction) of the pedestals 34 of the yoke 4) are cut off after the completion of the molding of the rotor magnet 3 (see FIG. 22).

The runner amounts of the runners (the other runners, the doughnut-like runner 36, and the rib-like runners 35 (excluding a part)) in this embodiment can be reduced by about 30% compared with the runner amount obtained when the provided number of resin injecting sections for the resin magnet is the same as the number of the magnetic poles (ten).

Although not explained in detail, the ratio of the axial runner amount to the total runner amount is large compared with the ratio of the other doughnut-like runner 36 and rib-like runners 35. Therefore, when the resin injecting sections are reduced, the total runner amount also decreases.

The rotor magnet 3 includes the five resin injecting sections for the resin magnet. The total runner amount decreases compared with the total runner amount obtained when the provided number of resin injecting sections is the same as the number of the magnetic poles (ten).

When the runners not formed as the product are reused, the reuse ratio decreases because the runner amount of the rotor magnet 3 decreases compared with the runner amount obtained when the provided number of resin injecting sections for the resin magnet is the same as the number of the magnetic poles (ten). Consequently, it is possible to suppress deterioration in the physical properties (mainly mechanical strength) of the resin magnet. Therefore, it is possible to attain an improvement of the quality of the product.

Further, although the number of the resin injecting sections is a half of the number of the magnetic poles, the number of the rib-like runners 35 is the same as the number of the magnetic poles. Therefore, injection states of the resin magnet into the respective magnetic poles are the same. It is possible to uniformalize states of orientations and attain an improvement of the quality in manufacturing.

As shown in FIG. 22, the not-shown other runners, the doughnut-like runner 36, and the rib-like runners 35 (excluding a part of the runners) are cut off after the completion of the molding of the rotor magnet 3. The section of the rib-like runners 35 to the inner circumferential surfaces of the pedestals 34 of the yoke 4 radially extending from the doughnut-like runner 36 are cut off.

Therefore, as shown in FIG. 22, the pedestal sections 50 are configured by the projecting sections 34a of the pedestals 34 of the yoke 4 and non-cutoff sections of the rib-like runners 35 extending to the outer side in the radial direction from between the projecting sections 34a. The non-cutoff sections of the rib-like runners 35 include, at the distal ends in the radial direction, magnet holding protrusions for position detection 35b projecting to the axial direction outer side.

As explained above, the position detection magnet 11 (see FIG. 1) is arranged on the upper surfaces of the pedestals 34 and the rib-like runners 35 (the sections left as the product) (in a substantially horizontal state) on the inner side of the magnet holding protrusions for position detection 35b (see FIG. 22) of the pedestal sections 50 of the rotor magnet 3. In a state in which the position detection magnet 11 is placed on the pedestal sections 50 (see FIG. 22) of the rotor magnet 3 before resin molding, for example, when the rotor magnet 3 rotates 180° at predetermined rotating speed, a centrifugal force acts on the position detection magnet 11. However, because the magnet holding protrusions for position detection 35b are present around the position detection magnet 11, the magnet holding protrusions for position detection 35b prevent positional deviation in the radial direction. The position detection magnet 11 is less likely to drop from the rotor magnet 3. Consequently, productivity is improved.

Sections of the rib-like runners 35 formed in the resin magnet 5 further on the outer side than the yoke 4 are used as positioning protrusions functioning as positioning in the circumferential direction when the rotor magnet 3 is molded integrally with the shaft 1 by the resin section 17.

For example, when the positioning protrusions functioning as positioning in the circumferential direction when the rotor magnet 3 is formed integrally with a rotor core (explained below) (the sections further on the outer side than the yoke 4 of the rib-like runner 35), the magnet holding protrusions for position detection 35b, and the pedestals 34 are formed by only the resin magnet, there is a drawback in that, when the doughnut-like runner 36 and the rib-like runners 35 are cut off, strength is low because the positioning protrusions, the magnet holding protrusions for position detection 35b, and the pedestals 34 are coupled only by the resin injecting sections to the resin magnet 5 to the resin magnet 5, which is formed in the outer circumference of the yoke 4.

However, the pedestals 34 is formed in the yoke 4 and, further, the centers of the pedestals 34 are opened to provide the opening sections 34*b*, and the rib-like runners 35 are integrated with the pedestals 34 to improve strength. Consequently, it is possible to attain an improvement of the quality in manufacturing.

As explained above, after the resin magnet is filled in the outer circumference of the yoke 4 from the doughnut-like runner 36 through the rib-like runners 35 and the yoke 4 and the resin magnet 5 are integrated, the rib-like runners 35 and the doughnut-like runner 36 further on the inner side than the side surfaces on the inner circumferential side of the pedestals 34 are cut off. Consequently, the rotor magnet 3 in this embodiment is obtained.

As explained above, when the positioning protrusions (the sections further on the outer side than the yoke 4 of the rib-like runner 35), the magnet holding protrusions for position detection 35*b*, and the pedestals 34 are formed by only the resin magnet, there is a drawback in that, when the doughnut-like runner 36 and the rib-like runners 35 are cut off, strength is low because the positioning protrusions, the magnet holding protrusions for position detection 35*b*, and the pedestals 34 are coupled only by the resin injecting sections to the resin magnet 5 to the resin magnet 5, which is formed in the outer circumference of the yoke 4. However, when the position detection magnet 11 (explained below) is not used, because the pedestal sections 50 for the position detection magnet 11 are made unnecessary, the doughnut-like runner 36 and the rib-like runners 35 can be completely cut off.

Figure 24A:
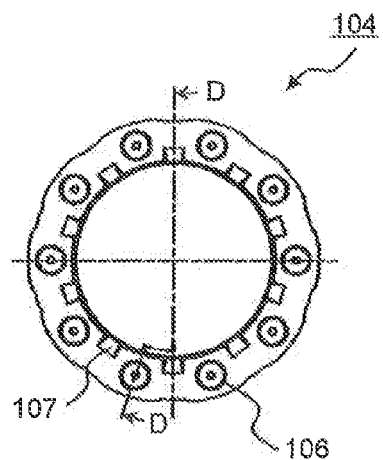
FIG. 24A is a side view of a yoke viewed from the recess side.
Figure 24B:
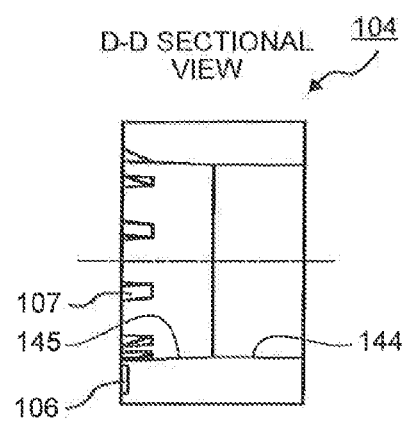
FIG. 24B is a D-D sectional view of FIG. 24A.
Figure 24C:
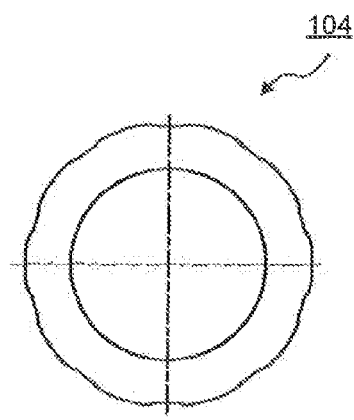
FIG. 24C is a side view of the yoke viewed from the opposite side to the recesses.
Figure 25:
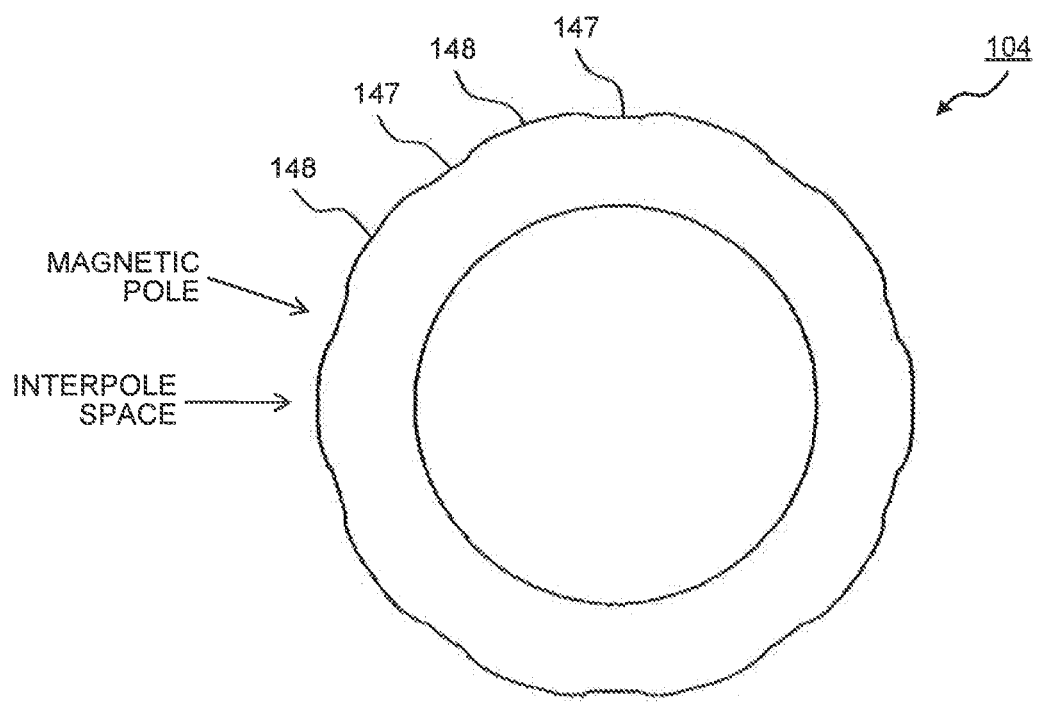
FIG. 25 is an enlarged view of the yoke shown in FIG. 24C.
Figure 26:
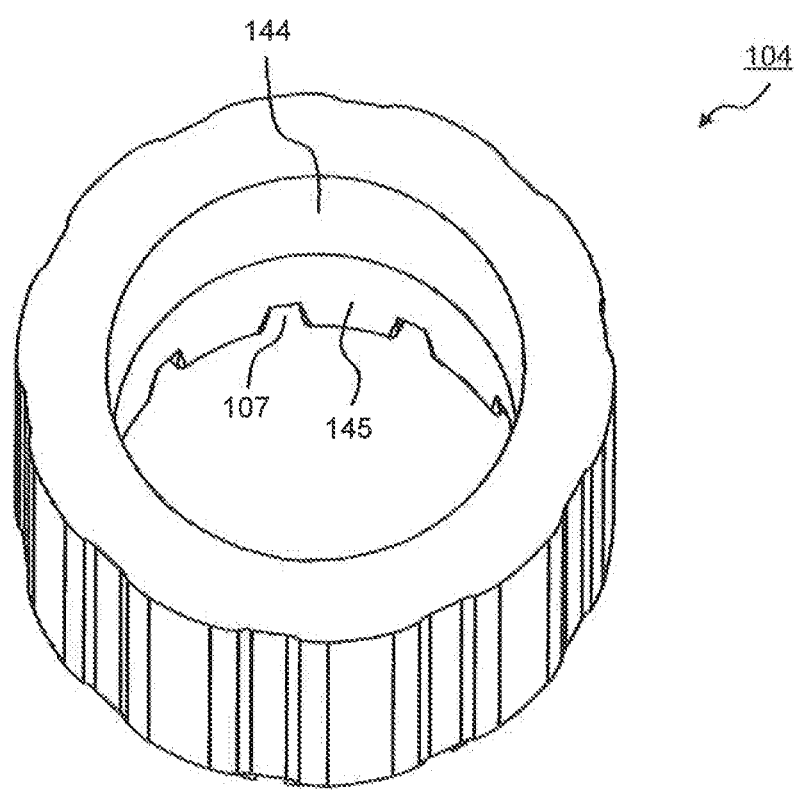
FIG. 26 is a perspective view of the yoke viewed from the opposite side to the recesses.
Figure 27A:
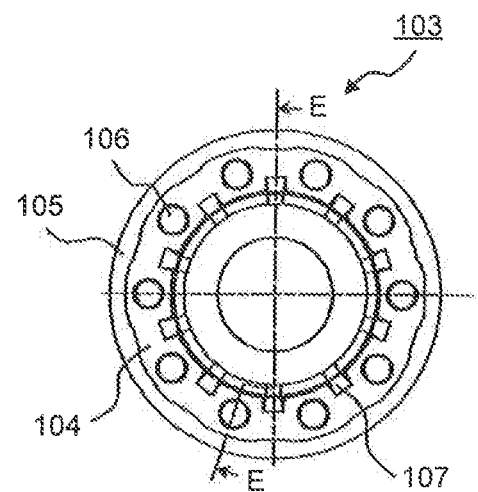
FIG. 27A is a side view of a modification of a rotor magnet, from which runners are not cut off yet, viewed from the recess side.
Figure 27B:
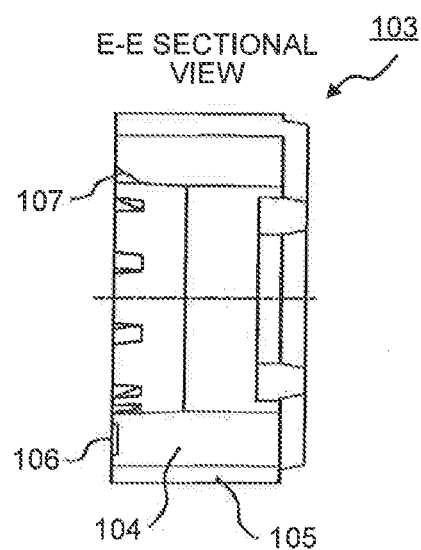
FIG. 27B is an E-E sectional view of FIG. 27A.
Figure 27C:
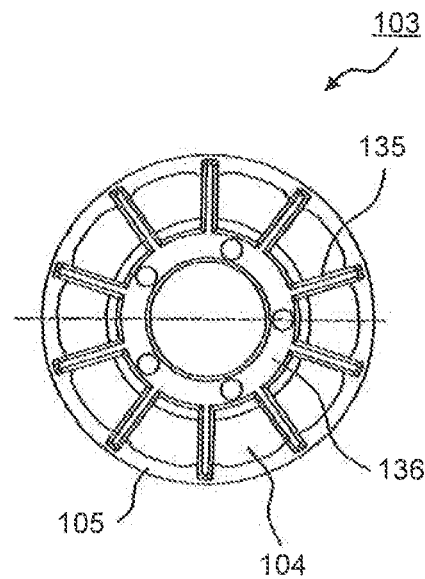
FIG. 27C is a modification of the rotor magnet, from which the runners are not cut off yet, viewed from the opposite side of the recesses.
Figure 29:
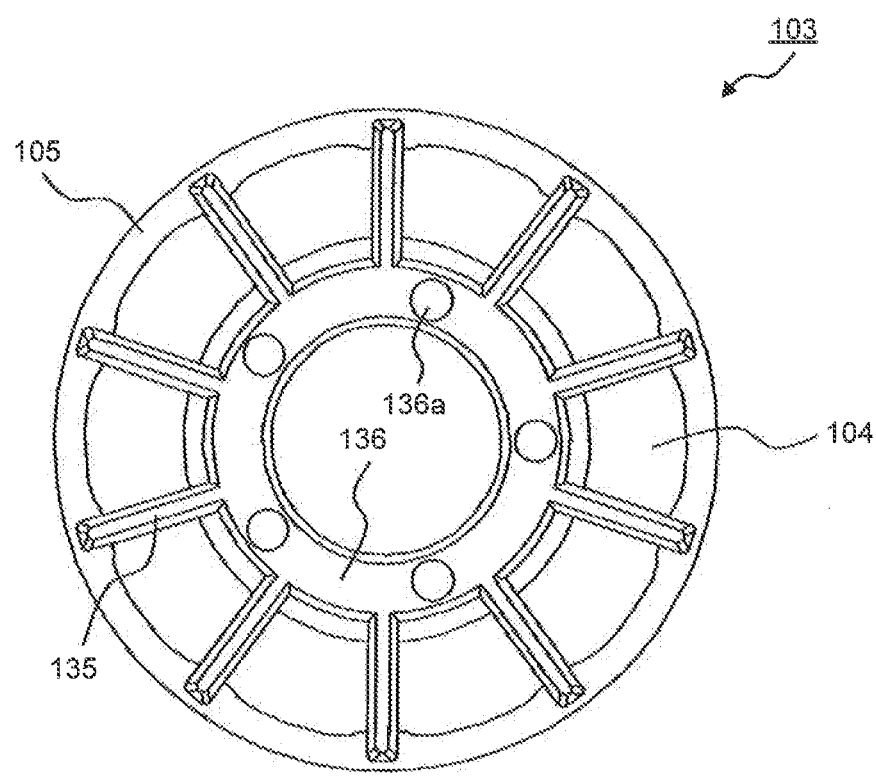
FIG. 29 is an enlarged view of the rotor magnet shown in FIG. 27C.
Figure 30:
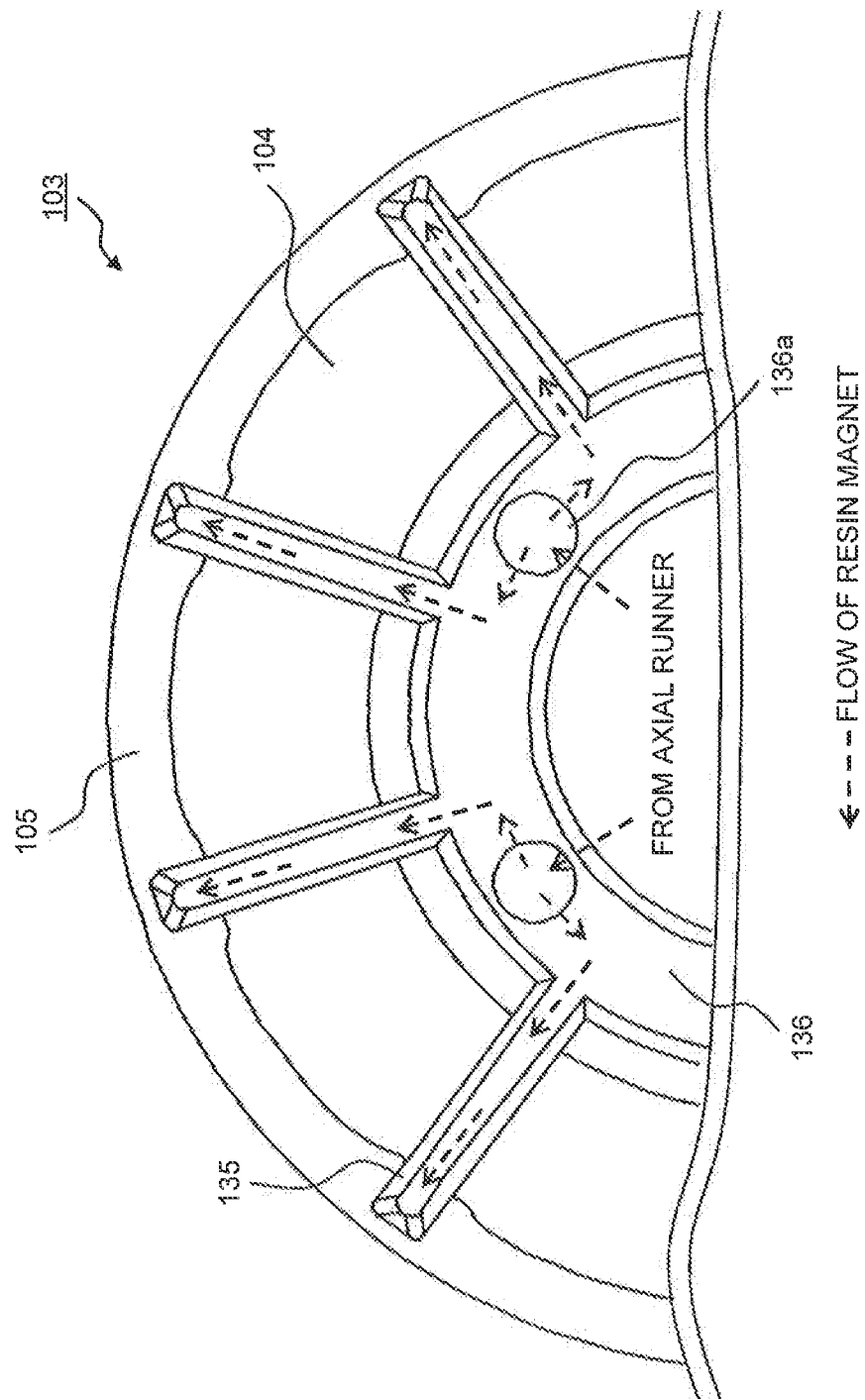
FIG. 30 is a partial plan view of the flow of a resin magnet during molding of the rotor magnet shown in FIG. 27.
Figure 31:
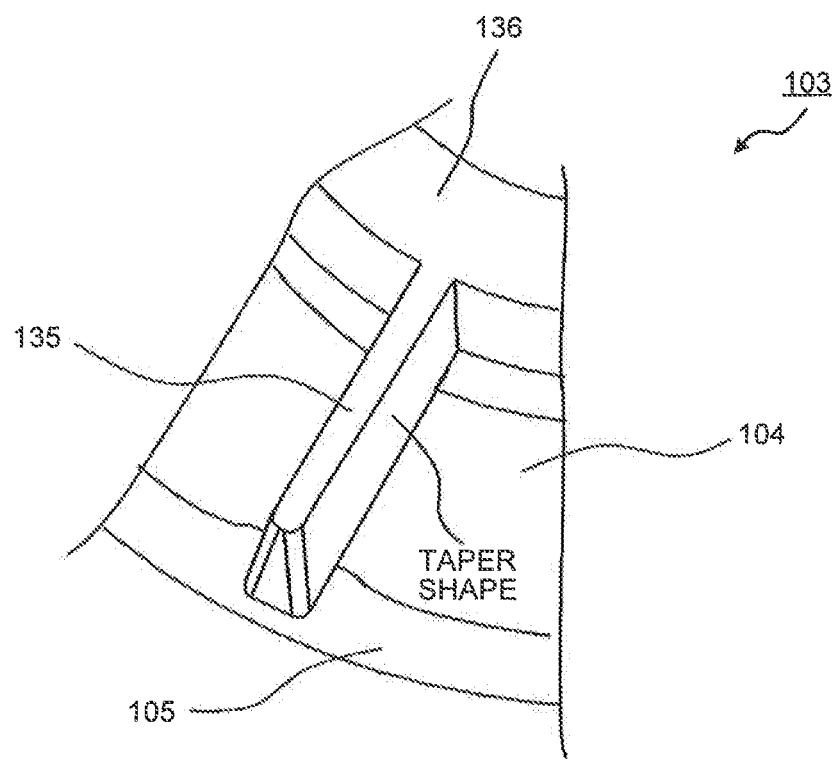
FIG. 31 is a partial perspective view of the rotor magnet shown in FIG. 27, from which the runners are not cut off yet, viewed from the runner side.
Figure 32:
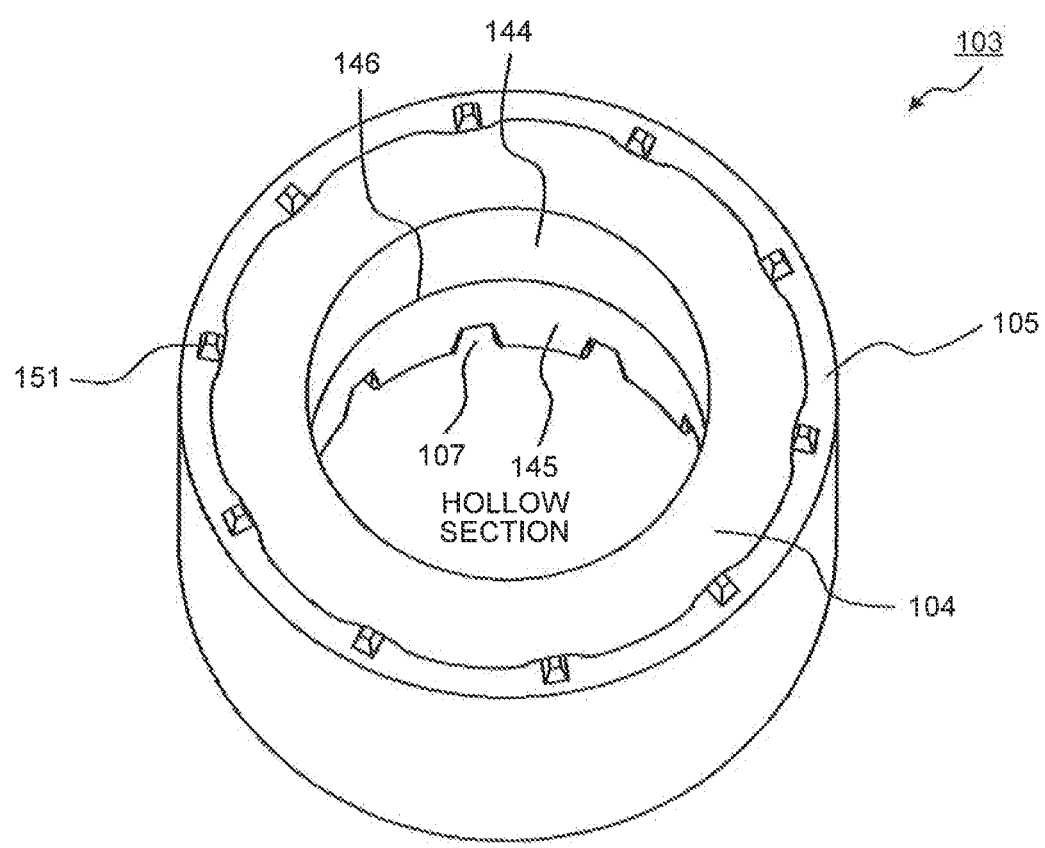
FIG. 32 is a perspective view of the rotor magnet shown in FIG. 17, from which the runners are cut off, viewed from the opposite side to the recesses.

FIG. 24A is a side view of a yoke 104 viewed from a recesses 106 side. FIG. 24B is a D-D sectional view of FIG. 24A. FIG. 24C is a side view of the yoke 104 viewed from the opposite side of recesses 106. FIG. 25 is an enlarged view of the yoke 104 shown in FIG. 24C. FIG. 26 is a perspective view of the yoke 104 viewed from the opposite side to the recesses 106. FIG. 27A is a side view of a modification of a rotor magnet 103, from which runners are not cut off yet, viewed from the recesses 106 side. FIG. 27B is an E-E sectional view of FIG. 27A. FIG. 27C is a side view of a modification of the rotor magnet 103, from which the runners are not cut off yet, viewed from the opposite side to the recesses 106. FIG. 28 is an enlarged view of the rotor magnet 103 shown in FIG. 27C. FIG. 29 is an enlarged view of the rotor magnet 103 shown in FIG. 27C. FIG. 30 is a partial plan view of the flow of a resin magnet during molding of the rotor magnet 103 shown in FIG. 27. FIG. 31 is a partial perspective view of the rotor magnet 103 shown in FIG. 27, from which the runners are not cut off yet, viewed from the runner side. FIG. 32 is a perspective view of the rotor magnet 103 shown in FIG. 27, from which the runners are cut off, viewed from the opposite side of the recesses 106.

The rotor magnet 103 provided when the position detection magnet 11 is not used is explained with reference to FIGS. 24 to 32.

The rotor magnet 103 includes the yoke 104 and a resin magnet 105 formed in the outer circumference of the yoke 104.

The rotor magnet 103 includes ten poles like the rotor magnet 3.

First, the yoke 104 is explained. As shown in FIGS. 24A and 24B, the configuration on the recesses 106 side of the yoke 104 is the same as the configuration of the yoke 4 shown in FIG. 6.

Because the position detection magnet 11 (explained below) is not used, the yoke 104 is characterized in that the pedestals 34 present in the yoke 4 shown in FIG. 6 are absent on the axial direction end face on the opposite side of the recesses 106 of the yoke 104 (FIGS. 24 to 26).

The yoke 104 provided on the inner side of the rotor magnet 103 is obtained by injection-molding thermoplastic resin containing a soft magnetic material or ferrite.

As in the yoke 4, when the yoke 104 is molded, a strong magnet is arranged to provide an oriented magnetic field on the outer side of the section of a mold forming the outer circumference of the yoke 104. Consequently, the soft magnetic material or the ferrite contained in the yoke 104 is anisotropically oriented with respect to a polar direction.

As shown in FIGS. 24A and 24C, the yoke 104 is formed in a substantially cylindrical shape in cross section. In the outer circumference of the yoke 104, as shown in FIG. 25, concave sections 147 and convex sections 148 are alternately arranged. The number of each of the concave sections 147 and the convex sections 148 is ten.

The concave sections 147 in the outer circumference of the yoke 104 correspond (are opposed) to magnetic poles of the resin magnet 105.

The convex sections 148 in the outer circumference of the yoke 104 correspond (are opposed) to interpole spaces of the resin magnet 105.

The rotor magnet 103 is explained. As shown in FIGS. 27A and 27B, the configuration on the recesses 106 side of the rotor magnet 103 is the same as the configuration of the rotor magnet 3 shown in FIG. 15.

Because the position detection magnet 11 (explained below) is not used, it is unnecessary to form pedestals on an axial direction end face on the opposite side of the recesses 106 of the rotor magnet 103. Therefore, in the rotor magnet 103, from which the runners have not been cut off yet, as shown in FIGS. 27C and 29, a doughnut-like runner 136 and rib-like runners 135 are only formed on the axial direction end face on the opposite side of the recesses 106.

In the rotor magnet 103, as in the rotor magnet 3, a core section of the mold for molding the resin magnet 105 into which a hollow section of the yoke 104 is inserted is formed in a lower mold (not shown in the figures). The yoke 104 is inserted into the core section from an axial direction end face including the recesses 106 and assembled in the mold.

In a state in which the yoke 4 has been assembled in the mold, an end face of the core section of the lower mold for molding the resin magnet 105 is located in an axial direction end face on the opposite side of the end face of the yoke 104 on which the recesses 106 are provided (see FIG. 28).

Protrusions (not shown in the figure) fit in cutouts 107 included in the axial direction end face on the recesses 106 side of the yoke 104 are provided in the core section (the lower mold) of the mold for molding the resin magnet 105. Consequently, positioning in the circumferential direction with respect to the position of a magnet for creating an oriented magnetic field is performed.

The protrusions fit in the cutouts 107 of the core section are pressed against the taper-like cutouts 107 when the mold is tightened. Consequently, coaxiality of the outer circumference of the resin magnet 105 and the yoke 104 is secured.

Resin injecting sections in molding the resin magnet 105 are provided in a doughnut-like runner 136 (see FIG. 29), which is formed on the end face of the core section (the lower mold) of the mold for molding the resin magnet 105, in the circumferential direction at substantially equal pitches by a half of the number of magnetic poles (a half of ten, i.e., five).

The resin injecting sections in molding the resin magnet 105 are left as resin injecting section traces 136a in the doughnut-like runner 136 (see FIG. 29).

The resin injecting section trace 136a is formed substantially in the middle of any two of the ten formed rib-line runners 135.

As shown in FIG. 28, the doughnut-like runner 136 projects to the outer side (the axial direction) from the end face of the resin magnet 105 or the yoke 104 generally substantially at the height (in the axial direction) of the rib-like runners 135.

The rib-like runners 135 are radially extended from the outer circumference of the doughnut-like runner 136 toward the resin magnet 105 for the same number as the number of magnetic poles (ten). The rib-like runners 135 are formed at substantially the same height (in the axial direction) as the doughnut-like runner 136.

As explained above, the resin injecting section (the resin injecting section trace 136a) in molding the resin magnet 105 is provided in the substantially middle position of the rib-like runners 135.

The doughnut-like runner 136 and the rib-like runners 135 are formed by the upper mold. Therefore, the doughnut-like runner 136 and the rib-like runners 135 are formed in a taper shape decreasing in size from the end face of the core section (the lower mold) to the axial direction outer side. Consequently, sticking of the doughnut-like runner 136 and the rib-like runners 135 to the upper mold during the mold opening is reduced.

Concerning the taper shape of the doughnut-like runner 136 decreasing in size from the end face of the core section (the upper mold) to the axial direction outer side, FIG. 28 is referred to.

Concerning the taper shape of the rib-like runners 135 decreasing in size from the end face of the core section (the lower mold) to the axial direction outer side, FIG. 31 is referred to.

Further, as shown in FIG. 28, concerning the doughnut-like runner 136, the end face of the core section (the lower mold) is dug straight in a concave shape to a predetermined depth (the axial direction). Consequently, resistance against sticking of the doughnut-like runner 136 to the upper mold in mold opening is generated. Therefore, the lower mold is smoothly separated from the doughnut-like runner 136.

The rib-like runners 135 radially extending from the doughnut-like runner 136 extend to predetermined positions from the outer circumference of the yoke 104 across the axial direction end face of the core section of the lower mold for molding the resin magnet 105 and then across the end face of the yoke 104.

As shown in FIG. 30, the resin magnet flows in the axial direction in a not-shown runner (an axial runner) and changes the direction of its flow by 90° in the resin injecting section (the resin injecting section trace 136a). That is, the resin magnet branches into two in the directions of the arrows (axial orthogonal directions) shown in the resin injecting section trace 136a. Thereafter, the respective resin magnets branched into two enter the rib-like runner 135 closest to the resin injecting section (the resin injecting section trace 136a) and flow into the resin magnet 105.

At this point, a section where the flowing direction of the resin magnet is changed (the resin injecting section (the resin injecting section trace 136a), a section where the resin magnet flows through the axial runner in the axial direction and branches into two in the axial orthogonal directions) can be set within the mold. This is because the doughnut-like runner 136 including the resin injecting sections (the resin injecting section traces 136a) are present further on the inner side than the inner circumference of the yoke 104.

For example, when the resin magnet changes the flowing direction on the axial direction end face of the yoke 104, it is likely that the yoke 104 is damaged, for example, the end face of the yoke 104 is pierced by the ejection pressure of the resin magnet flowing through the axial runner in the axial direction.

The section where the flowing direction of the resin magnet is changed (the resin injecting section (the resin injecting section trace 136a) and the section where the resin magnet flows in the axial direction and branches into two in the axial orthogonal directions) are present in the mold. Therefore, it is less likely that the resin magnet flowing through the axial runner in the axial direction damages the yoke 104 and the like. Consequently, it is possible to attain improvement of the quality in manufacturing.

The hollow section of the yoke 104 from the axial direction end face on the opposite side of the recesses 106 (the cutouts 107) to mold matching surface traces 146 is formed as a straight section 144 (see FIG. 32) having a substantially fixed diameter of a circle in cross section. Further, in the hollow section of the yoke 104, a gap of the core section (the lower mold) of the mold for molding the resin magnet 105 fit in the straight section 144 from the opposite side axial direction of the recesses 106 (the cutouts 107) is set as small as possible. Consequently, it is possible to suppress a leak of the resin magnet into the gap between the straight section 144 from the axial direction end face on the opposite side of the recesses 106 (the cutouts 107) to the mold matching surface trace 146 in the hollow section of the yoke 104 and the core section (the lower mold) of the mold for molding the resin magnet 105. Therefore, it is possible to improve the quality during manufacturing.

When the resin magnet 105 of the rare earth is formed in the outer circumference of the yoke 104, because the material (the resin magnet of the rare earth metal) is expensive, the thickness of the resin magnet 105 is set as small as possible. In that case, the resin injecting sections for directly injecting the resin magnet into the resin magnet 105 need to be reduced in size to match the thickness of the resin magnet 105. When the resin injecting sections are reduced in size, molding pressure increases.

On the other hand, as in this embodiment, if the runners are formed by the doughnut-like runner 136 and the rib-like runners 135 radially extending from the outer circumference of the doughnut-like runner 136 in the direction of the resin magnet 105 for the number same as the number of magnetic poles and the resin injecting sections (the resin injecting section traces 136a) are provided in the doughnut-like runner 136, it is possible to arbitrarily set a gate diameter of the resin injecting sections. Therefore, it is possible to attain an improvement of the quality in manufacturing.

If the number of the resin injecting sections (the resin injecting section traces 136a) of the resin magnet is reduced to a half (five) of the number of the magnetic poles (ten), it is possible to reduce the ratio of the runner amount to the product (the resin magnet 105) compared with the ratio obtained when the resin injecting sections for the resin magnet are provided for the same number of the magnetic poles.

The runner amount is the total amount of the doughnut-like runner 136, the rib-like runners 135, and not-shown other runners.

The "runner" is defined as a section not to be formed as the product (the resin magnet 105) between the resin magnet 105 and a resin-magnet injecting sections of the mold.

Specifically, the "runner" indicates the doughnut-like runner 136, the rib-like runners 135, and the not-shown other runners.

That is, the not-shown other runners, the doughnut-like runner 136, and the rib-like runners 135 are cut off after the completion of the molding of the rotor magnet 103 (see FIG. 32).

The runner amounts of the runners (the other runners, the doughnut-like runner 136, and the rib-like runners 135) in this embodiment can be reduced by about 30% compared with the runner amount obtained when the resin injecting sections for the resin magnet are provided for the same number of the magnetic poles (ten).

As explained above, the ratio of the other runner amount to the total runner amount is large compared with the ratio of the other doughnut-like runner 36 and rib-like runners 35. Therefore, when the resin injecting sections are reduced, the total runner amount also decreases.

The rotor magnet 103 includes the five resin injecting sections for the resin magnet. The total runner amount decreases compared with the total runner amount obtained when the resin injecting sections for the rein magnet are provided for the same number of the magnetic poles (ten).

When the runners not formed as the product are reused, a reuse ratio decreases because the runner amount decreases compared with the runner amount obtained when the resin injecting sections for the resin magnet are provided as many as the magnetic poles (ten). Consequently, it is possible to suppress deterioration in the physical properties (mainly mechanical strength) of the resin magnet. Therefore, it is possible to attain an improvement of the quality of the product.

Further, although the number of the resin injecting sections is a half of the number of the magnetic poles, the number of the rib-like runners 135 is the same as the number of the magnetic poles. Therefore, injection states of the resin magnet into the respective magnetic poles are the same. It is possible to uniformalize states of orientations and attain an improvement of the quality of the product.

As shown in FIG. 32, all of the not-shown other runners, the doughnut-like runner 36, and the rib-like runners 35 are cut off after the completion of the molding of the rotor magnet 103.

Cutoff traces 151 of the cutoff of the rib-like runners 135 are left for the number of the rib-like runners 135 (ten) on the axial direction end face on the opposite side to the recesses 106 (the cutouts 107) of the resin magnet 105.

In the rotor magnet 103 explained above, the pedestals 34 and a part of the rib-like runners 35 provided in the rotor magnet 3 are absent on the axial direction end face on the opposite side of the recesses 106 (the cutouts 107). Therefore, after the integral molding by the thermoplastic resin, regions for transmitting torque generated by the resin magnet 105 to a rotor core (explained below) are only a part of the cutouts 107 of the yoke 104 and the recesses 106 of the gate (see FIG. 28). Therefore, it is desirable in terms of torque transmission to form, on the axial direction end face on the opposite side to the recesses 106 (the cutouts 107) of the rotor magnet 103, protrusions (not shown in the figure) equivalent in number to the number of the pedestals 34 provided in the rotor magnet 3.

In the above explanation, as an example, the rotor magnet 3, 103, in which the outer circumference of the yoke 4, 104 is formed in a concave-convex shape and the resin magnet 5, 105 is integrally formed in the outer circumference, is used. However, the rotor magnet 3, 103 can be formed by molding the resin magnet 5, 105 in the outer circumference of the yoke 4, 104 formed in a circular shape in the outer circumference, in a part of which a concave shape or a convex shape is provided.

The rotor magnet 3, 103 can be configured by only the resin magnet.

The rotor magnet 3, 103 can be formed by bonding a baked magnet or a molded resin magnet to the yoke 4, 104.

It goes without saying that, irrespective of the outer circumferential shape of the yoke 4, 104 and the material and a fixing method of a magnet arranged in the outer circumference, if the recesses 6, 106 for preventing the gate treatment traces 6a provided on one end face of the yoke 4, 104 formed of the thermoplastic resin containing the soft magnetic material (in FIG. 27, not-shown gate treatment traces formed in the recesses 106) from projecting from the end face are molded from general-purpose thermoplastic resin to be embedded to form the rotor core (explained below), the same effect can be obtained by integrating the rotor magnet 3, 103 and the position detection magnet 11 (explained below).

Figure 33:
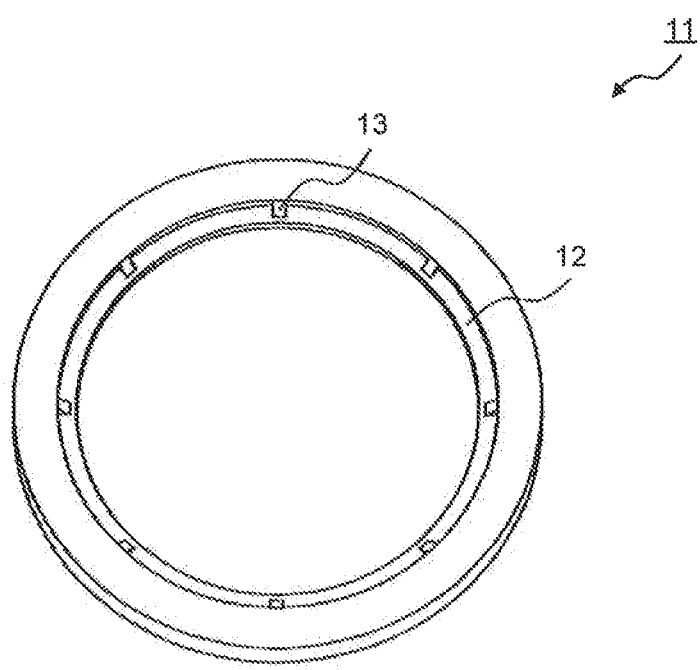
FIG. 33 is a perspective view of the position detection magnet shown in FIG. 1.
Figure 34A:
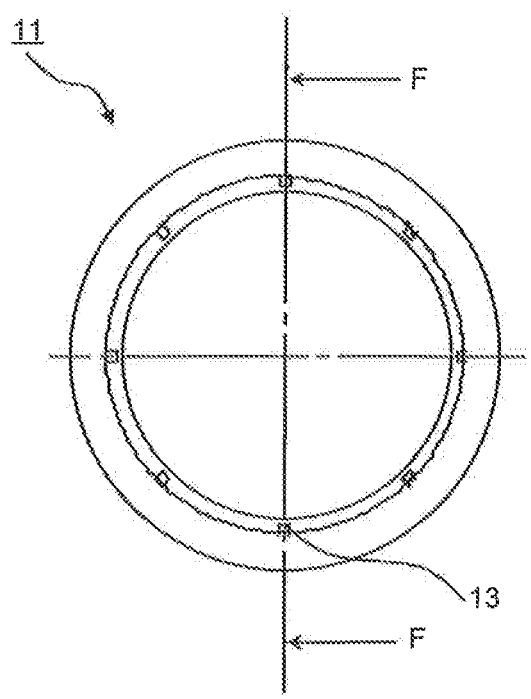
FIG. 34A is a plan view of the position detection magnet.
Figure 34B:
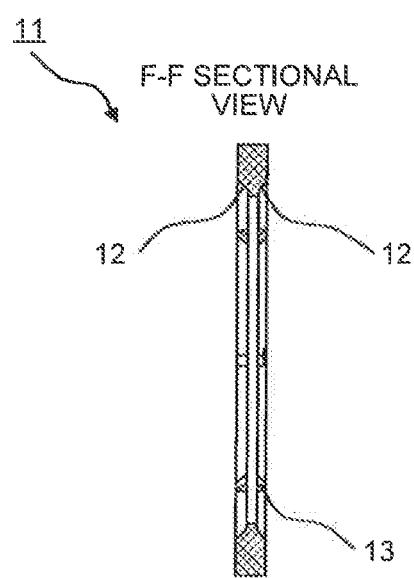
FIG. 34B is an F-F sectional view of FIG. 34A.

FIG. 33 is a perspective view of the position detection magnet 11 shown in FIG. 1. FIG. 34A is a plan view of the position detection magnet 11. FIG. 34B is an F-F sectional view of FIG. 34A. FIG. 35 is a partially enlarged view of the position detection magnet 11.

The position detection magnet 11 is explained with reference to FIGS. 33 to 35. As shown in FIGS. 33 to 35, the ring-like position detection magnet 11 includes steps 12 at both ends in the axial direction on the inner diameter side and is symmetrical in the thickness direction.

The position detection magnet 11 is provided at one end in the axial direction of the rotor resin assembly 100 shown in FIGS. 1 to 5. The resin section 17 such as PT (polybutylene terephthalate) is filled in the steps formed at both the ends in the axial direction on the inner side of the position detection magnet 11. Consequently, the steps 12 function as a stopper in the axial direction for the position detection magnet 11.

Because the position detection magnet 11 has a symmetrical shape in the thickness direction, the position detection magnet 11 can be set in the mold without changing direction. Therefore, a work time is reduced and improvement of productivity and a reduction in costs can be attained.

In FIGS. 33 to 35, the position detection magnet 11 including the steps 12 at both the ends is shown. However, the position detection magnet 11 can be configured such that the step 12 is provided at one of the ends (the axial direction end face of the position detection magnet 11) and the step 12 is located on the axial direction end side of the rotor resin assembly 100.

The position detection magnet 11 includes ribs 13 functioning as whirl stops when the resin section 17 (see FIG. 1) is filled therein.

Figure 36:
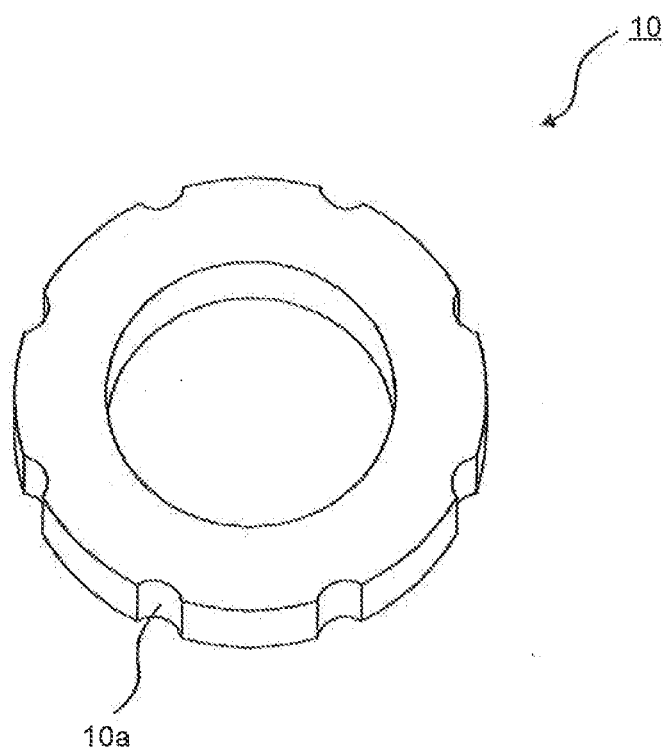
FIG. 36 is a perspective view of a rotor core.

FIG. 36 is a perspective view of the rotor core 10. The rotor core 10 is formed by laminating a predetermined number of electromagnetic steel plates having predetermined thickness (equal to or smaller than 1 mm) substantially in a doughnut shape by caulking or welding to have thickness of 5 to 10 mm. In the outer circumference of the rotor core 10, when the rotor magnet 3 and the position detection magnet 11 are integrally molded by the resin section 17 (see FIG. 1), cutouts 10a functioning as whirl stops when the resin section 17 is filled therein are formed.

Instead of the cutouts 10a, holes functioning as whirl stops when embedded in the thermoplastic resin can be provided near the outer circumference of the rotor core 10.

As shown in FIG. 1, a predetermined gap (e.g., a gap (at least 1.5 mm) equal to or larger than the thickness with respect to the radial direction of the resin magnet 5 (the resin section) formed in the outer circumference of the rotor magnet 3) is secured between the outer circumference of the rotor core 10 and the inner circumference of the rotor magnet 3. Consequently, when the rotor magnet 3 is integrated by the thermoplastic resin, a channel of the thermoplastic resin can be formed between the outer circumference of the rotor core 10 and the inner circumference of the rotor magnet 3. Therefore, it is possible to attain an improvement of the quality in manufacturing.

Further, when resin containing a soft magnetic material is used for the yoke 4 of the rotor magnet 3, the yoke 4 electrically functions as an insulating layer when the rotor resin assembly 100 is assembled to a shaft (the shaft 1). Therefore, because electrolytic corrosion resistance of a bearing is improved, it is possible to attain an improvement of the quality.

The rotor resin assembly 100 in this embodiment is obtained by integrating the rotor magnet 3, the position detection magnet 11, and the rotor core 10 by injection-molding thermoplastic resin such as PBT (polybutylene terephthalate).

In a cored bar section of a lower mold set in a not-shown vertical molding machine, the rotor core 10 and the rotor magnet 3 are inserted and assembled from the end face on the side including the recesses 6 of the yoke 4.

Coaxiality of protrusions (not shown in the figure) fit in the cutouts 7 provided on the end face on the recesses 6 side of the yoke 4 of the rotor magnet 3 and a cylindrical section (not shown in the figure) provided in the cored bar section of the lower mold and fit in the inner diameter section of the rotor core 10 is secured. Consequently, when the mold is tightened, the protrusions of the cored bar section are pressed against the cutouts 7 having a taper shape and coaxiality of the outer circumference of the resin magnet 5 and the shaft (the shaft 1) is secured.

The rotor core 10 is set in substantially the center of the rotor magnet 3 by the mold cored bar section (see FIG. 1). Consequently, the rotor core 10 is set in the position of the center of gravity of the rotor magnet 3 and a reduction in noise and a reduction in vibration of the electric motor can be attained.

Further, after the position detection magnet 11 is set on the pedestals 34 of the rotor magnet 3 in the mold, the upper mold is closed and thermoplastic resin such as PBT is injected. When the upper mold is closed, protrusions (not shown in the figure) provided in the upper mold and having coaxiality thereof secured are fitted in the inner circumference of the position detection magnet 11. Consequently, coaxiality of the position detection magnet 11 is also secured. Therefore, it is possible to attain improvement of the quality in manufacturing.

Figure 37:
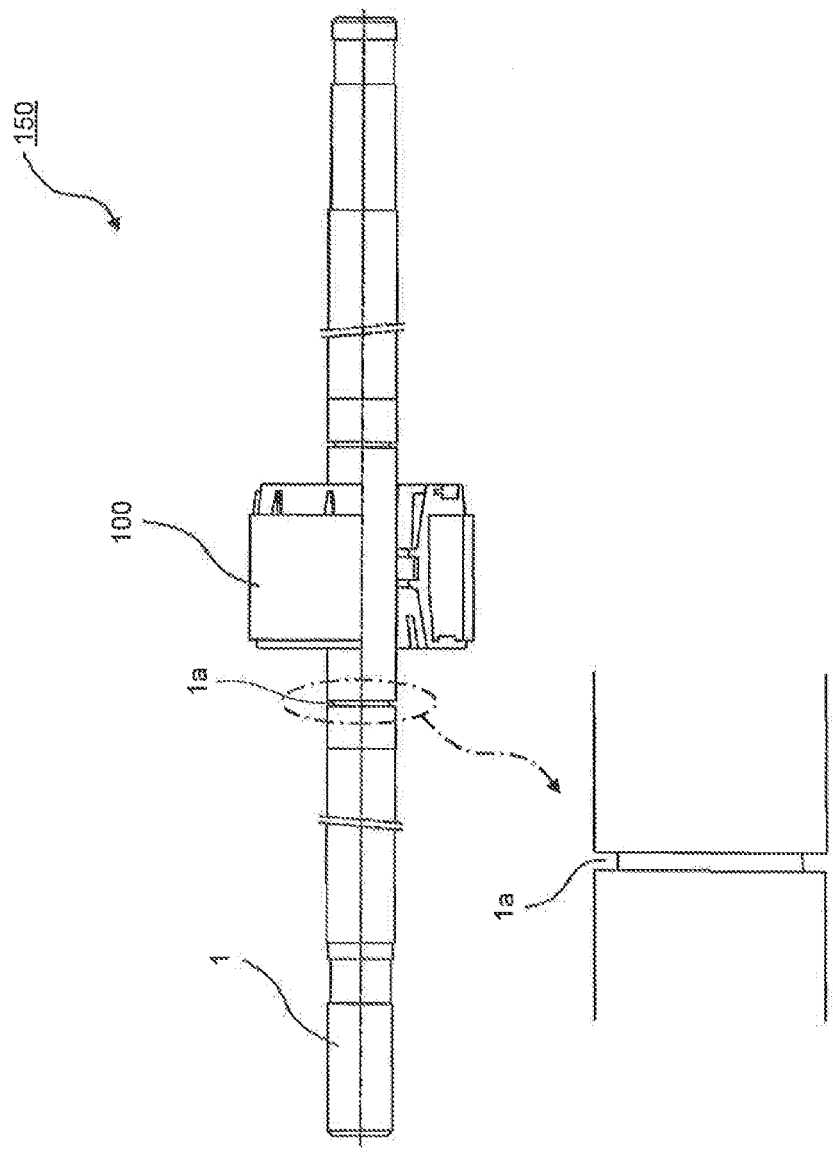
FIG. 37 is a front view of a rotor shaft assembly obtained by assembling the rotor resin assembly to the shaft by using caulking.

FIG. 37 is a front view of a rotor shaft assembly 150 in which the rotor resin assembly 100 is assembled to the shaft 1 by caulking.

The shaft 1 is inserted into an inner diameter section of the rotor core 10, and the rotor resin assembly 100 is crushed (caulked) by a jig to form a recess in the vicinity of the inner diameter sections of both the end faces of the rotor core 10 and assembled to the shaft 1.

The resin section 17 (see FIG. 1) is formed on both the end faces of the rotor core 10 from the outer circumference of the rotor core 10 to a predetermined distance on the inner circumferential side. Consequently, the outer circumference of the rotor core 10 is suppressed from widening in the axial direction in the caulking (when pressed by the jig). Therefore, it is possible to attain an improvement of the quality in manufacturing.

In the shaft 1, E-ring grooves 1a, in which E rings (explained below) are assembled, are formed in predetermined positions from both of the end face sides of the rotor resin assembly 100.

Figure 38:
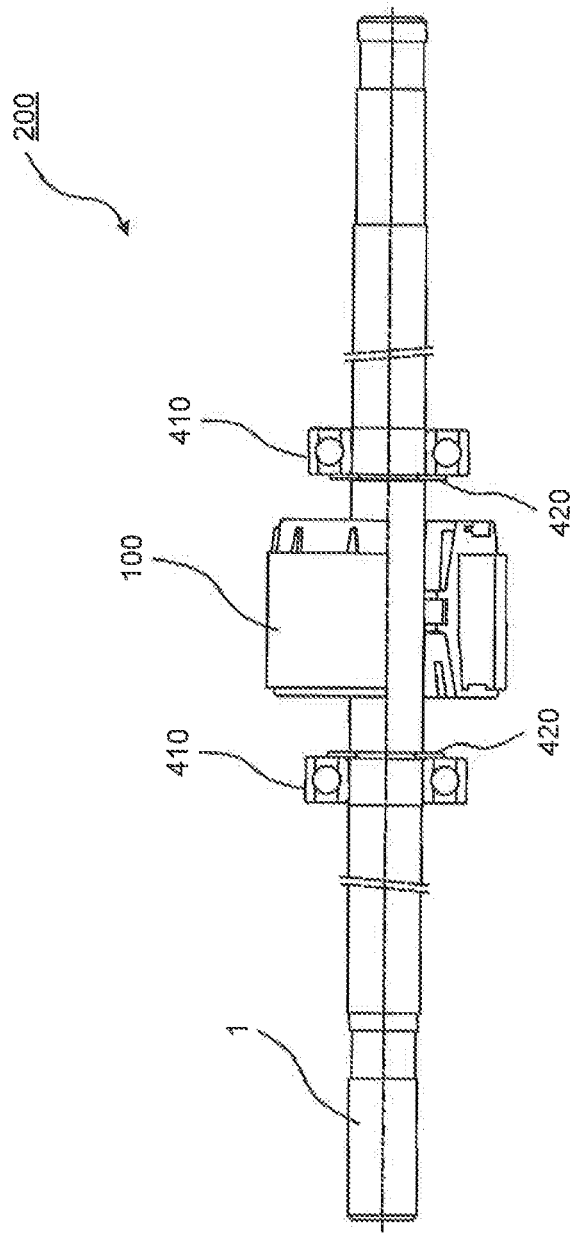
FIG. 38 is a front view of the rotor obtained by assembling an E ring and a bearing to the shaft shown in FIG. 37.

FIG. 38 is a front view of a rotor 200 in which E rings 420 and bearings 410 are assembled to the shaft 1 shown in FIG. 37.

After the resin magnet 5 and the position detection magnet 11 of the rotor resin assembly 100 are magnetized, two E rings 420 are assembled to the E-ring grooves 1a of the shaft 1 and the bearings 410 are assembled to come into contact with the E rings 420. Consequently, the rotor 200 is completed.

In this way, because the length and the position of the shaft 1 can be arbitrarily selected with respect to the rotor 200, it is possible to reduce costs in manufacturing. Specifically, in a rotor in which the shaft 1, the rotor magnet 3, and the position detection magnet 11 are integrated by thermoplastic resin, shaft length is limited to the mold opening amount in resin molding. When the position of the rotor in the shaft 1 changes, molds for respective positions are necessary. However, the rotor 200 in this embodiment is released from such limitations.

As an example of the embodiment, the rotor magnet 3 is used in which the outer circumference of the yoke 4 is formed in a wavy shape (a curved concave shape and a curved convex shape) and the resin magnet 5 is integrally molded in the outer circumference. However, the rotor magnet 3 can be formed by forming the outer circumference of the yoke 4 in a circular shape and providing a concave shape or a convex shape in a part of the outer circumference and then molding the resin magnet 5 in the outer circumference of the yoke 4.

The rotor magnet 3 can be formed by bonding a baked magnet or a molded resin magnet to the yoke 4. It goes without saying that, no matter what the outer circumference shape of the yoke 4 and the material of the magnet arranged in the outer circumference are, the outer circumference shape and the material are included in this embodiment as long as the configuration of the rotor magnet 3 is the same as the configuration in this embodiment.

Figure 39:
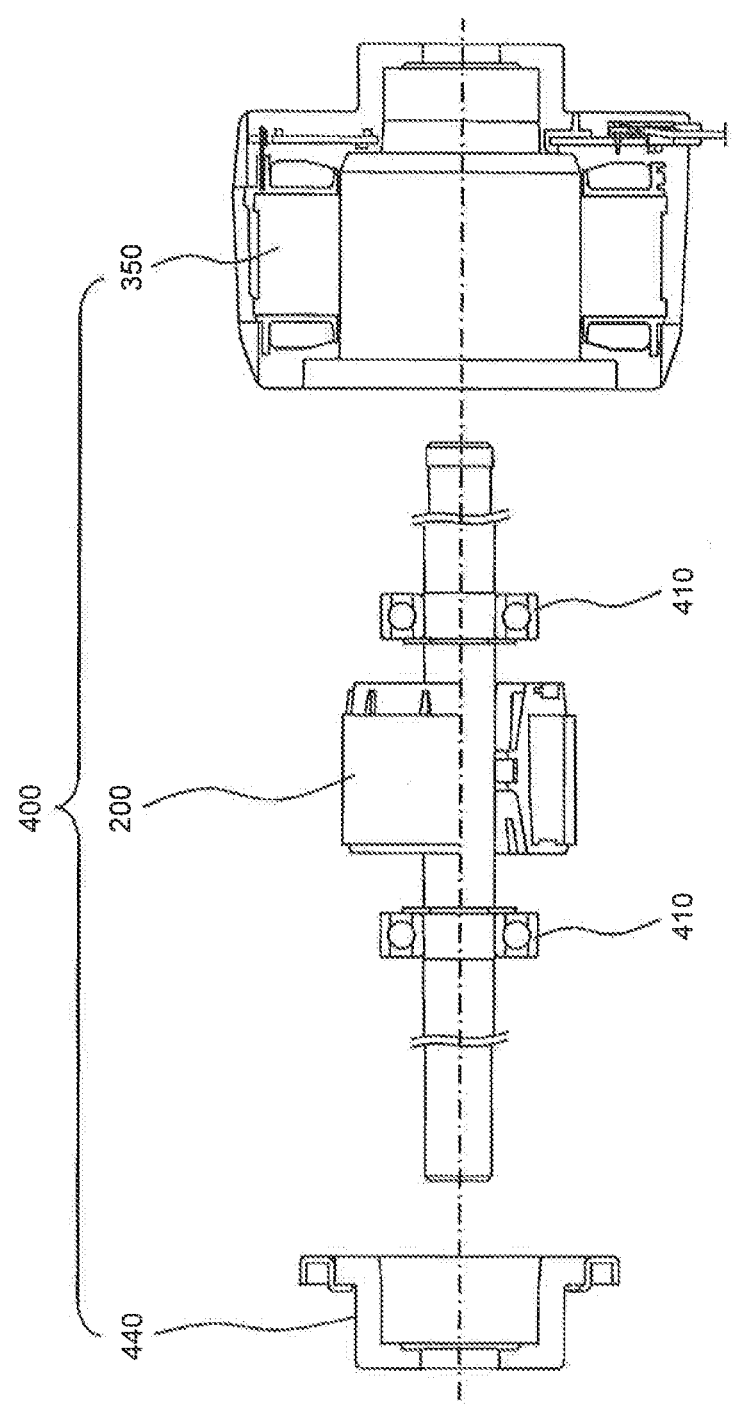
FIG. 39 is an exploded front view of a mold motor according to the embodiment of the present invention before assembly.
Figure 40:
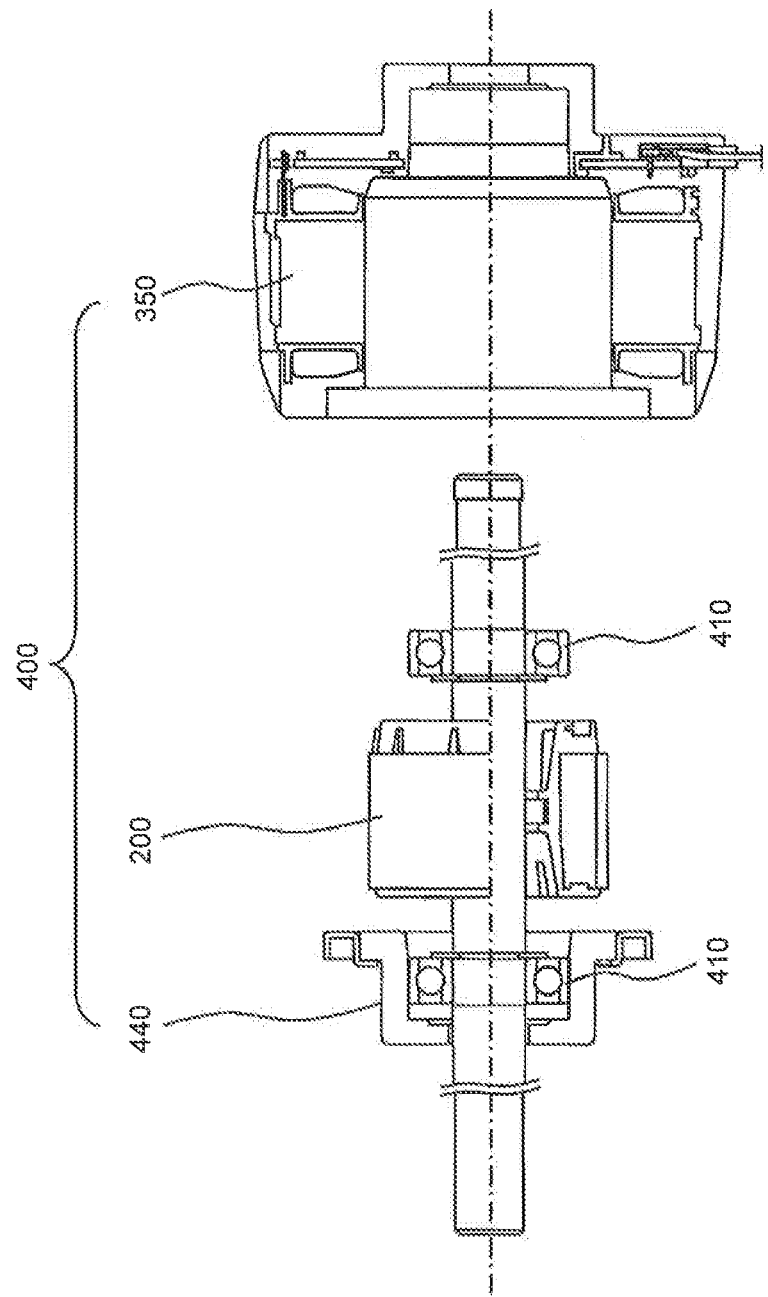
FIG. 40 is a front view of the mold motor.
Figure 41:
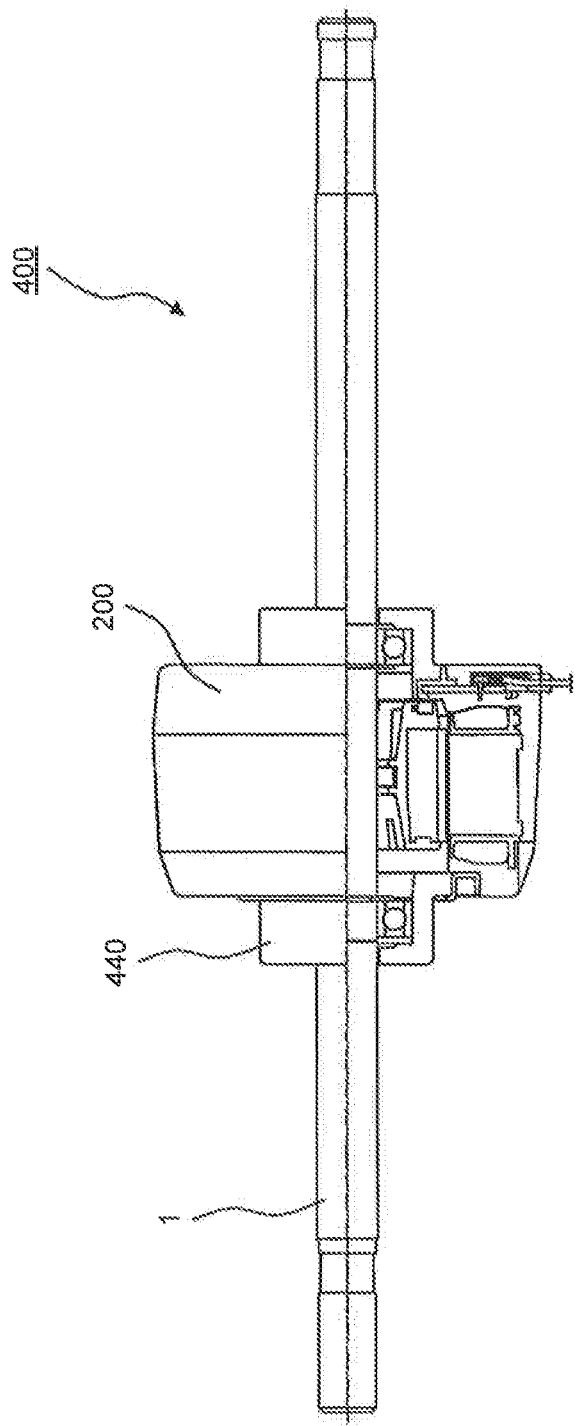
FIG. 41 is a front view of the mold motor.

FIG. 39 is an exploded front view of a mold motor 400 according to the embodiment of the present invention before assembly. FIG. 40 is an exploded front view of the mold motor 400 before assembly in a state in which a bracket 440 is fit in the bearings 410. FIG. 41 is a front view of the mold motor 400.

As shown in FIGS. 39 to 41, the mold motor 400 includes a mold stator 350, the rotor 200, and the bracket 440 (explained below).

In the mold motor 400, for example, as shown in FIG. 40, first, the bracket 440 is fit in one bearing 410 (provided on the opposite side of the position detection magnet 11). The fitting of the bracket 440 and the one bearing 410 is a loose fitting. Although not shown in the figure, a wavy washer is provided in a gap in the axial direction between the bracket 440 and the one bearing 410. However, the wavy washer can be provided in a gap in the axial direction between the mold stator 350 and the other bearing 410.

Thereafter, the rotor 200, in which the bracket 440 is fit in the one bearing 410, is assembled to the mold stator 350. Consequently, the mold motor 400 shown in FIG. 41 is completed.

Figure 42:
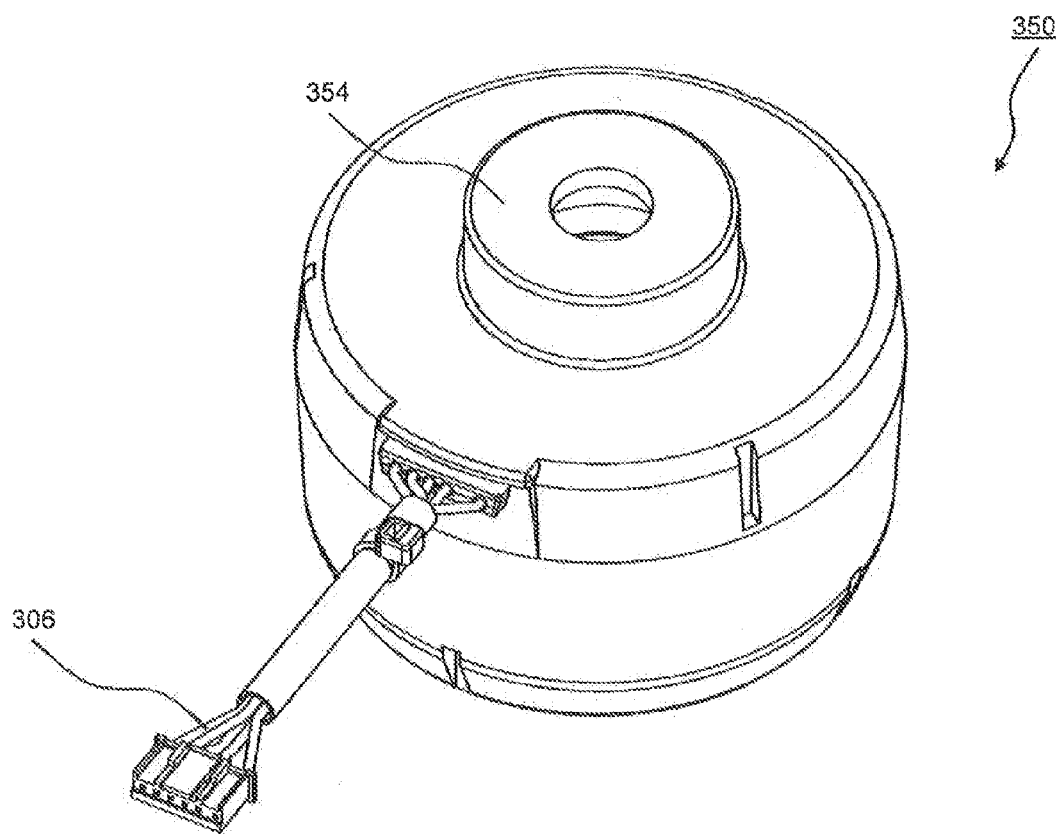
FIG. 42 is a perspective view of a mold stator.
Figure 43:
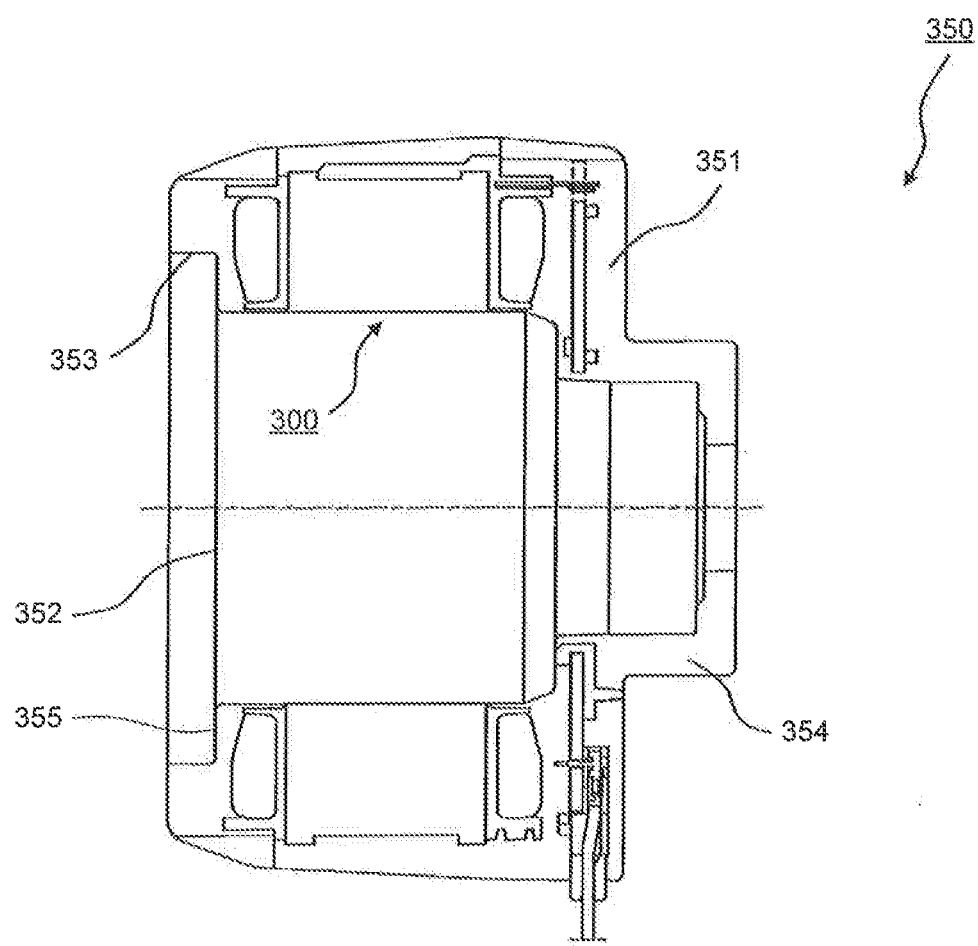
FIG. 43 is a sectional view of the mold stator.
Figure 44:
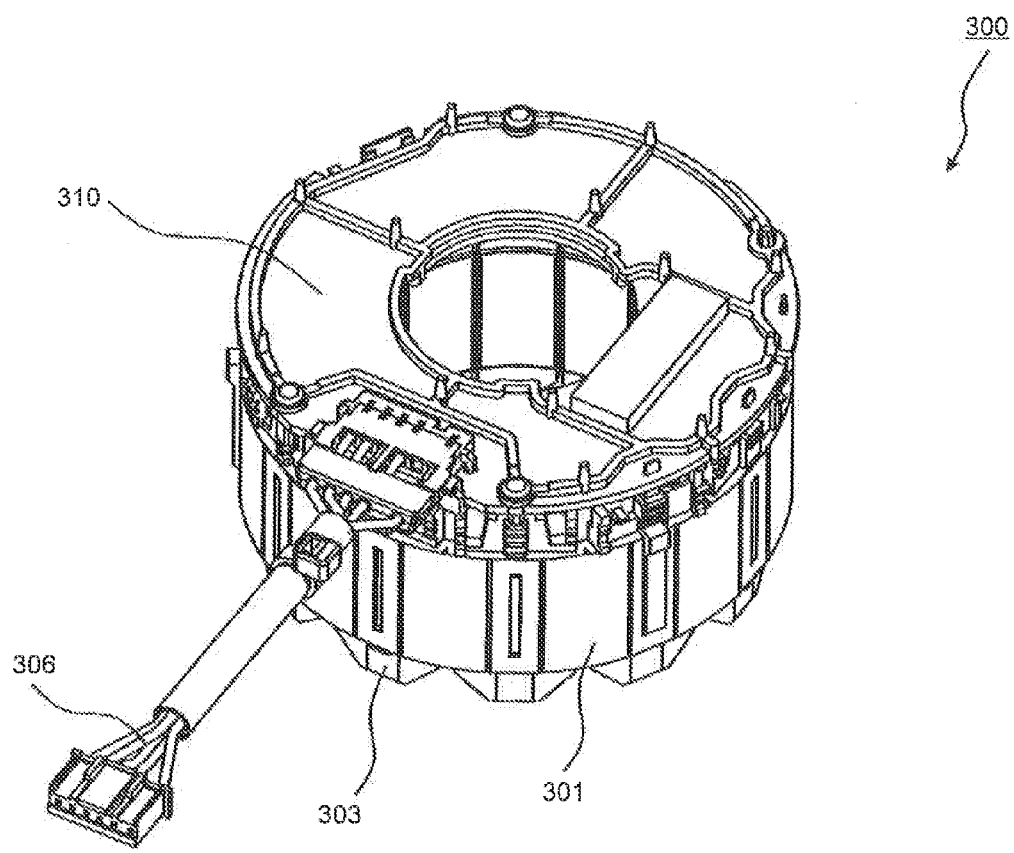
FIG. 44 is a perspective view of a stator.

FIG. 42 is a perspective view of the mold stator 350. FIG. 43 is a sectional view of the mold stator 350. FIG. 44 is a perspective view of a stator 300.

The stator 300 in this embodiment includes lead wires 306 connected to the outside after insulating sections 303 are applied to a stator iron core 301 and a magnet wire is wound around the insulating sections 303 formed in a teeth section. Further, in the stator 300, a substrate 310 mounted with a driving circuit (explained below) is provided at a wire bound side end of the stator 300.

The stator 300 is molded with thermosetting resin (mold resin 351) such as BMC resin (Bulk Molding Compound, lump clay-like thermosetting resin obtained by adding various additives to unsaturated polyester resin) to be formed as the mold stator 350.

In the mold stator 350, an opening section 352 formed by a cored bar section of a die for molding the mold stator 350 and a bracket press-fitting section 353 provided near the opening section 352 and formed at a diameter larger than a stator diameter are formed. Further, a fitting section of the inner diameter section of the stator 300 and a fitting section of a bearing housing section 354 on one side are formed by the cored bar section of the die, the coaxiality of which with the bracket press-fitting section 353 is secured, whereby the coaxiality of the rotor 200 with respect to the stator 300 is secured. Consequently, the high-quality mold motor 400 having low noise and low vibration can be obtained. It is possible to attain improvement of electrolytic corrosion resistance of the bearing 410 by forming a bearing housing section 354 only with resin that is electrically insulated.

Figure 45:
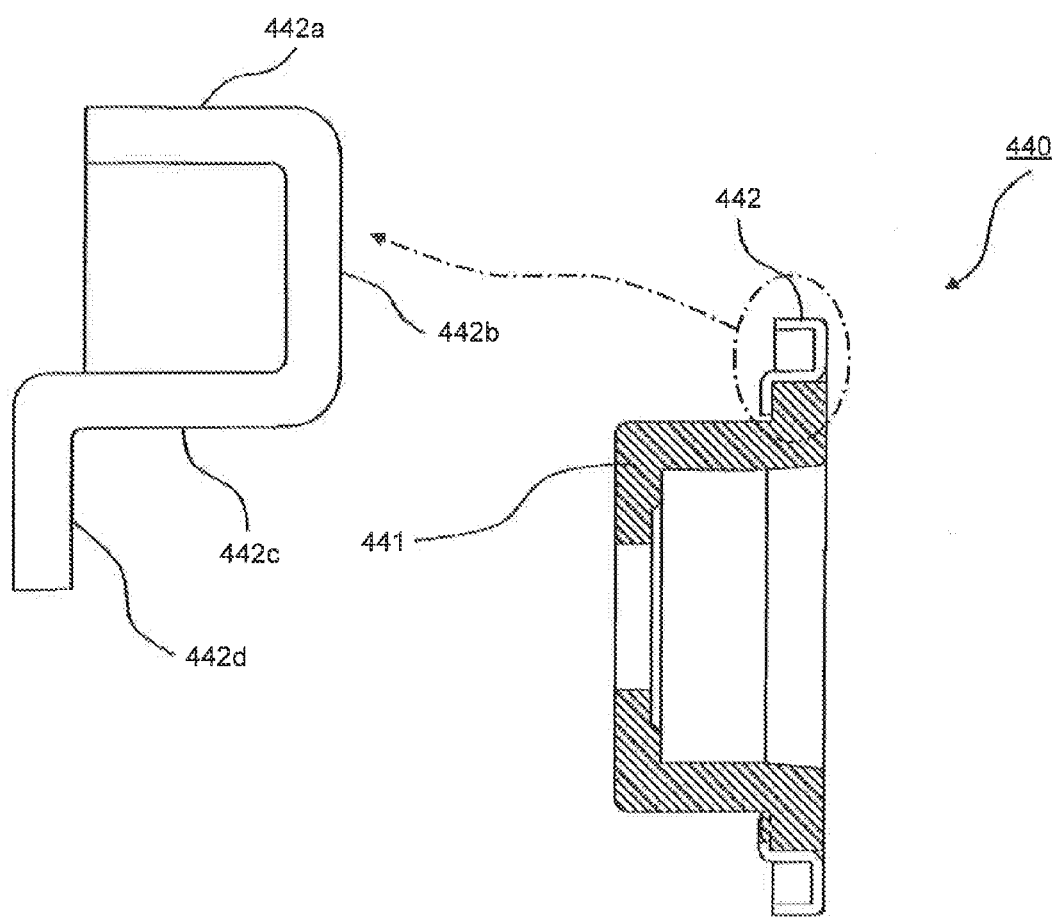
FIG. 45 is a sectional view of a bracket.
Figure 46:
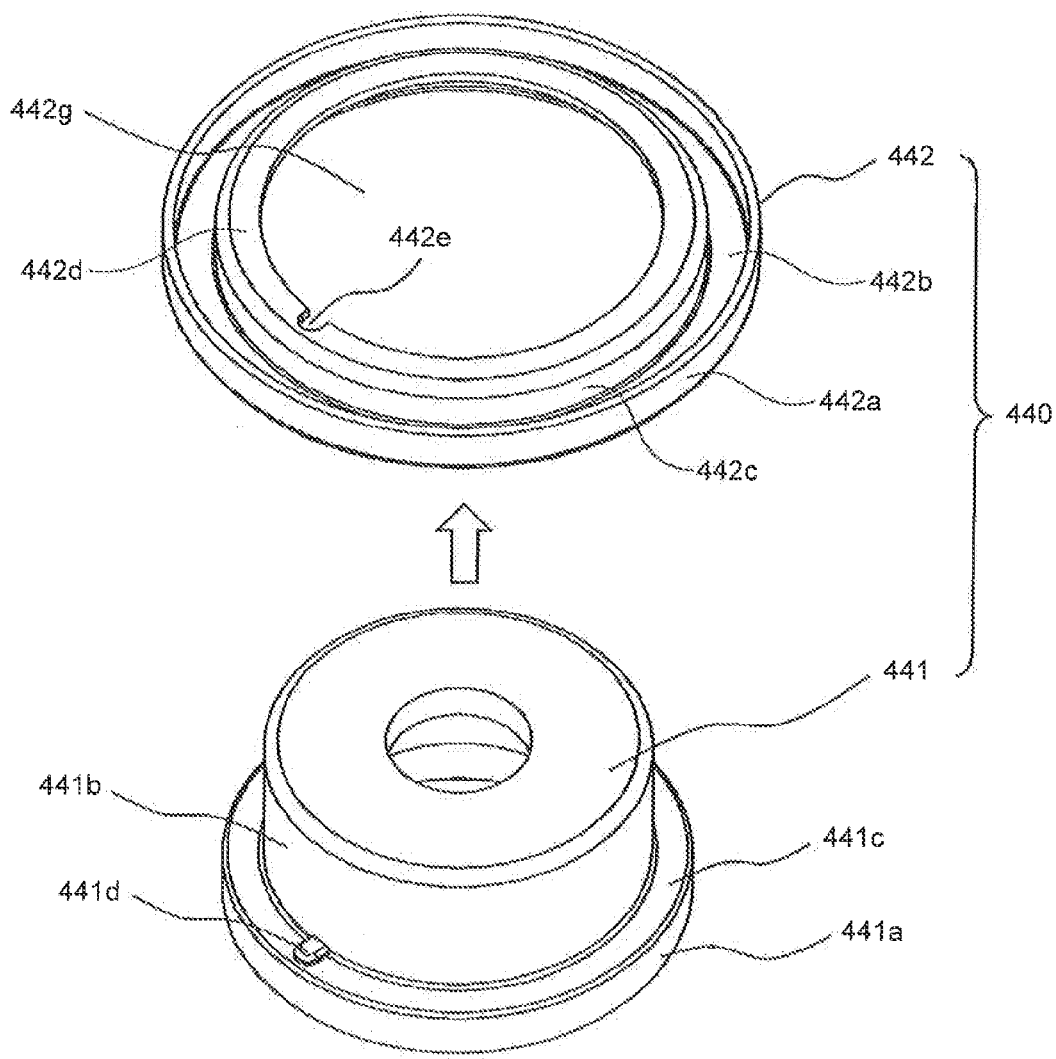
FIG. 46 is an exploded perspective view of the bracket.
Figure 47:
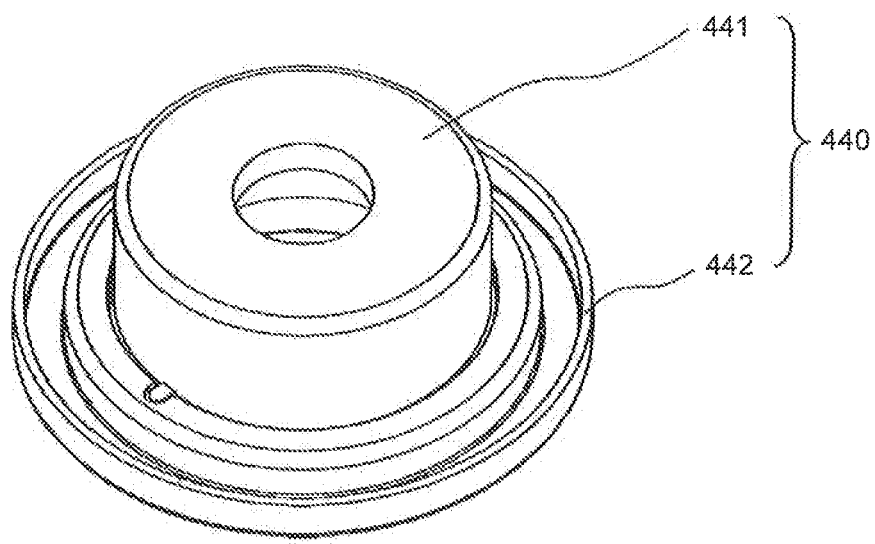
FIG. 47 is a perspective view of the bracket.
Figure 48:
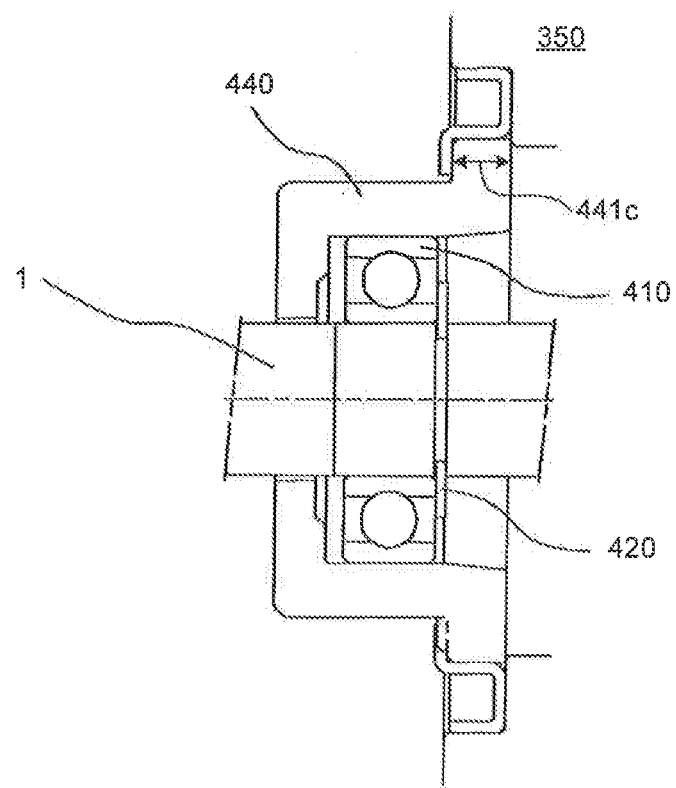
FIG. 48 is a partially enlarged view of a state in which the bracket that is fit in the bearing is press-fit into the mold stator.

FIG. 45 is a sectional view of the bracket 440. FIG. 46 is an exploded perspective view of the bracket 440. FIG. 47 is a perspective view of the bracket. FIG. 48 is a partially enlarged view of a state in which the bracket 440 fit in the bearing 410 is press-fit into the mold stator 350. FIG. 48 is a partially enlarged view of the mold motor 400. In the following explanation, explanation of the figure is omitted.

An example of the bracket 440 is explained with reference to FIGS. 45 to 48. The bracket 440 is configured from a bracket sheet metal section 442 and a bracket resin section 441. The bracket sheet metal section 442 and the bracket resin section 441 are respectively manufactured in separate processes. The bracket 440 is configured by combining the bracket sheet metal section 442 and the bracket resin section 441.

The bracket sheet metal section 442 of the bracket 440 is configured as a press-fitting section into the mold stator 350. The bracket resin section 441 of the bracket 440 is configured as a bearing housing section.

In this way, the bracket resin section 441 to be formed as the bearing housing section of the bracket 440 is formed by only electrically insulated resin together with the bearing housing section 354 (see FIG. 43) of the mold stator 350. Consequently, it is possible to attain an improvement of the electrolytic corrosion resistance of the bearing 410. Therefore, the quality of the mold motor 400 is improved.

When the outer circumferential surface diameter of the bracket resin section 441 is set to a dimension that is the same as the outer circumferential surface diameter of the bearing housing section 354 (see FIG. 43), in an electric motor in which a rubber vibration insulator (not shown in the figure) is attached to the outer circumference of the bearing housing section 354, the same component (the rubber vibration insulator) can be used for the outer circumferential surface of the bracket resin section 441. Therefore, it is possible to attain a reduction in manufacturing costs and an improvement of the quality in manufacturing.

The bracket sheet metal section 442 of the bracket 440 shown in FIG. 45 are bent in three places.

(1) An outer circumferential section 442a of the bracket sheet metal section 442 is formed as a section press-fit into the bracket press-fitting section 353 (see FIG. 43) of the mold stator 350.

(2) A section bent 90° to the inner diameter direction of the bracket 440 with respect to the outer circumferential section 442a of the bracket sheet metal section 442 is formed as an axial direction setting surface 442b for the bracket press-fitting section 353 of the mold stator 350.

(3) Further, an inner circumferential section 442c bent 90° to the outer circumferential surface direction of the bracket resin section 441 from the inner diameter section of the axial direction setting surface 442b is formed as a section into which a press-fitting section 441a (see FIG. 46) of the bracket resin section 441 is press-fit.

(4) Further, a section bent 90° to the inner diameter direction of the bracket 440 is formed as an axial direction setting surface 442d that comes into contact with an axial direction setting surface 441c of the bracket resin section 441.

An opening section 442g of the bracket sheet metal section 442 is formed in a diameter larger than the outer circumference of a bearing housing section 441b of the bracket resin section 441.

A protrusion 441d functioning as a whirl stop is formed on the axial direction setting surface 441c of the bracket sheet metal section 442 of the bracket resin section 441.

On the axial direction setting surface 442d of the bracket resin section 441 of the bracket sheet metal section 442, a cutout 442e, in which the protrusion 441d for a whirl stop for the bracket resin section 441 is fit, is formed.

The diameter of the press-fitting section 441a of the bracket resin section 441 is set larger than the inner diameter of the stator 300. The length in the axial direction of the press-fitting section 441a of the bracket resin section 441 is set the same as the distance between an axial direction setting surface 355 (see FIG. 43) of the mold stator 350 and the axial direction setting surface 441c of the bracket resin section 441. Consequently, when the bracket 440 is assembled to the mold stator 350, the bracket resin section 441 is held between the bracket sheet metal section 442 and the mold stator 350 and does not move in the axial direction. Therefore, it is possible to attain an improvement of the quality.

In the bracket 440 shown in FIGS. 45 to 48, the bracket sheet metal section 442 is bent in three places. The outer circumferential section of the bracket sheet metal section 442 is formed as a section press-fit into the bracket press-fitting section 353 of the mold stator 350. A section bent 90° with respect to the outer circumferential section 442a of the bracket sheet metal section 442 is formed as the axial direction setting surface 442b of the bracket press-fitting section 353. The section is further bent 90° or less to form an inner wall (the inner circumferential section 442c) and further bent to form a surface (the axial direction setting surface 442d) parallel to a setting surface in the axial direction of the bracket press-fitting section 353.

In the opening section 442g of the bracket sheet metal section 442, the cutout 442e combined with the protrusion 441d provided in the bracket resin section 441 to be formed as a whirl stop when the bracket resin section 441 is assembled to the bracket sheet metal section 442 is formed. When the bracket sheet metal section 442 and the bracket resin section 441 are integrated, the rotation of the bracket resin section 441 can be prevented. Therefore, noise and vibration are reduced and it is possible to realize an improvement of the quality.

Figure 49:
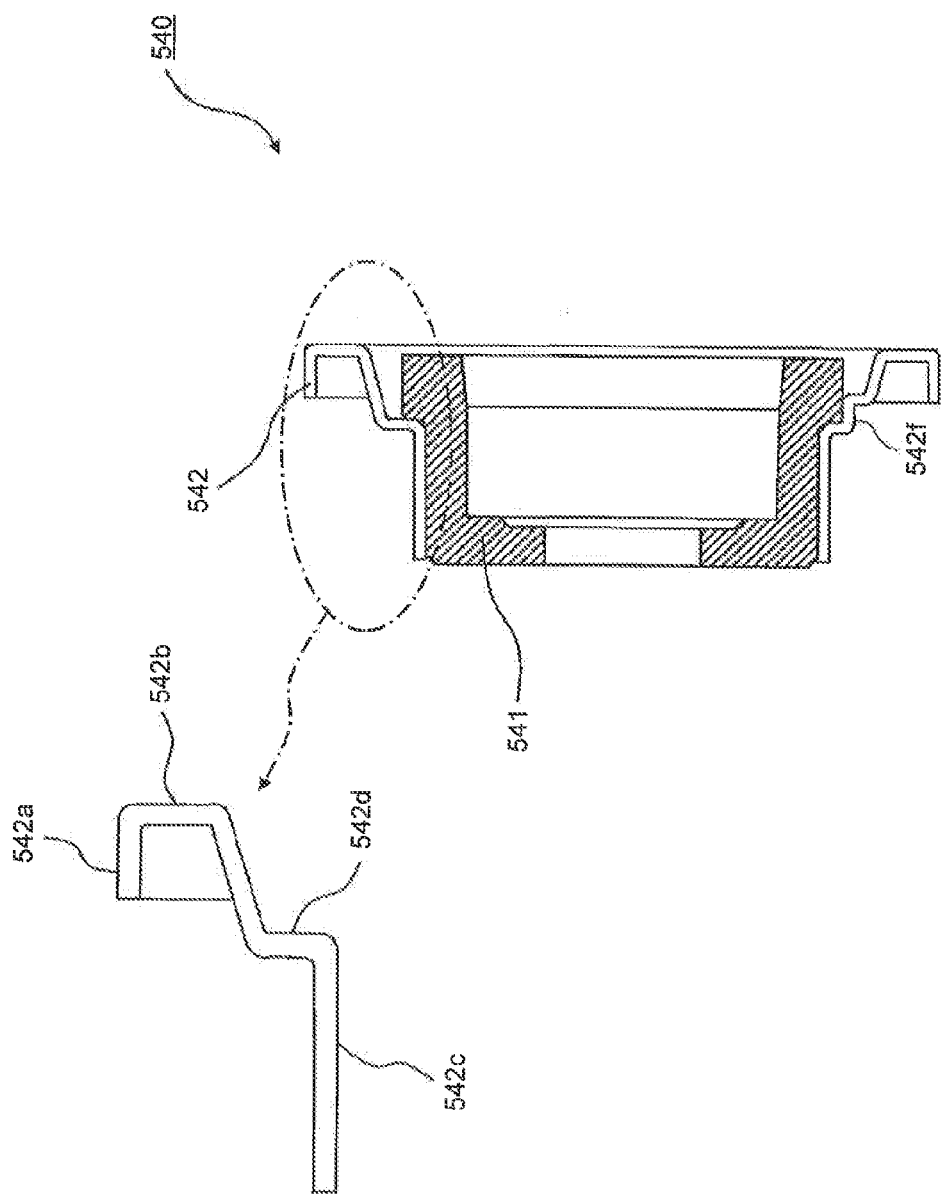
FIG. 49 is a diagram of a first modification of the bracket.
Figure 50:
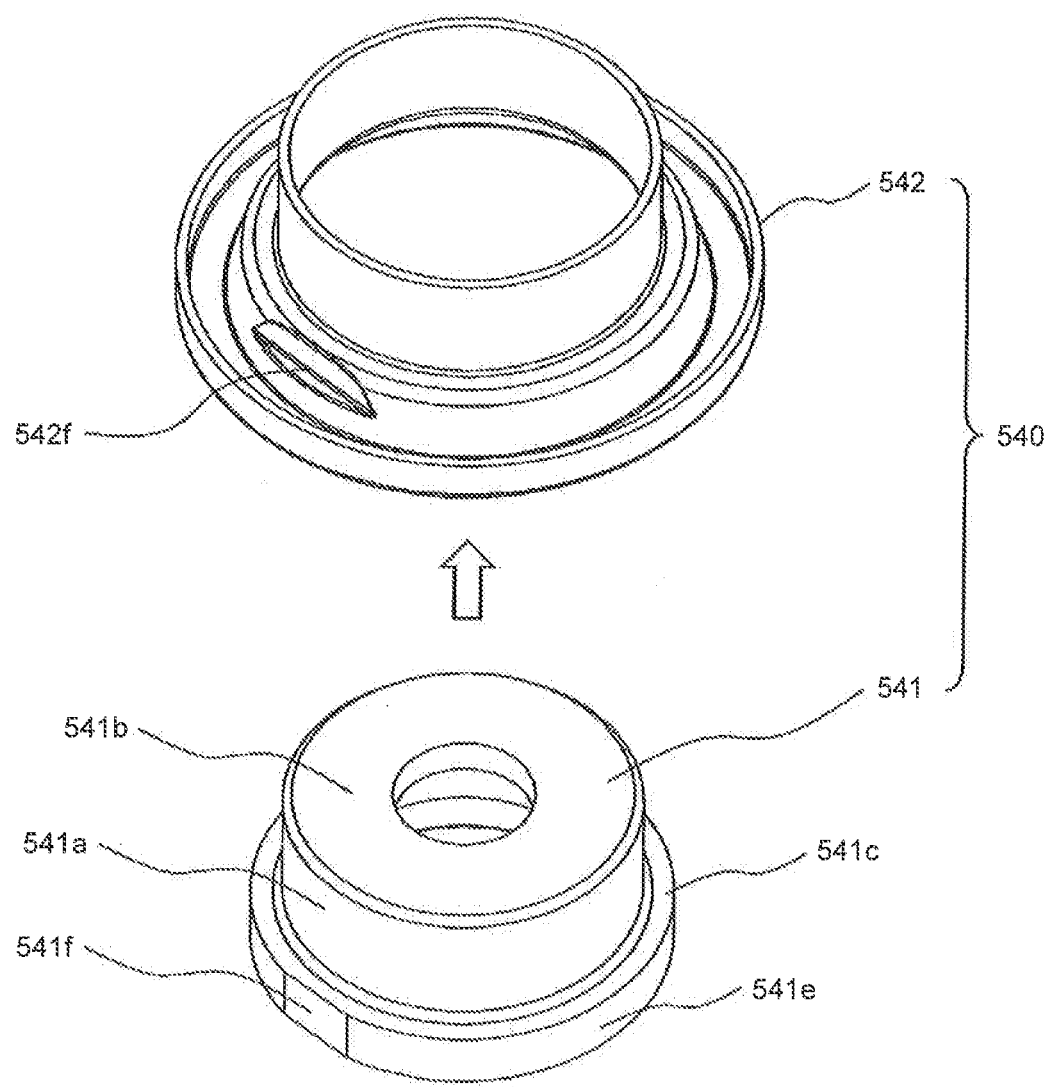
FIG. 50 is an exploded perspective view of the bracket shown in FIG. 49.
Figure 51:
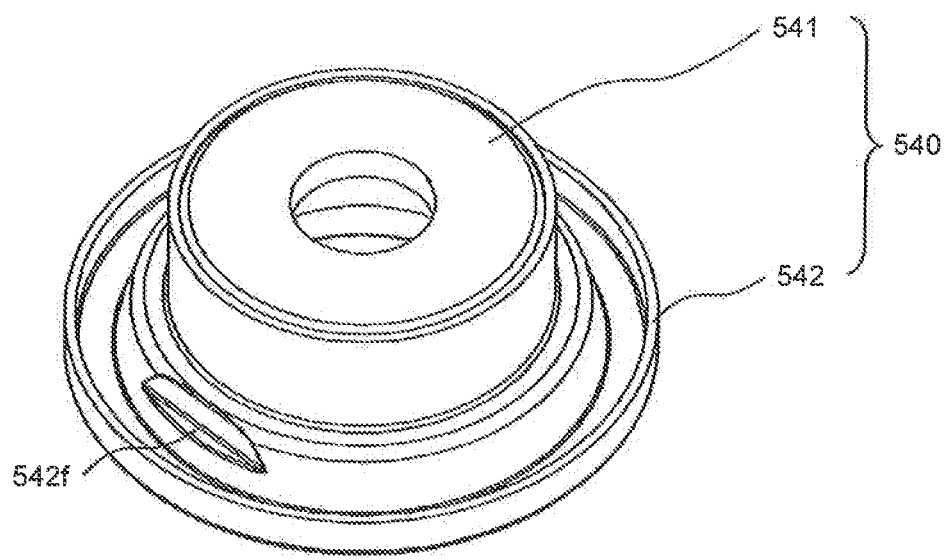
FIG. 51 is a perspective view of the bracket shown in FIG. 49.
Figure 52:
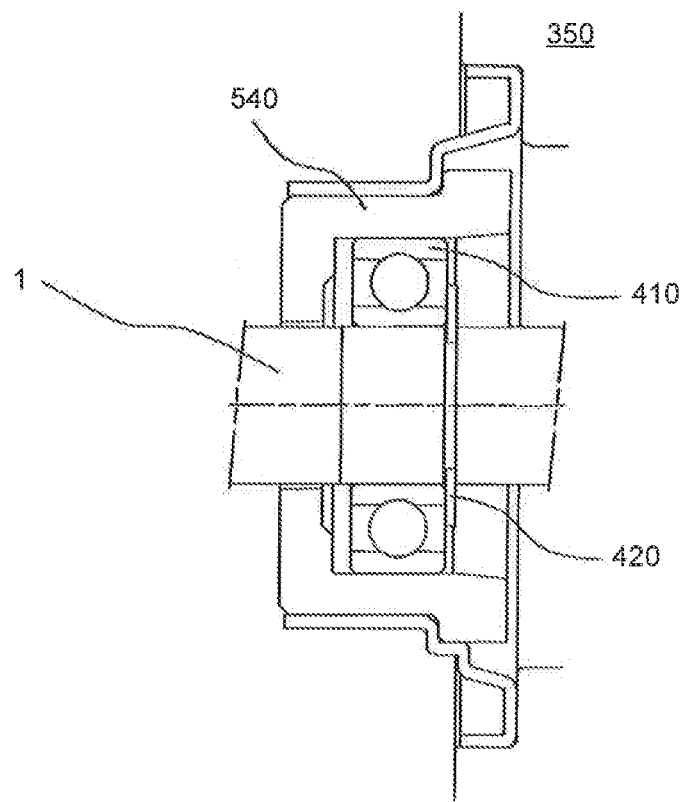
FIG. 52 is a partially enlarged view of a state in which the bracket that is fit in the bearing is press-fit into the mold stator.

FIG. 49 is a diagram of a first modification of the bracket (a bracket 540). FIG. 50 is an exploded perspective view of the bracket 540 shown in FIG. 49. FIG. 51 is a perspective view of the bracket 540 shown in FIG. 49. FIG. 52 is a partially enlarged view of a state in which the bearing 410 fit in the bracket 540 shown in FIG. 49 is press-fit into the mold stator 350.

The bracket 540 in the first modification is explained with reference to FIGS. 49 to 52. The bracket 540 in the first modification is different from the bracket 440 (see FIG. 45) in that the outer circumferential surface of a bearing housing section 541b of a bracket resin section 541 is formed as a press-fitting section 541a.

In the bracket 540, a cutout 541f is formed in the outer circumference of a brim section 541e having a diameter larger than the press-fitting section 541a. The cutout 541f engages with a flat section 542f of a bracket sheet metal section 542 and functions as a whirl stop in a state in which the bracket resin section 541 is press-fit into the bracket sheet metal section 542.

The bracket sheet metal section 542 shown in FIG. 49 is bent in four places.

(1) An outer circumferential section 542a of the bracket sheet metal section 542 is formed as a section press-fit into the bracket press-fitting section 353 (see FIG. 43).

(2) A section bent 90° from the outer circumferential section 542a to the inner diameter direction of the bracket 540 is formed as an axial direction setting surface 542b for the bracket press-fitting section 353.

(3) Further, a section bent from the inner diameter section of the axial direction setting surface 542b to the direction of the press-fitting section 541a and coming into contact with an axial direction setting surface 541c is formed as an axial direction setting surface 542d.

(4) A section extended from the inner diameter section of the axial direction setting surface 542d to the axial direction is formed as a press-fitting section 542c that comes into contact with the press-fitting section 541a.

In the bracket 540, stray capacitance between the bracket sheet metal section 542 and the bearing 410 is within an allowable range. Although the bracket 540 is slightly larger than the bracket 440 (see FIG. 52), in the bracket 540, the axial direction distance of the press-fitting section 542c of the bracket sheet metal section 542 can be secured for a long time, and the press-fitting section 541a is held in the press-fitting section 542c. Therefore, the press-fitting margin of the brim section 541e into the inner circumferential surface of the bracket sheet metal section 542 can be set small compared with the bracket 440. It is possible to reduce distortion of the bracket sheet metal section 542 and attain an improvement of the quality in manufacturing.

Figure 53:
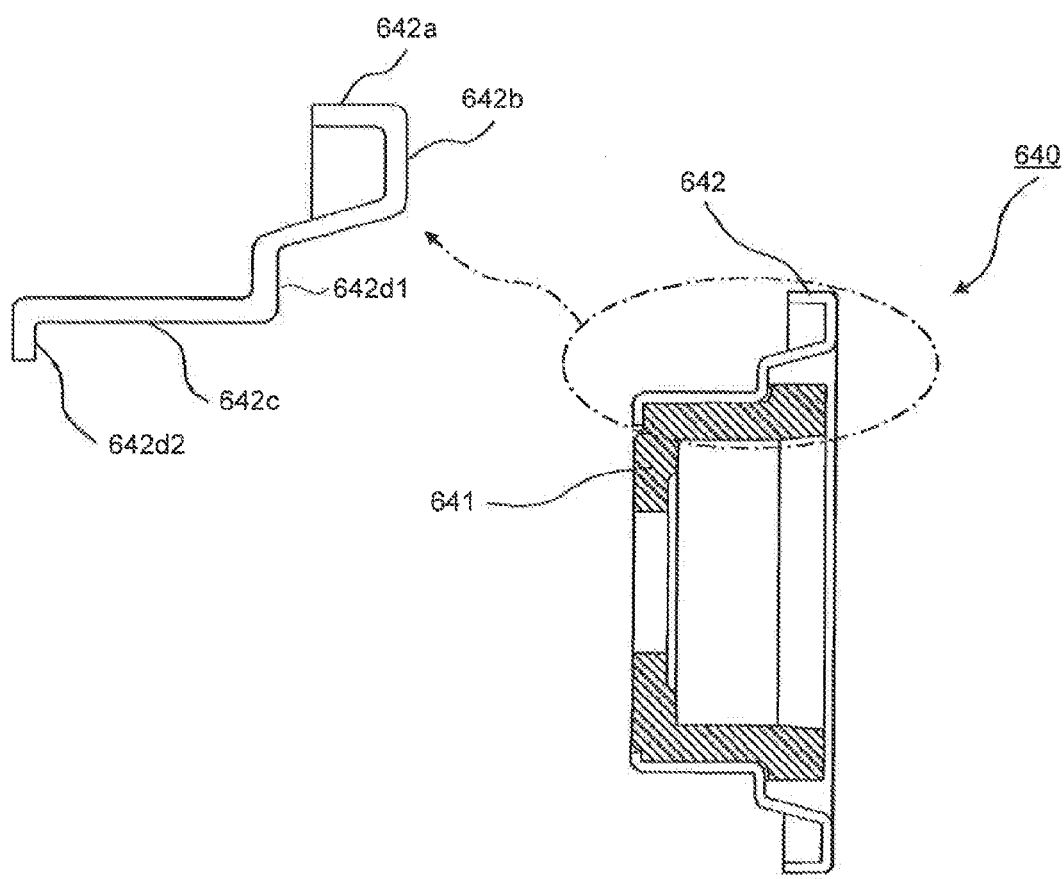
FIG. 53 is a sectional view of a second modification of the bracket.
Figure 54:
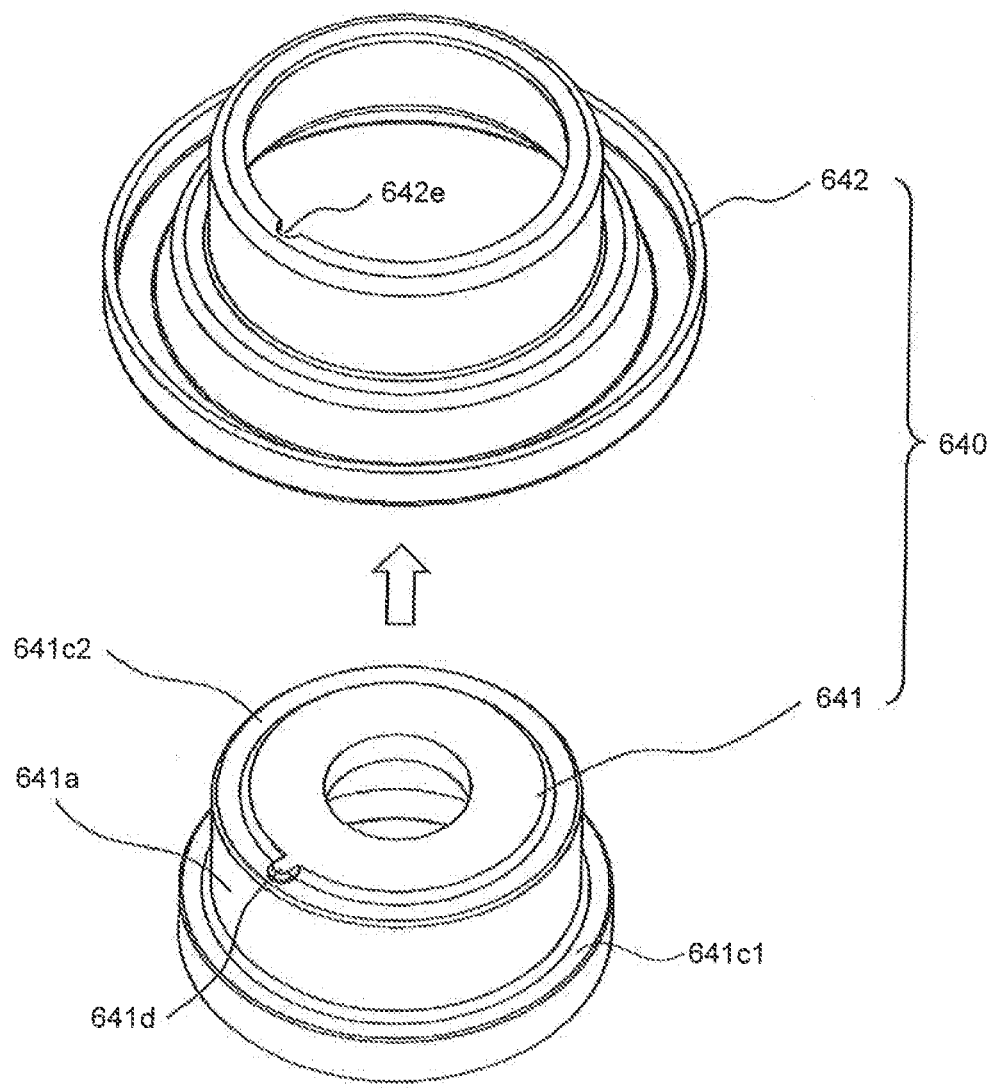
FIG. 54 is an exploded perspective view of the bracket shown in FIG. 53.
Figure 55:
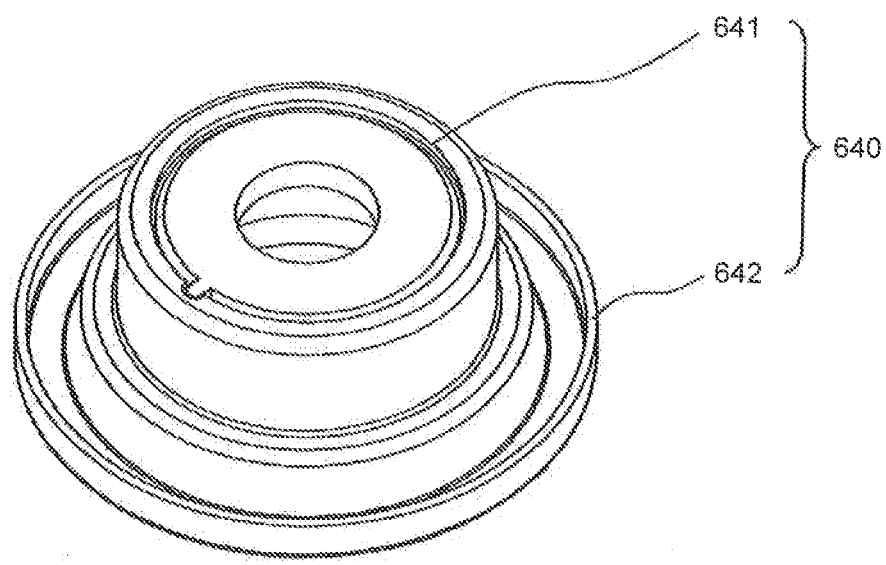
FIG. 55 is a perspective view of the bracket shown in FIG. 53.
Figure 56:
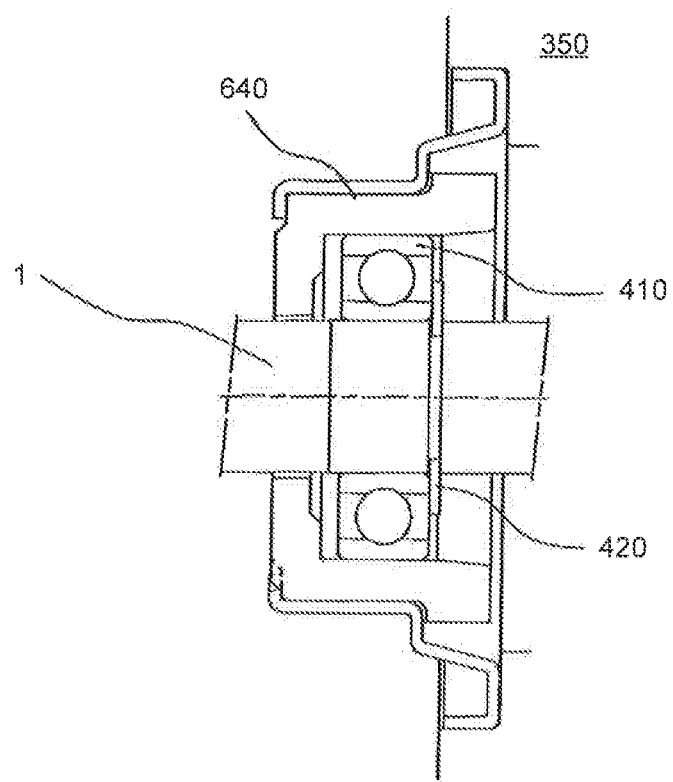
FIG. 56 is a partially enlarged view of a state in which the bracket that is fit in the bearing is press-fit into the mold stator.

FIG. 53 is a sectional view of a second modification of the bracket (a bracket 640). FIG. 54 is an exploded perspective view of the bracket 640 shown in FIG. 53. FIG. 55 is a perspective view of the bracket 640 shown in FIG. 53. FIG. 56 is a partially enlarged view of a state in which the bracket 640 fit in the bearing 410 is press-fit into the mold stator 350.

The bracket 640 in the second modification is characterized in that an axial direction setting surface 642d2 bent 90° from a press-fitting section 642c to the inner circumferential side is formed in a bracket sheet metal section 642.

A cutout 642e functioning as a whirl stop is formed in the bracket sheet metal section 642. When a bracket resin section 641 is press-fit into and assembled to the bracket sheet metal section 642, a whirl stop protrusion 641d of the bracket resin section 641 is fit in the cutout 642e of the bracket sheet metal section 642 and functions as a whirl stop.

The bracket sheet metal section 642 shown in FIG. 53 is bent in five places.

(1) An outer circumferential section 642a of the bracket sheet metal section 642 is formed as a section press-fit into the bracket press-fitting section 353 (see FIG. 43).

(2) A section bent 90° from the outer circumferential section 642a to the inner diameter direction of the bracket 640 is formed as an axial direction setting surface 642b for the bracket press-fitting section 353.

(3) Further, a section bent from the inner diameter section of the axial direction setting surface 642b to the direction of a press-fitting section 641a and coming into contact with an axial direction setting surface 641c1 is formed as an axial direction setting surface 642d1.

(4) A section extended from the inner diameter section of the axial direction setting surface 642d1 to the axial direction is formed as the press-fitting section 642c that comes into contact with the press-fitting section 641a.

(5) Further, a section bent 90° from the press-fitting section 642c to the inner circumferential side and coming into contact with an axial direction setting surface 641c2 is formed as the axial direction setting surface 642d2.

In the bracket 540 in the first modification, it is likely that burrs occur on the axial direction end face of the section (the press-fitting section 542c) into which the bracket resin section 541 of the bracket sheet metal section 542 is press-fit. Therefore, processing for removing the burrs is necessary. It is anticipated that costs in manufacturing increase. However, in the bracket 640 in the second modification, the axial direction setting surface 642d2 is provided on the axial direction setting surface 641c2 of the bracket resin section 641. Therefore, burrs are absent in the section (the press-fitting section 642c) into which the bracket resin section 641 of the bracket sheet metal section 642 is press-fit. Therefore, even when burrs occur at the distal end of the axial direction setting surface 642d2, processing for removing the burrs is unnecessary. It is possible to reduce costs in manufacturing.

Figure 57:
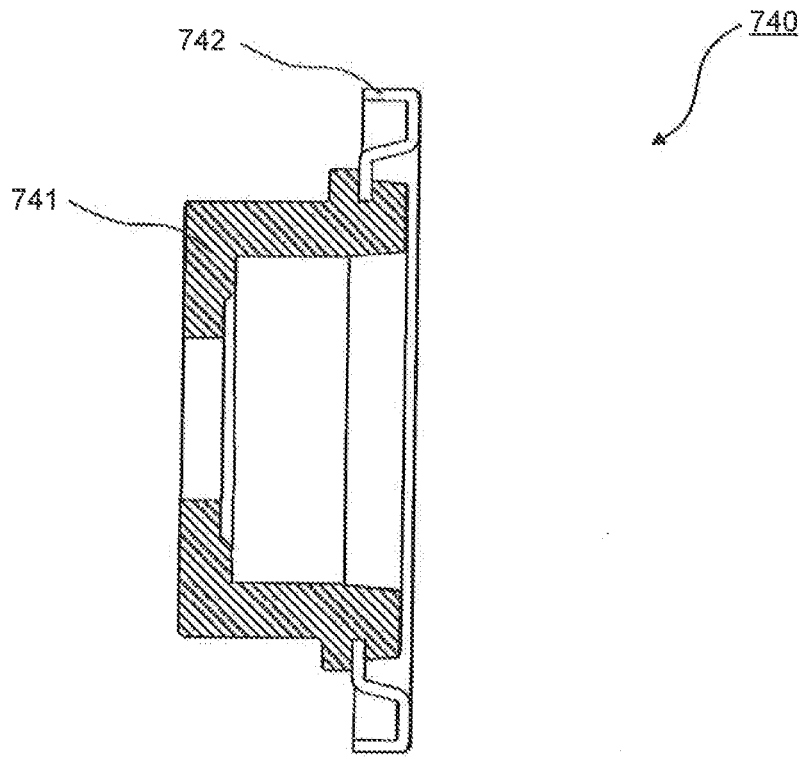
FIG. 57 is a sectional view of a third modification of the bracket.
Figure 58:
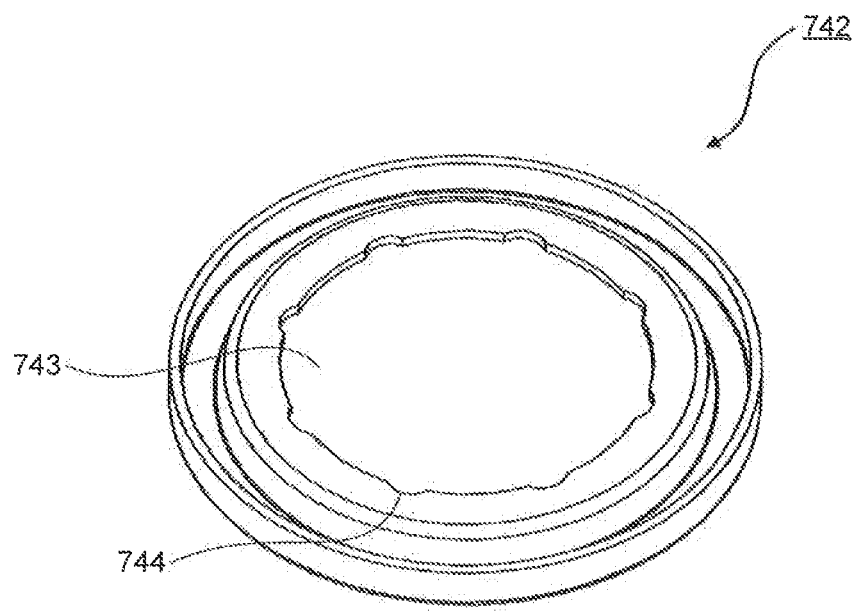
FIG. 58 is an exploded perspective view of the bracket shown in FIG. 57.
Figure 59:
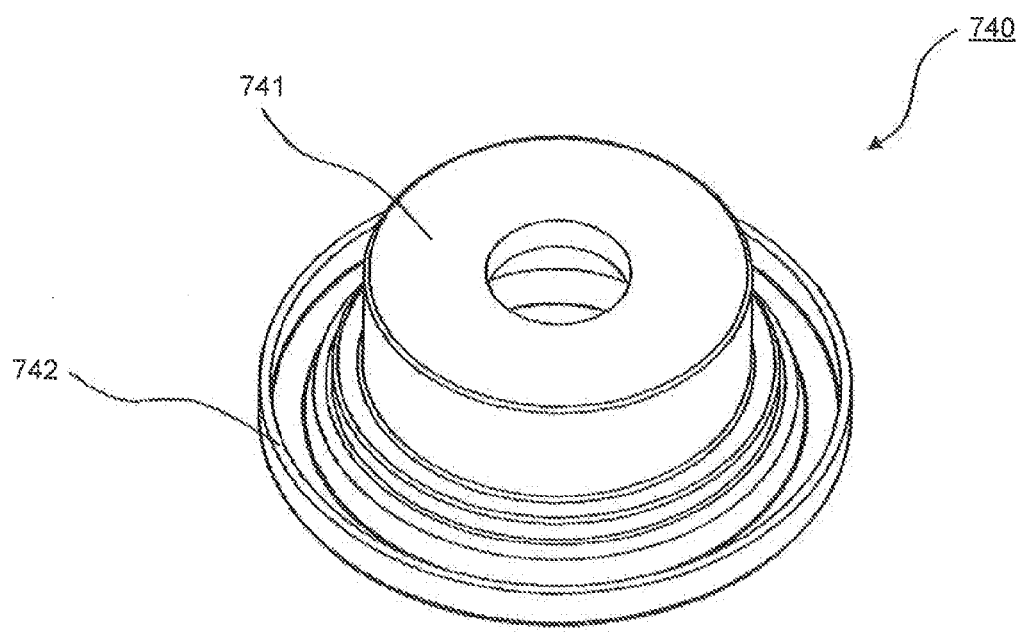
FIG. 59 is a perspective view of the bracket shown in FIG. 57.
Figure 60:
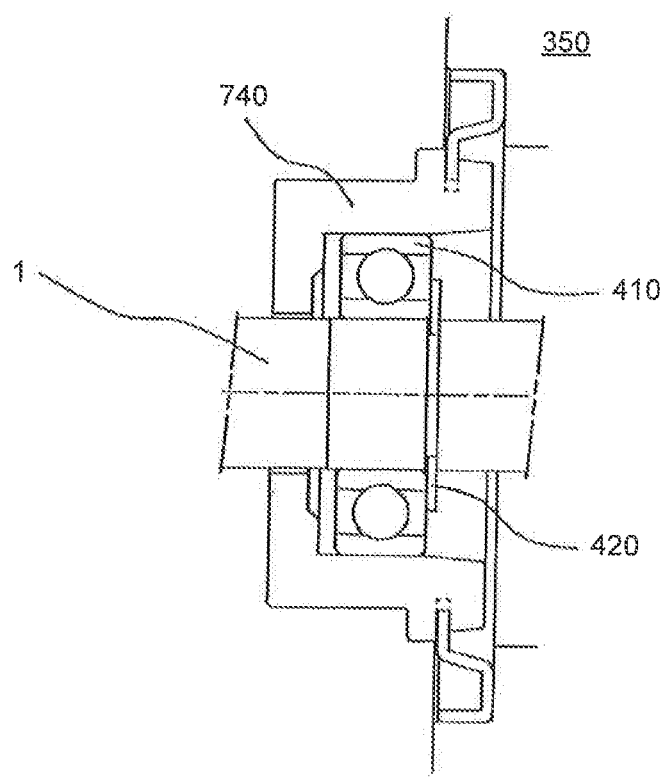
FIG. 60 is a partially enlarged view of a state in which the bracket that is fit in the bearing is press-fit into the mold stator.

FIG. 57 is a sectional view of a third modification of the bracket (a bracket 740). FIG. 58 is an exploded perspective view of the bracket 740 shown in FIG. 57. FIG. 59 is a perspective view of the bracket 740 shown in FIG. 57. FIG. 60 is a partially enlarged view of a state in which the bracket fit in the bearing 410 is press-fit into the mold stator 350.

The bracket 740 in the third modification is configured from two kinds of components, i.e., a bracket sheet metal section 742 and a bracket resin section 741. The bracket 740 in the third modification is formed by integrally molding the bracket resin section 741 with the bracket sheet metal section 742.

The bracket sheet metal section 742 forms a press-fitting section that is press-fit into the mold stator 350. The bracket resin section 741 forms a bearing housing section.

In this way, the bracket resin section 741 functioning as a bearing housing section of the bracket 740 is formed by only electrically insulated resin together with the bearing housing section of the mold stator 350. Consequently, it is possible to attain an improvement of the electrolytic corrosion resistance of the bearing 410. Therefore, the quality of the mold motor 400 is improved.

When the outer circumferential surface diameter of the bracket resin section 741 is set to a dimension that is the same as the outer circumferential surface diameter of the bearing housing section 354 (see FIG. 43), in an electric motor in which a rubber vibration insulator (not shown in the figure) is attached to the outer circumferential surface of the bearing housing section of the bearing housing section 354, the same component (the rubber vibration insulator) can be used for the outer circumferential surface of the bracket resin section 741. Therefore, it is possible to attain a reduction in manufacturing costs and an improvement of the quality in manufacturing. In the opening section 743 of the bracket sheet metal section 742, when the bracket resin section 741 and the bracket sheet metal section 742 are integrally molded, cutouts 744 functioning as whirl stops when the bracket resin section 741 is filled therein are formed. Instead of the cutouts 744, holes functioning as whirl stops when embedded in thermoplastic resin can be provided near the inner circumferential section of the bracket sheet metal section 742.

Figure 61:
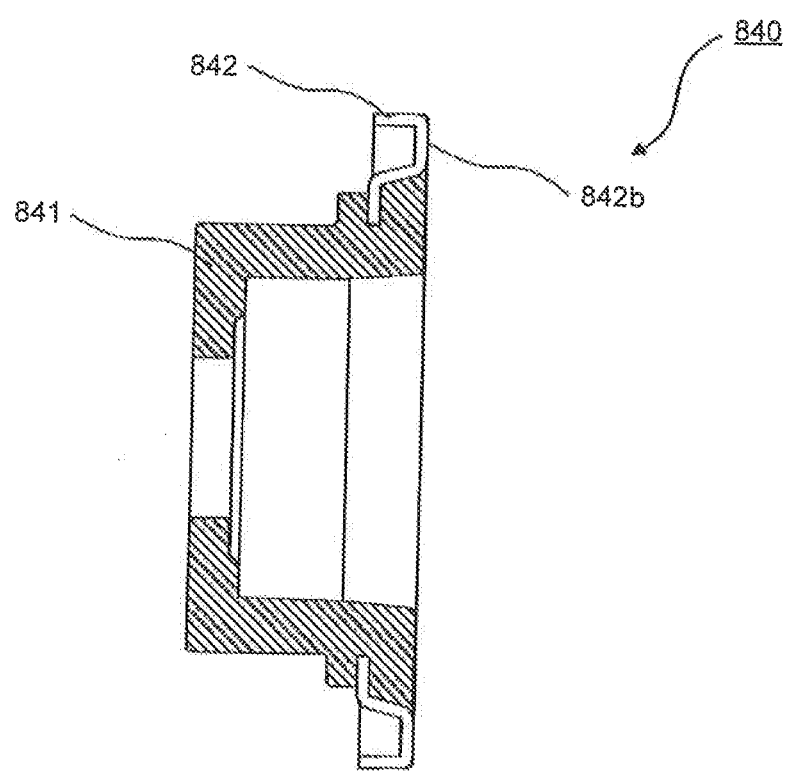
FIG. 61 is a sectional view of a fourth modification of the bracket.
Figure 62:
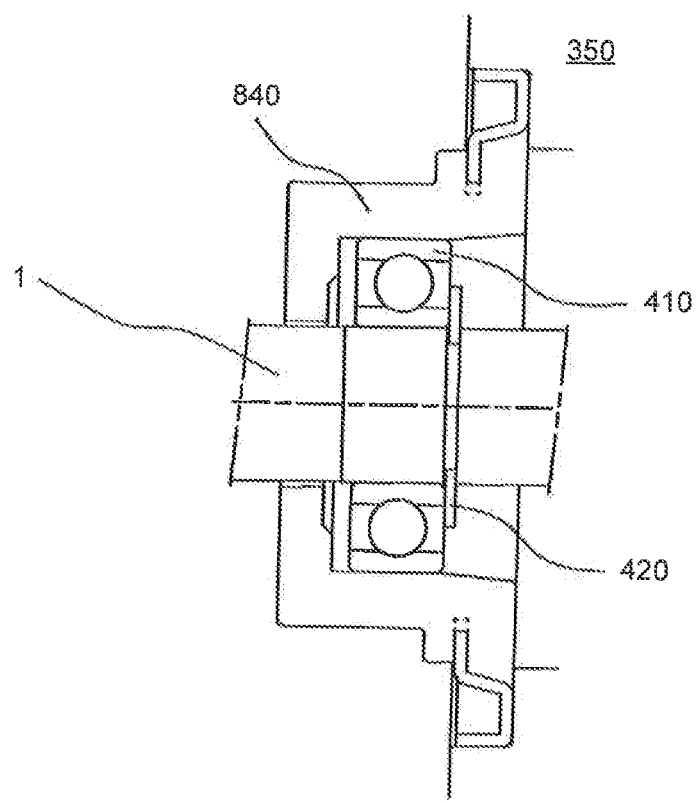
FIG. 62 is a partially enlarged view of a state in which the bracket that is fit in the bearing is press-fit into the mold stator.

FIG. 61 is a sectional view of a fourth modification of the bracket (a bracket 840). FIG. 62 is a partially enlarged view of a state in which the bracket 840 fit in the bearing 410 is press-fit into the mold stator 350.

The bracket 840 in the fourth modification is also configured from two kinds of components, i.e., a bracket sheet metal section 842 and a bracket resin section 841. The bracket 840 in the fourth modification is also formed by integrally molding the bracket resin section 841 with the bracket sheet metal section 842.

The bracket sheet metal section 842 forms a press-fitting section that is press-fit into the mold stator 350. The bracket resin section 841 forms a bearing housing section.

The bracket 840 in the fourth modification is different from the bracket 740 in the third modification in that resin is filled up to an axial direction setting surface 842b of the bracket sheet metal section 842 for the bracket press-fitting section 353 (see FIG. 43) of the mold stator 350. By filling the resin in this way, a gap between the bracket resin section 841 and the mold stator 350 is eliminated. Therefore, swing in the axial direction of the bracket resin section 841 is suppressed. It is possible to improve the quality.

In the bracket 840 in the fourth modification, an end face on an electric motor inner side of the bracket resin section 841 is formed the same as a setting surface in the axial direction of the bracket press-fitting section 353 of the mold stator 350 of the bracket sheet metal section 842. Consequently, it is possible to simplify a mold for integrally molding the bracket resin section 841 with the bracket sheet metal section 842. Therefore, it is possible to reduce costs in manufacturing.

Figure 63:
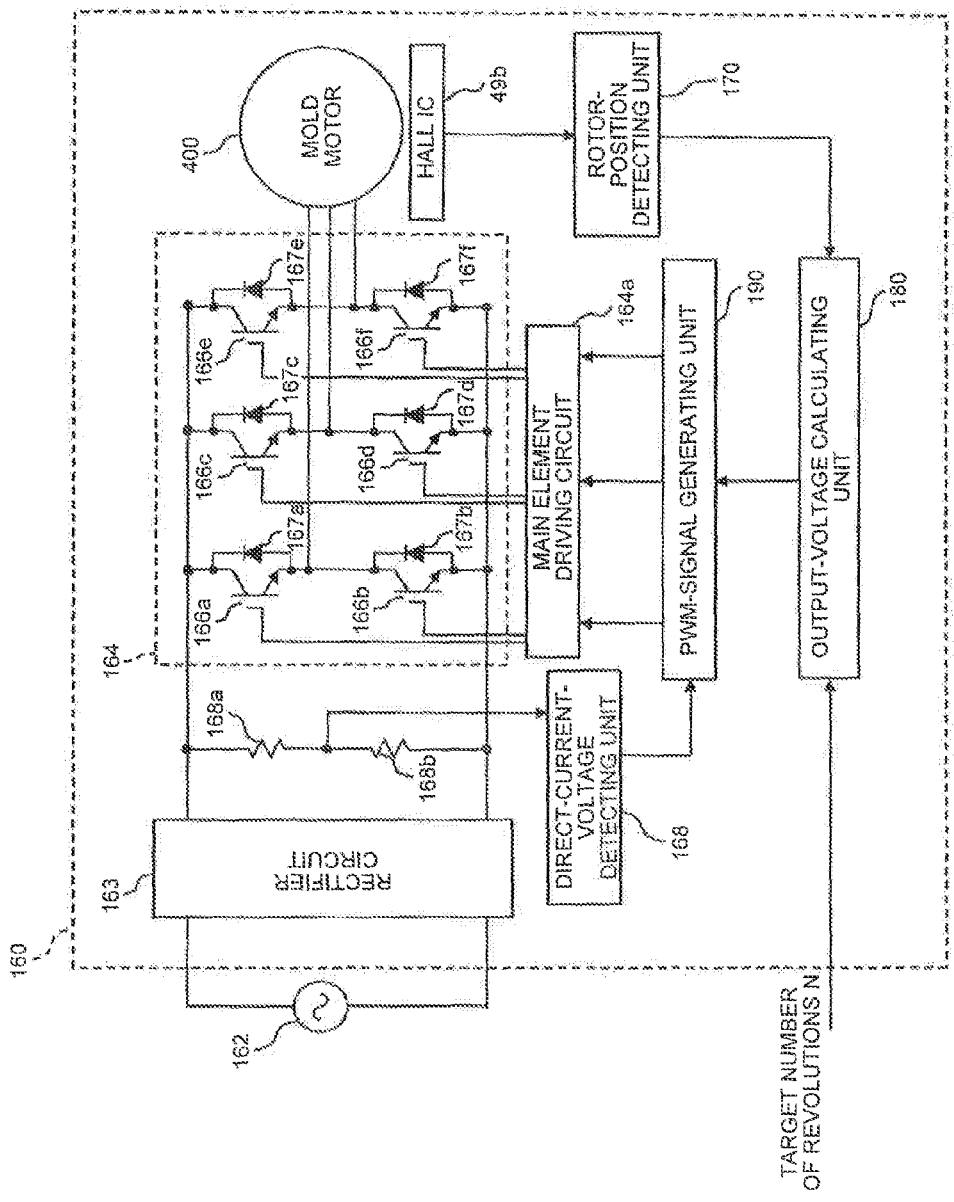
FIG. 63 is a circuit diagram of a motor-incorporated driving circuit incorporated in the mold motor according to the embodiment of the present invention.

FIG. 63 is a circuit diagram of a motor-incorporated driving circuit 160 incorporated in the mold motor according to the embodiment of the present invention. The motor-incorporated driving circuit 160 is explained with reference to FIG. 63. As shown in FIG. 63, alternating-current power is supplied from a commercial alternating-current power supply 162 provided on the outside of the mold motor 400 to the motor-incorporated driving circuit 160. An alternating-current voltage supplied from the commercial alternating-current power supply 162 is converted into a direct-current voltage by a rectifier circuit 163. The direct-current voltage converted by the rectifier circuit 163 is converted into an alternating-current voltage having a variable frequency by an inverter main circuit 164 and applied to the mold motor 400. The mold motor 400 is driven by alternating-current power having a variable frequency supplied from the inverter main circuit 164. A chopper circuit configured to boost the voltage applied from the commercial alternating-current power supply 162, a smoothing capacitor configured to smooth a rectified direct-current voltage, and the like are provided in the rectifier circuit 163.

The inverter main circuit 164 is a three-phase bridge inverter circuit. A switching section of the inverter main circuit 164 includes six IGBTs 166a to 166f (insulating gate bipolar transistors; simply defined as transistors) functioning as inverter main elements and includes six SiC-SBDs 167a to 167f (schottky barrier diodes; simply defined as diodes), in which silicon carbide (SiC) is used, as flywheel diodes (FRDs). The SiC-SBDs 167a to 167f functioning as the FRDs are reverse-current preventing means for suppressing a counter electromotive force that occurs when the IGBTs 166a to 166f change an electric current from ON to OFF.

In this embodiment, the IGBTs 166a to 166f and the SiC-SBDs 167a to 167f are formed as an IC module mounted with chips on the same lead frame, molded with epoxy resin, and packaged. The IGBTs 166a to 166f can be IGBTs in which SiC, GaN is used instead of the IGBTs (Si-IGBTs) in which silicon is used. Other switching elements such as MOSFETs (Metal-Oxide-Semiconductor Field-Effect Transistors) in which Si or SiC, GaN is used can be used instead of the IGBTs.

Two voltage dividing resistors 168a, 168b connected in series are provided between the rectifier circuit 163 and the inverter main circuit 164. A direct-current-voltage detecting unit 168 configured to sample and hold an electric signal obtained by reducing a high direct-current voltage in a voltage dividing circuit formed by the voltage dividing resistors 168a, 168b is provided.

The mold motor 400 includes the rotor 200 (FIG. 38) and the mold stator 350 (FIG. 43). The rotor 200 rotates due to the alternating-current power supplied from the inverter main circuit 164. Near the rotor 200 of the mold stator 350, a Hall IC 49b configured to detect the position detection magnet 11 is provided and a rotor-position detecting unit 170 configured to process an electric signal from the Hall IC 49b and convert the electric signal into position information of the rotor 200 is provided.

The position information of the rotor 200 detected by the rotor-position detecting unit 170 is output to an output-voltage calculating unit 180. The output-voltage calculating unit 180 calculates optimum output voltage of the inverter main circuit 164, which should be applied to the mold motor 400, based on a command of a target number of revolutions N or information concerning an operation condition of an apparatus given from the outside of the motor-incorporated driving circuit 160 and the position information of the rotor 200. The output-voltage calculating unit 180 outputs the calculated output voltage to a PWM-signal generating unit 190. PWM is an abbreviation of Pulse Width Modulation.

The PWM-signal generating unit 190 outputs a PWM signal corresponding to the output voltage given from the output-voltage calculating unit 180 to a main element driving circuit 164a configured to drive each of the IGBTs 166a to 166f of the inverter main circuit 164. Each of the IGBTs 166a to 166f of the inverter main circuit 164 is switched by the main element driving circuit 164a.

In this embodiment, the inverter main circuit 164 is a three-phase bridge inverter circuit. However, the inverter main circuit 164 can be other inverter circuits such as a single-phase inverter circuit.

A wide band-gap semiconductor is explained here. The wide band-gap semiconductor is a general term for a semiconductor having a band-gap larger than the band-gap of Si. The SiC used in the SiC-SBDs 167a to 167f is one of wide band-gap semiconductors. In addition, gallium nitride (GaN), diamond, and the like can be used. Further, the wide band-gap semiconductor, in particular, the SiC has higher heat-resistant temperature and larger breakdown strength and thermal conductivity compared with Si. In this embodiment, the SiC is used in the FRDs of the inverter circuit. However, other wide band-gap semiconductors can be used instead of the SiC.

Figure 64:
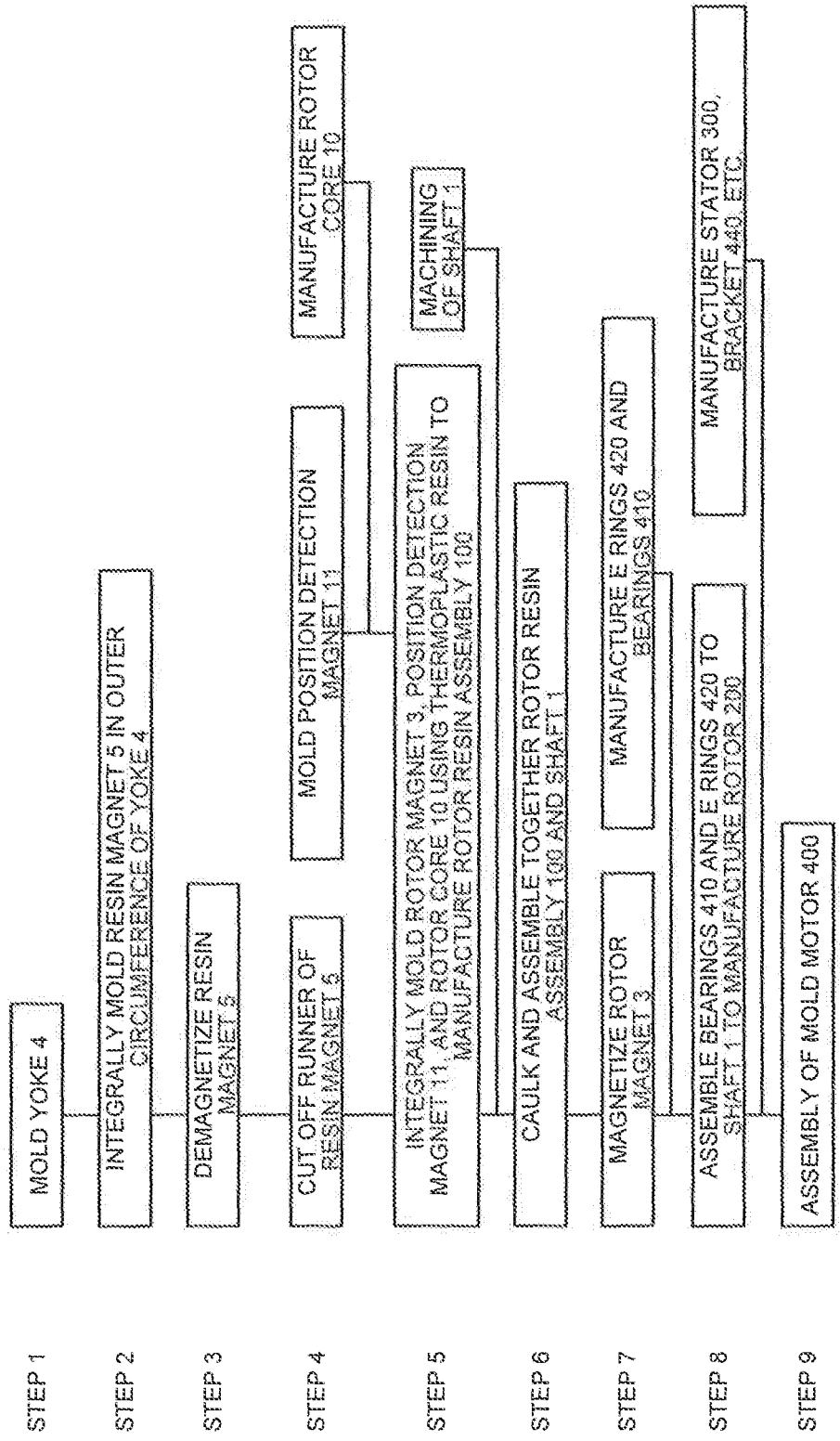
FIG. 64 is a manufacturing process chart of the mold motor according to the embodiment of the present invention.

FIG. 64 is a diagram of the embodiment and a manufacturing process chart of the mold motor 400. The mold motor 400 is manufactured by a process explained below.

(1) Step 1: Mold the yoke 4.

(2) Step 2: Integrally mold the resin magnet 5 in the outer circumference of the yoke 4.

(3) Step 3: Demagnetize the resin magnet 5.

(4) Step 4: Cut off the runners (the doughnut-like runner 36 and the rib-like runners 35) of the resin magnet 5. At the same time, mold the position detection magnet 11. At the same time, manufacture the rotor core 10.

(5) Step 5: Integrally mold the rotor magnet 3, the position detection magnet 11, and the rotor core 10 using thermoplastic resin to manufacture the rotor resin assembly 100. At the same time, perform machining of the shaft 1.

(6) Step 6: Caulk and assemble together the rotor resin assembly 100 and the shaft 1.

(7) Step 7: Magnetize the rotor magnet 3 (the resin magnet 5 and the position detection magnet 11). At the same time, manufacture the E-rings 420 and the bearings 410.

(8) Step 8: Assemble the bearings 410 and the E rings 420 to the shaft 1 to manufacture the rotor 200. At the same time, manufacture the stator 300, the bracket 440, and the other components.

(9) Step 9: Assemble the mold motor 400.

Figure 65:
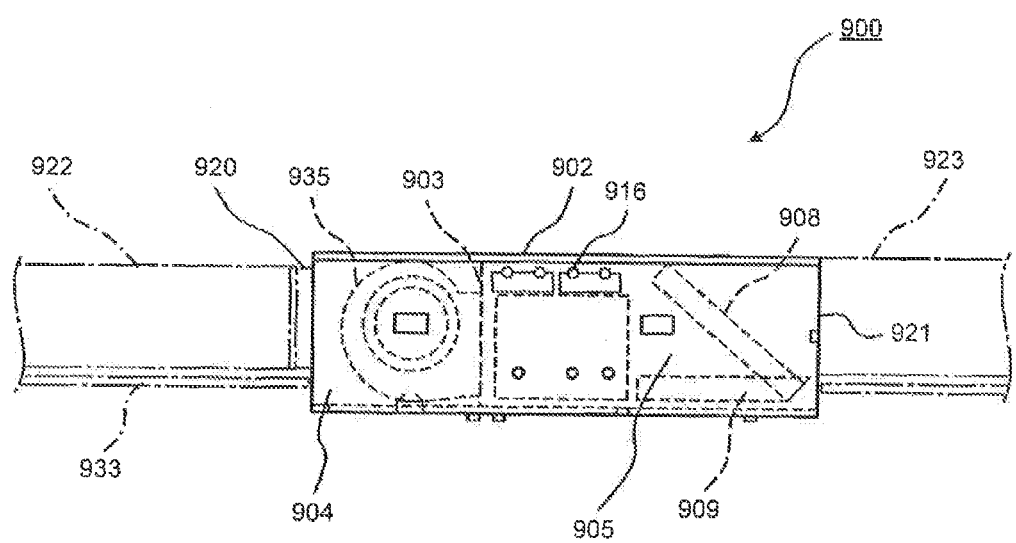
FIG. 65 is a configuration diagram of a side surface of a ceiling-embedded air conditioner according to the embodiment of the present invention.
Figure 66:
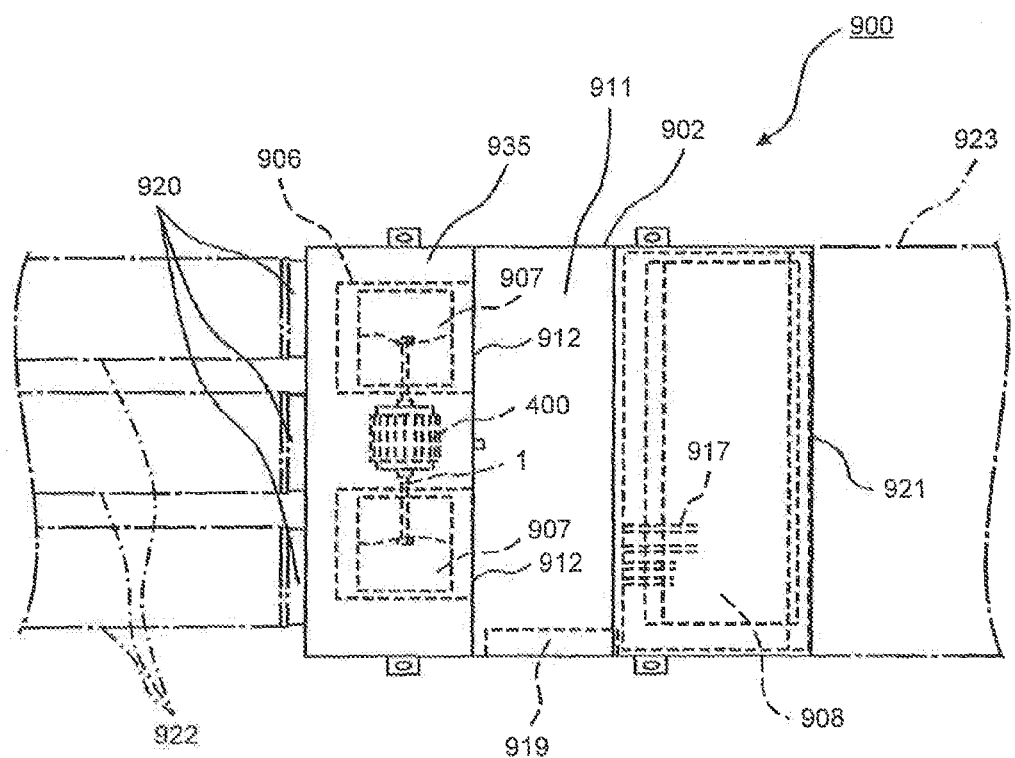
FIG. 66 is a configuration diagram of a plane of the ceiling-embedded air conditioner shown in FIG. 65.

FIG. 65 is a configuration diagram of a side surface of a ceiling-embedded air conditioner 900 according to the embodiment of the present invention. FIG. 66 is a configuration diagram of a plane of the ceiling-embedded air conditioner 900 shown in FIG. 65.

The ceiling-embedded air conditioner 900 (an example of an air conditioner) mounted with a blower, in which the mold motor 400 in this embodiment is used as a driving source, is explained with reference to FIGS. 65 and 66.

The ceiling-embedded air conditioner 900 incorporates, in a main body casing 902, an indoor-side heat exchanger 908 configured to subject indoor air and a refrigerant to heat exchange to perform air conditioning, a drain pan 909 configured to temporarily store dew condensation water from the indoor-side heat exchanger 908 and a refrigerant pipe, a blower 935 configured to blow the indoor air to the indoor-side heat exchanger 908, and a control box 919 in which electrical components such as a power supply for the blower 935 and a control device are housed.

The main body casing 902 is formed in a hollow rectangular box shape with left and right side plates, a top plate, a front plate, a rear plate, and a bottom plate of a lower surface rear section. The main body casing 902 is set in an air conditioner attachment opening of a ceiling 933. The main body casing 902 is suspended from and held on the roof-space via suspension bars connected to holding fixtures protrudingly provided on the side plates.

The main body casing 902 includes a ventilation route in a casing. The main body casing 902 is partitioned into a blowing space 904 and a heat exchange space 905 by a partition plate 903.

Duct connecting sections 920 respectively including air inlet ports are provided in the front plate of the main body casing 902. Air inlet ducts 922 are coupled to the duct connecting sections 920.

In addition, an air outlet port 921 is formed in the rear plate and coupled to an air outlet duct 923.

The blower 935 disposed in the blowing space 904 is configured by the mold motor 400 including the shaft 1 of a dual shaft type, blowing fans 907 such as sirocco fans attached to both ends of the shaft 1, and fan casings 906 configured to house the blowing fans 907.

The fan casings 906 are arranged such that air outlet ports 912 thereof are opened to a work space 911 piercing through the partition plate 903. Drain holes are drilled in the bottom surfaces of the fan casings 906. The drain holes are open-closably sealed by a plug body. The work space 911 having breadth capable of receiving a head and an upper half of the body of an operator is provided between the indoor-side heat exchanger 908 and the blower 935 in the main body casing 902. The drain pan 909 set below the indoor-side heat exchanger 908 is disposed above the bottom plate.

In addition, below the work space 911 in the main body casing 902, an opening section communicating with the work space 911 is formed. An opening section is formed below the blowing space 904. The opening section is set to a size enough for receiving the head and the upper half of the body of an operator. The opening sections are open-closably sealed by a lid plate that swings around a hinge section. The control box 919 is set on the side plate in the work space 911. A flow-down port coupled to a not-shown drainage hose or the like is provided in the bottom of the drain pan 909. A connecting section of refrigerant pipes 916 connected to the indoor-side heat exchanger 908 and the other refrigerant pipes 917 connected to, for example, an outdoor-side heat exchanger (not shown in the figure) is arranged above the drain pan 909 in the main body casing 902. Each of the refrigerant pipes 916 is arranged to incline so as to be high on the connecting section side and low on the drain pan 909 side. The refrigerant pipes 917 are fixed to the side plate via a pipe cover arranged above the control box 919.

In short, the fan casings 906, the blowing fans 907, the indoor-side heat exchanger 908, the drain pan 909, the connecting section, the refrigerant pipes 916, the refrigerant pipes 917, the pipe cover, and the control box 919 (each of which is an example of a work-related air conditioning device) are arranged in positions around the work space 911 in the main body casing 902 and within the reach of the operator.

The ceiling-embedded air conditioner 900 is configured as explained above. During a normal air conditioning operation, a refrigerant cooled or heated by the outdoor-side heat exchanger and a refrigerant restricting device (neither of which are shown in the figures) forming a refrigerating cycle flows into the indoor-side heat exchanger 908. On the other hand, the blowing fans 907 are driven by the startup of the mold motor 400, whereby the indoor air is sucked into the fan casings 906 from the room through the air inlet ducts 922. The air sucked in this way is blown out from the air outlet ports 912. The air reaches the heat exchange space 905 through the work space 911. The air is blown out from the air outlet port 921 after being cooled or warmed by heat exchange with the refrigerant in the indoor-side heat exchanger 908. The air blown out from the air outlet port 921 is returned to the room from the air outlet duct 923 and cools or warms the room.

INDUSTRIAL APPLICABILITY

As explained above, the present invention is applicable to a mold motor and an air conditioner and, in particular, can be easily adapted to a change in specifications and is useful as an invention having resistance to high-frequency electrolytic corrosion.

The invention claimed is:

1. A rotor of an electric motor, comprising:
   a rotor resin assembly;
   a shaft; and
   a bearing, wherein
   the rotor resin assembly is configured such that the shaft is inserted into an inner diameter section of a substantially doughnut-like rotator core formed by laminating a predetermined number of steel plates, and is caulked by a jig to form a recess in the vicinity of inner diameter sections of both end faces of the rotor core and assembled to the shaft.

2. The rotor of the electric motor according to claim 1, wherein a predetermine gap is secured between an outer circumference of the rotor core and an inner circumference of a rotor magnet, and if the rotor magnet and the rotor core are integrally formed by resin, a resin section between the rotor magnet and the rotor core electrically functions as an insulating layer when the rotor resin assembly is assembled to the shaft.

3. The rotor of the electric motor according to claim 1, wherein
   the rotor resin assembly includes:
      the rotor magnet including a substantially cylindrical yoke molded from thermoplastic resin containing a soft magnetic material or ferrite and a resin magnet integrally formed in an outer circumference of the yoke;
      the position detection magnet arranged at one end in an axial direction of the rotor magnet; and
      the rotor core arranged in an inner circumference of the rotor magnet, wherein
   the rotor magnet, the position detection magnet, and the rotor core are integrally formed by resin.

4. The rotor of the electric motor according to claim 1, wherein the resin for integrally forming the rotor magnet, the position detection magnet, and the rotor core is thermoplastic.

5. The rotor of the electric motor according to claim 1, wherein the rotor includes, in an outer circumference of the rotor core, a cutout functioning as a whirl stop when embedded in the resin.

6. The rotor of the electric motor according to claim 1, wherein the rotor includes, near an outer circumference of the rotor core, a hole functioning as a whirl stop when embedded in the resin.

7. The rotor of the electric motor according to claim 1, wherein a gap equal to or larger than the thickness of a resin section in the radial direction, which is formed in an outer circumference of the rotor magnet, is formed between the inner circumference of the rotor magnet and an outer circumference of the rotor core.

8. A mold motor, wherein the rotor of the electric motor according to claim 1 is used.

9. An air conditioner, wherein the mold motor according to claim 8 is mounted on a blower.

10. A method of manufacturing the mold motor in which the rotor of the electric motor according to claim 1 is used, the method comprising:
   a step of forming the yoke;
   a step of integrally molding the resin magnet in the outer circumference of the yoke;
   a step of demagnetizing the resin magnet;
   a step of cutting off a runner of the resin magnet, at the same time, molding the position detection magnet, and, at the same time, manufacturing the rotor core;
   a step of integrally molding the rotor magnet, the position detection magnet, and the rotor core using thermoplastic resin to manufacture the rotor resin assembly and, at the same time, machining the shaft;
   a step of caulking and assembling together the rotor resin assembly and the shaft;
   a step of magnetizing the rotor magnet and, at the same time, manufacturing an E ring and the bearing;
   a step of assembling the bearing and the E ring to the shaft to manufacture the rotor of the electric motor and, at the same time, manufacturing a stator, a bracket, and other components; and
   a step of assembling the mold motor.

* * * * *